(12) United States Patent
Langlotz et al.

(10) Patent No.: US 9,783,730 B2
(45) Date of Patent: Oct. 10, 2017

(54) METHOD FOR RECOVERING PETROLEUM

(71) Applicant: BASF SE, Ludwigshafen (DE)

(72) Inventors: Björn Langlotz, Trostberg (DE);
Tobias Zimmermann, Traunstein (DE);
Roland Reichenbach-Klinke,
Traunstein (DE); Christian Bittner,
Bensheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/103,356

(22) PCT Filed: Dec. 5, 2014

(86) PCT No.: PCT/EP2014/076772
§ 371 (c)(1),
(2) Date: Jun. 10, 2016

(87) PCT Pub. No.: WO2015/086468
PCT Pub. Date: Jun. 18, 2015

(65) Prior Publication Data
US 2017/0101576 A1  Apr. 13, 2017

(30) Foreign Application Priority Data

Dec. 13, 2013 (EP) .................................. 13197065

(51) Int. Cl.
| E21B 43/16 | (2006.01) |
| E21B 43/22 | (2006.01) |
| C09K 8/588 | (2006.01) |
| C08F 220/56 | (2006.01) |
| C08L 33/26 | (2006.01) |

(52) U.S. Cl.
CPC ............ C09K 8/588 (2013.01); C08F 220/56 (2013.01); C08L 33/26 (2013.01); E21B 43/16 (2013.01); C08F 2800/20 (2013.01)

(58) Field of Classification Search
CPC ........ C09K 8/588; C09K 8/512; C09K 8/584; E21B 43/16
See application file for complete search history.

(56) References Cited

U.S. PATENT DOCUMENTS

| 5,633,329 A | 5/1997 | Hähnle et al. |
| 5,741,947 A | 4/1998 | Wolf et al. |
| 7,605,196 B2 | 10/2009 | Schinabeck et al. |
| 7,619,046 B2 | 11/2009 | Broughton et al. |
| 9,315,717 B2 | 4/2016 | Pfeuffer et al. |
| 2015/0329660 A1 | 11/2015 | Bittner et al. |
| 2015/0329669 A1 | 11/2015 | Bittner et al. |
| 2016/0200969 A1 | 7/2016 | Reichenbach-Klinke et al. |

FOREIGN PATENT DOCUMENTS

| CA | 2760734 A1 | 11/2010 |
| CA | 2817792 A1 | 5/2012 |
| CA | 2818016 A1 | 5/2012 |
| CA | 2818847 A1 | 5/2012 |
| DE | 4325237 A1 | 2/1995 |
| DE | 10243361 A1 | 4/2004 |
| EP | 2283915 A1 | 2/2011 |
| EP | 12197504.9 | 12/2012 |
| EP | 12197538.7 | 12/2012 |
| EP | 2931766 A1 | 10/2015 |
| EP | 2931786 A2 | 10/2015 |
| GB | 1054028 A | 1/1967 |
| WO | WO-85/03510 A1 | 8/1985 |
| WO | WO-03/066190 A1 | 8/2003 |
| WO | WO-2006002936 A1 | 1/2006 |
| WO | WO-2008071808 A1 | 6/2008 |
| WO | WO-2008/081048 A2 | 7/2008 |
| WO | WO-2010/133527 A2 | 11/2010 |
| WO | WO-2011/015520 A1 | 2/2011 |
| WO | WO-2012/069438 A1 | 5/2012 |
| WO | WO-2012/069477 A1 | 5/2012 |
| WO | WO-2012069478 A1 | 5/2012 |
| WO | WO-2012/140092 A1 | 10/2012 |
| WO | WO-2014/095608 A2 | 6/2014 |
| WO | WO-2014/095621 A1 | 6/2014 |
| WO | WO-2015024865 A1 | 2/2015 |

OTHER PUBLICATIONS

International Preliminary Examination Report with Written Opinion of International Searching Authority (in Germany) for PCT/EP2014/076772 mailed Apr. 8, 2015.
International Search Report for PCT/EP2014/076772 mailed Jan. 13, 2015.

*Primary Examiner* — Zakiya W Bates
(74) *Attorney, Agent, or Firm* — Drinker Biddle & Reath LLP

(57) ABSTRACT

A process for producing mineral oil from underground mineral oil deposits, in which an aqueous formulation comprising at least one water-soluble, hydrophobically associating copolymer is injected through at least one injection well into a mineral oil deposit having a deposit temperature of 20° C. to 120° C. and crude oil is withdrawn from the deposit through at least one production well, wherein the water-soluble copolymer comprises at least acrylamide or derivatives thereof and a mixture comprising at least two amphiphilic macromonomers.

36 Claims, 20 Drawing Sheets

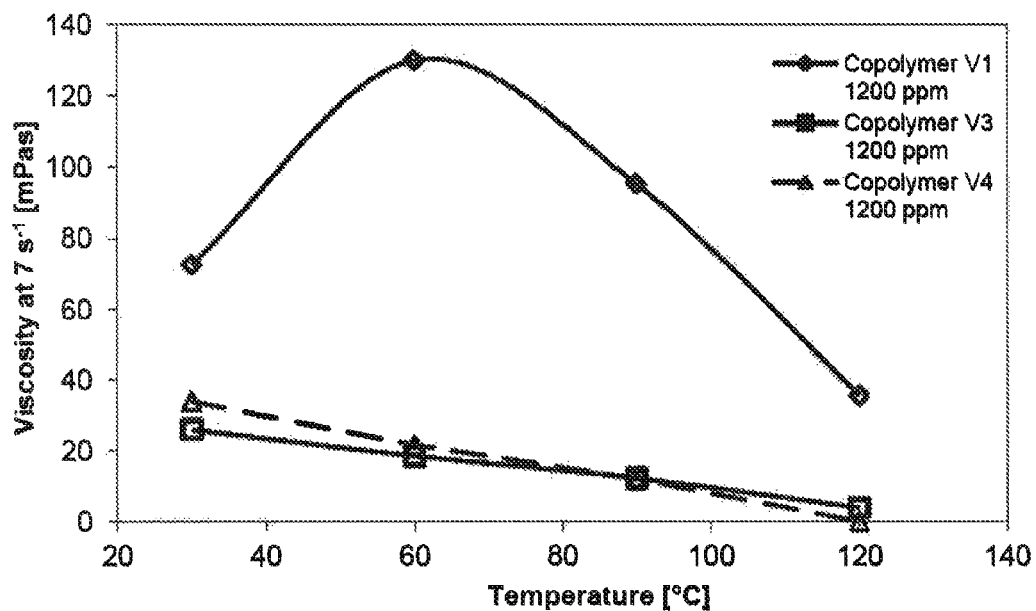
Fig. 1a: Viscosity of aqueous solutions of comparative copolymers V1, V3 and V4 in tap water
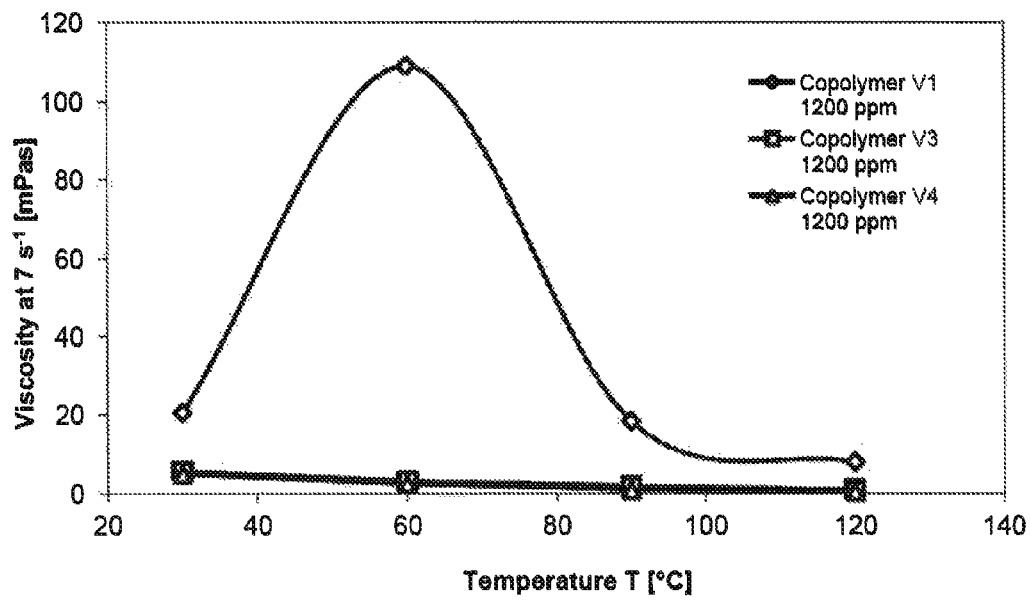
Fig. 1b: Viscosity of aqueous solutions of comparative copolymers V1, V3 and V4 in deposit water

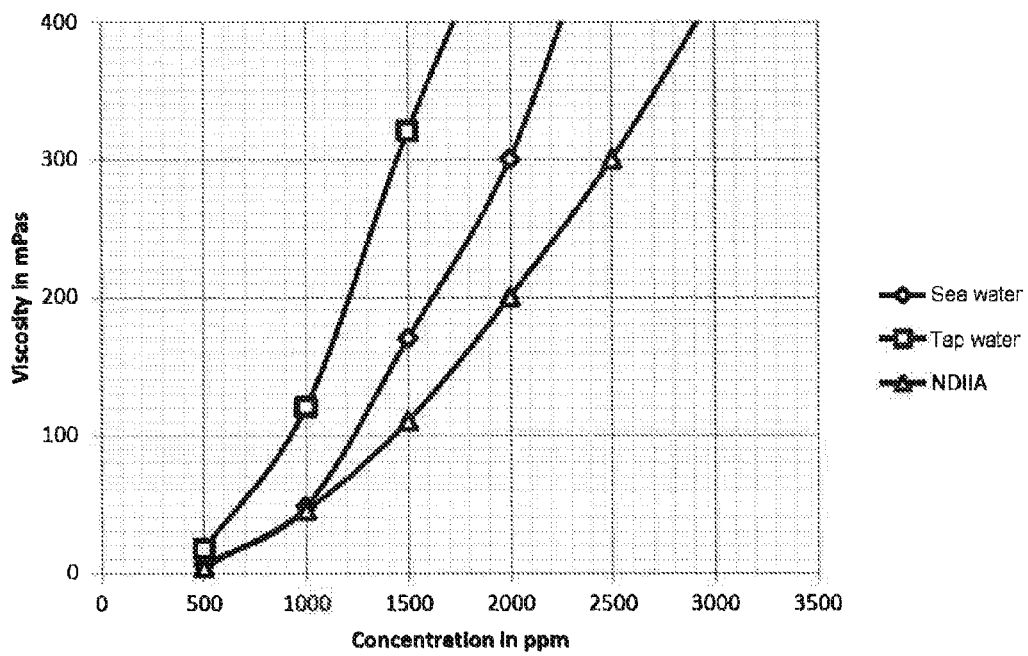
Figure 2a: Viscosity of copolymer V2 at 60°C at various concentrations in seawater, tap water and deposit water.
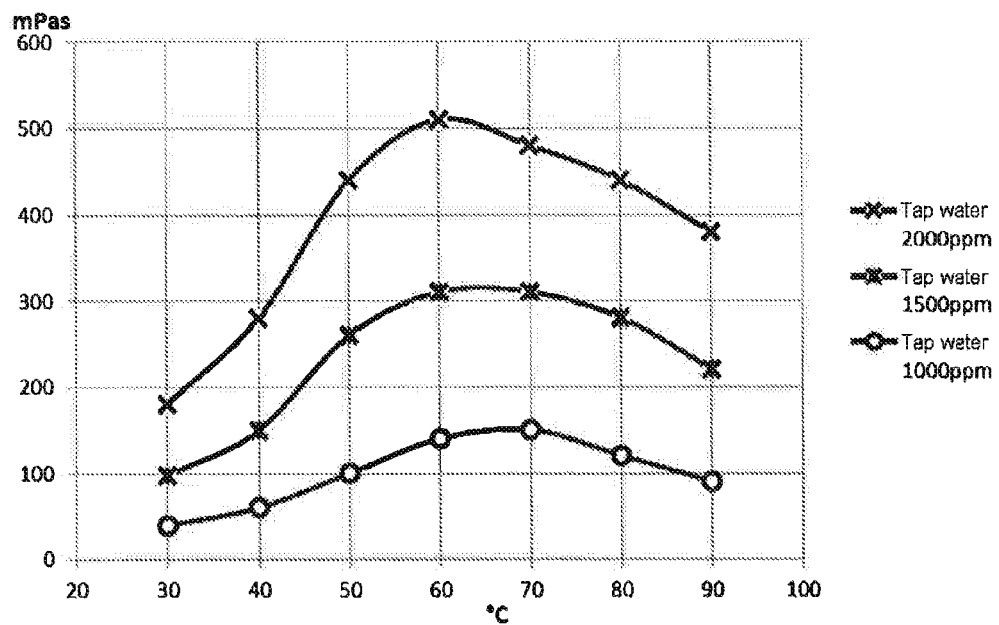
Figure 2b: Viscosity of aqueous solutions of copolymer V2 in tap water at various temperatures and concentrations.

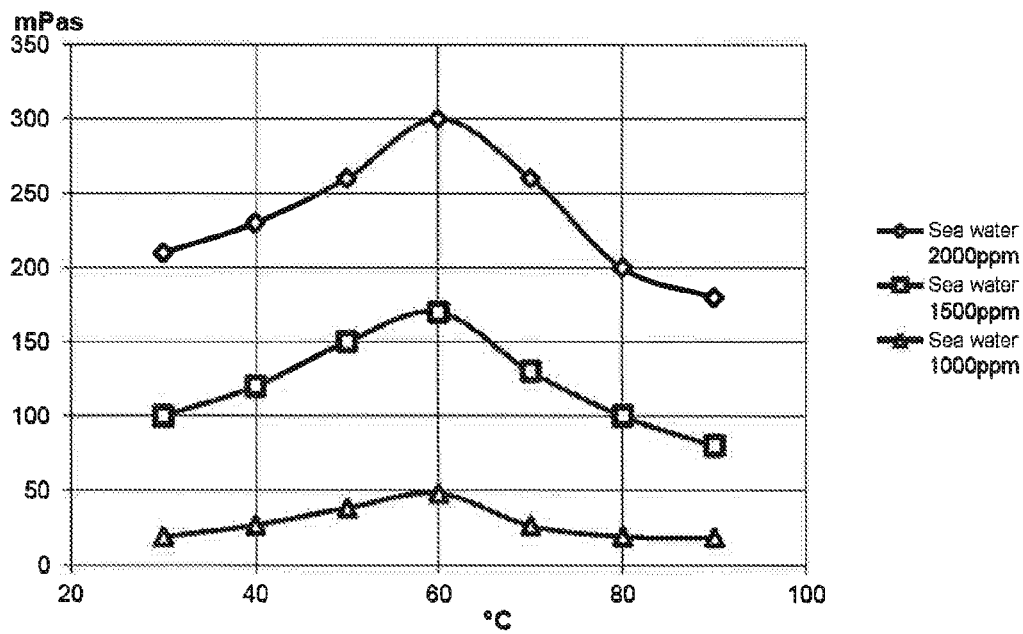
Figure 2c: Viscosity of solutions of copolymer V2 in seawater at various temperatures and concentrations.
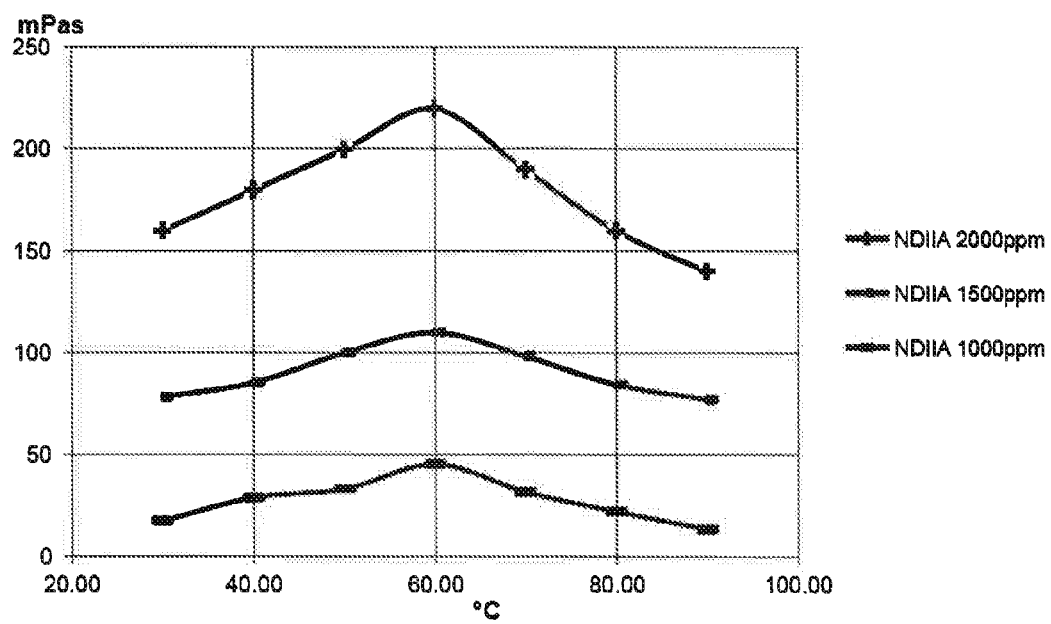
Figure 2d: Viscosity of solutions of copolymer V2 in deposit water at various temperatures and concentrations.

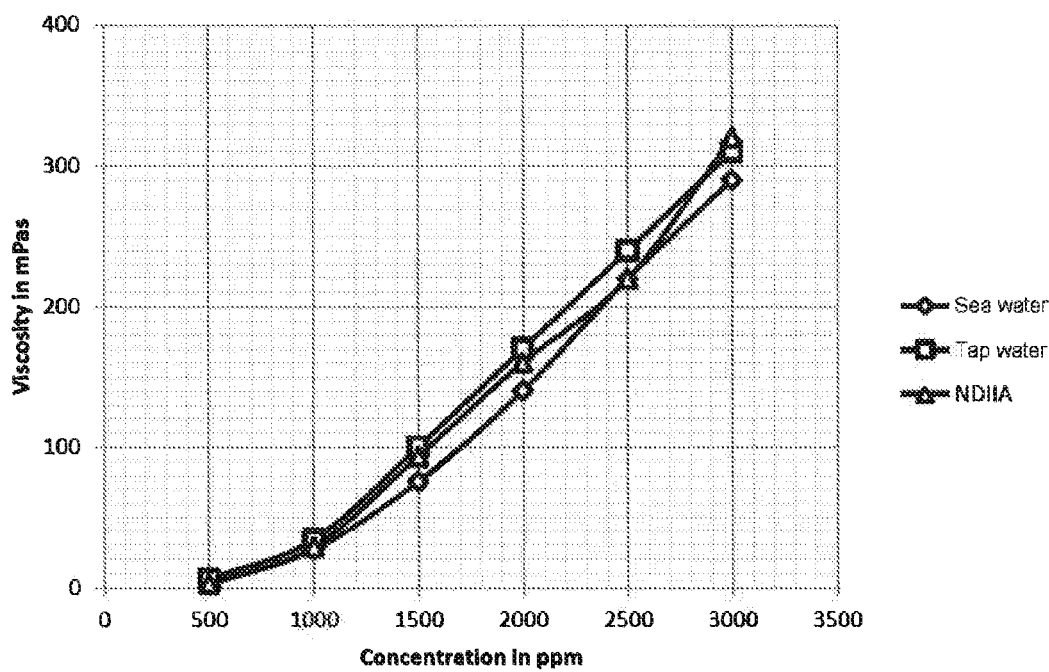
Figure 3a: Viscosity of copolymer 1 at 60°C at various concentrations in seawater, tap water and deposit water.
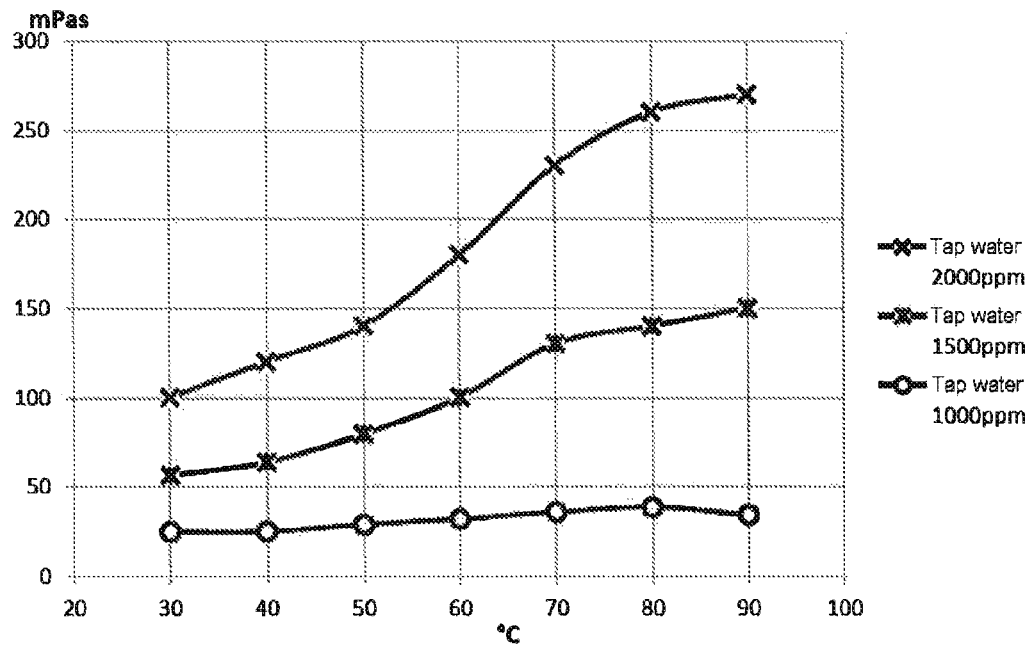
Figure 3b: Viscosity of solutions of copolymer 1 in tap water at various temperatures and concentrations.

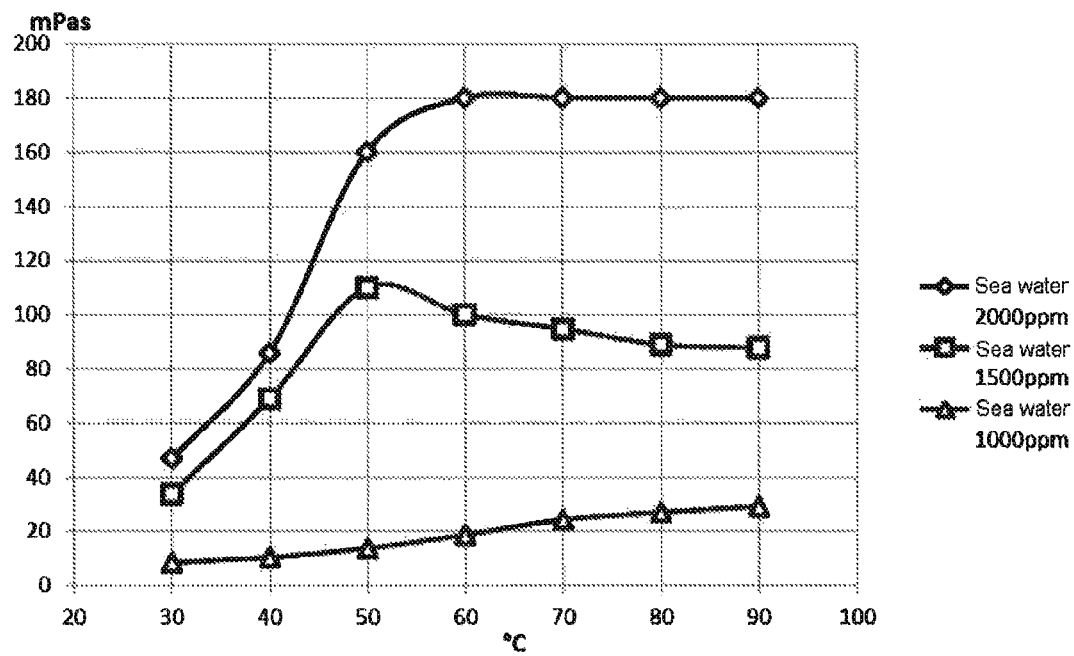
Figure 3c: Viscosity of solutions of copolymer 1 in seawater at various temperatures and concentrations.
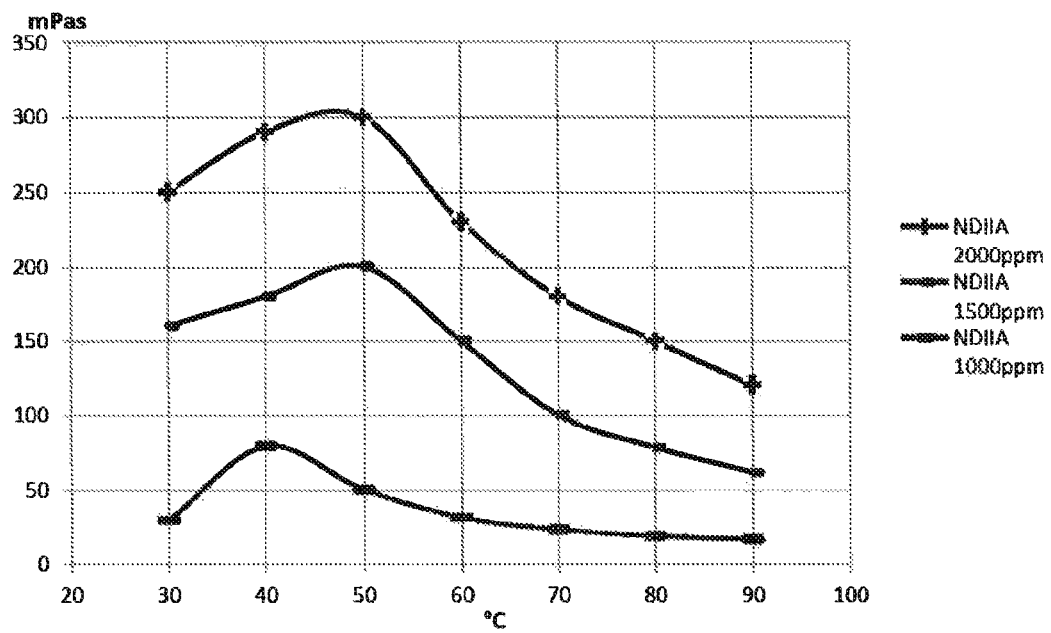
Figure 3d: Viscosity of solutions of copolymer 1 in deposit water at various temperatures and concentrations.

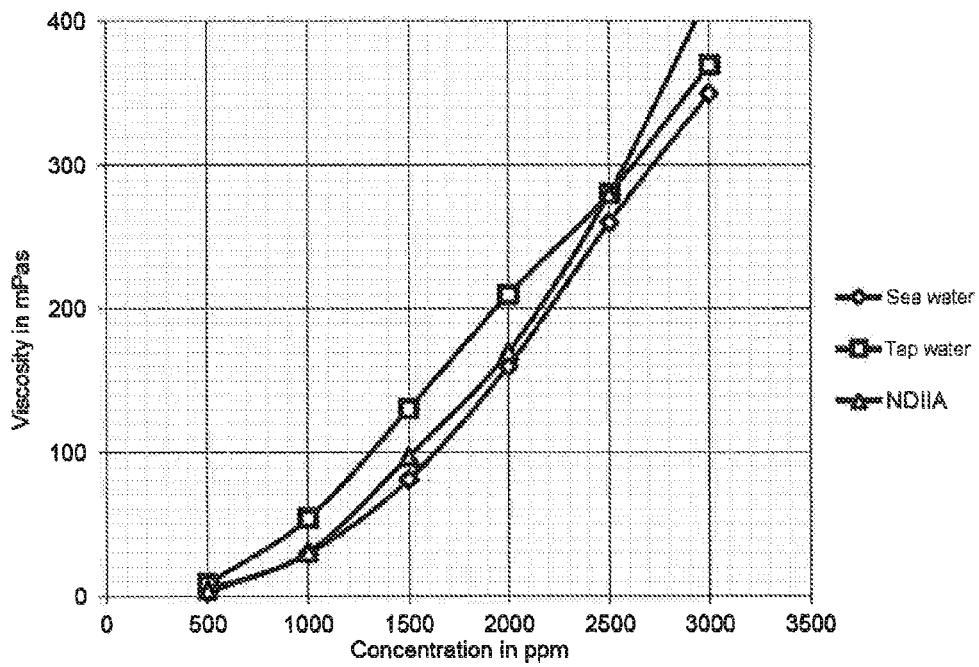
Figure 4a: Viscosity of copolymer 2 at 60°C at various concentrations in seawater, tap water and deposit water.
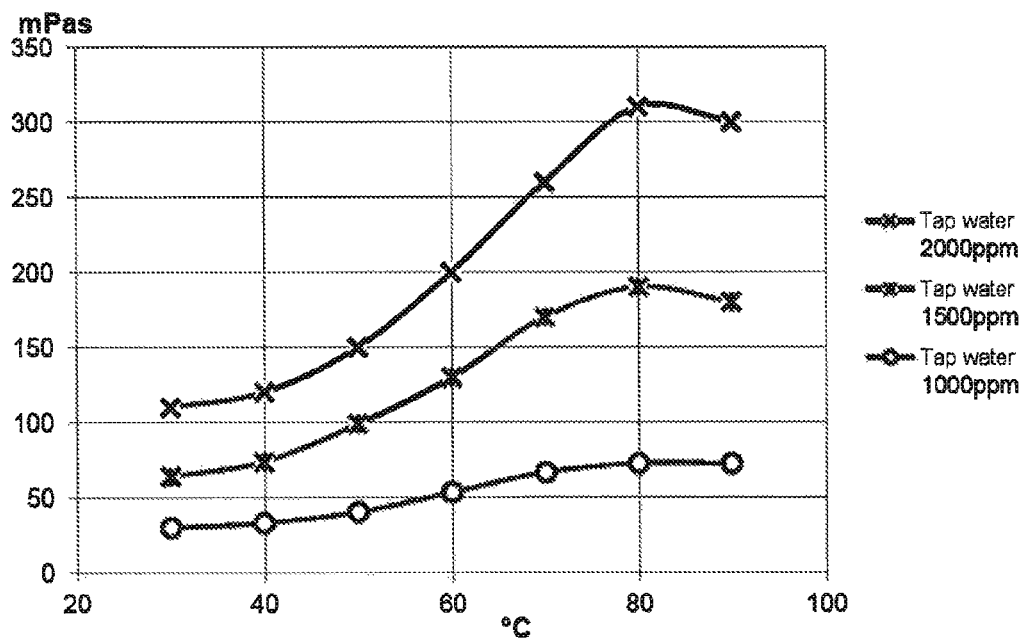
Figure 4b: Viscosity of solutions of copolymer 2 in tap water at various temperatures and concentrations.

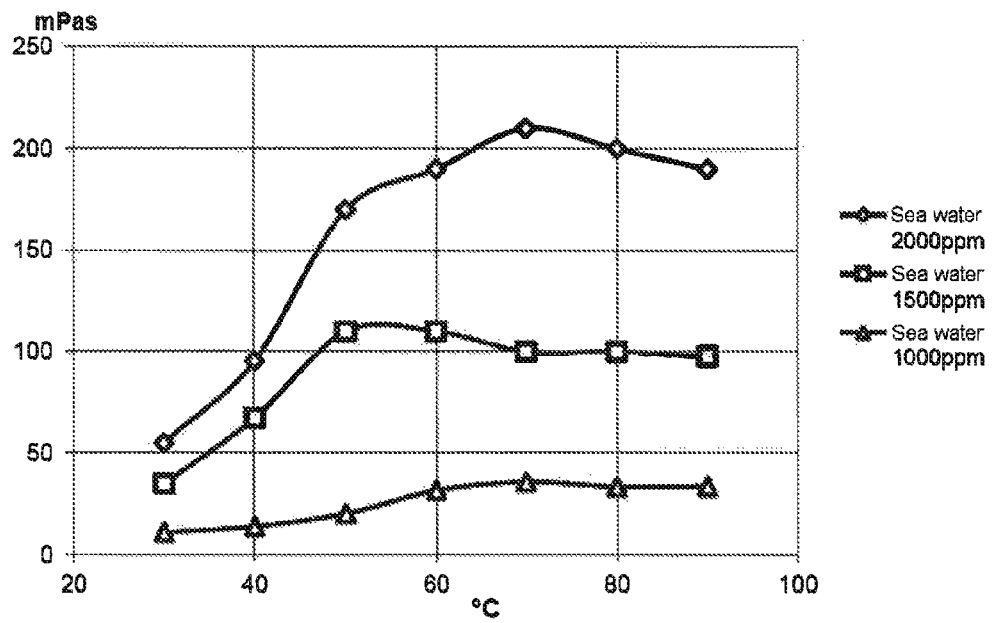
Figure 4c: Viscosity of solutions of copolymer 2 in seawater at various temperatures and concentrations.
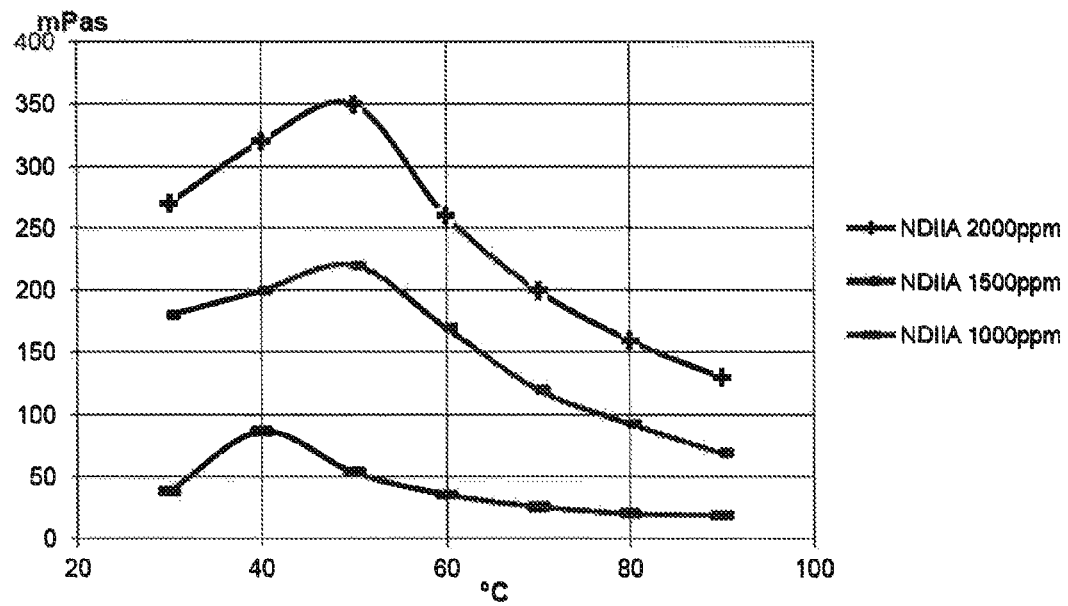
Figure 4d: Viscosity of solutions of copolymer 2 in deposit water at various temperatures and concentrations.

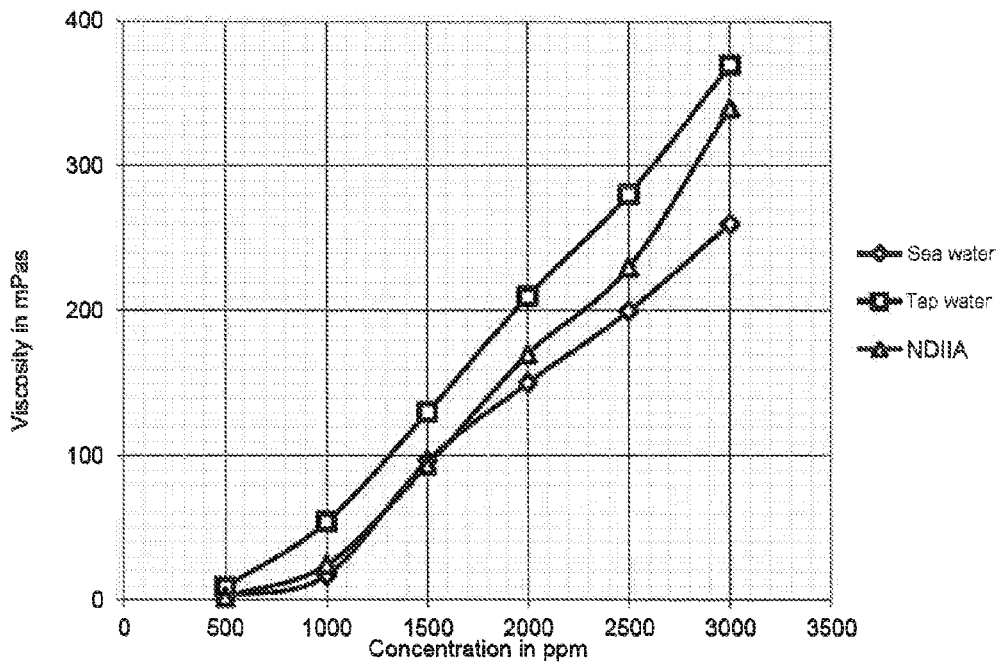
Figure 5a: Viscosity of copolymer 3 at 60°C at various concentrations in seawater, tap water and deposit water.
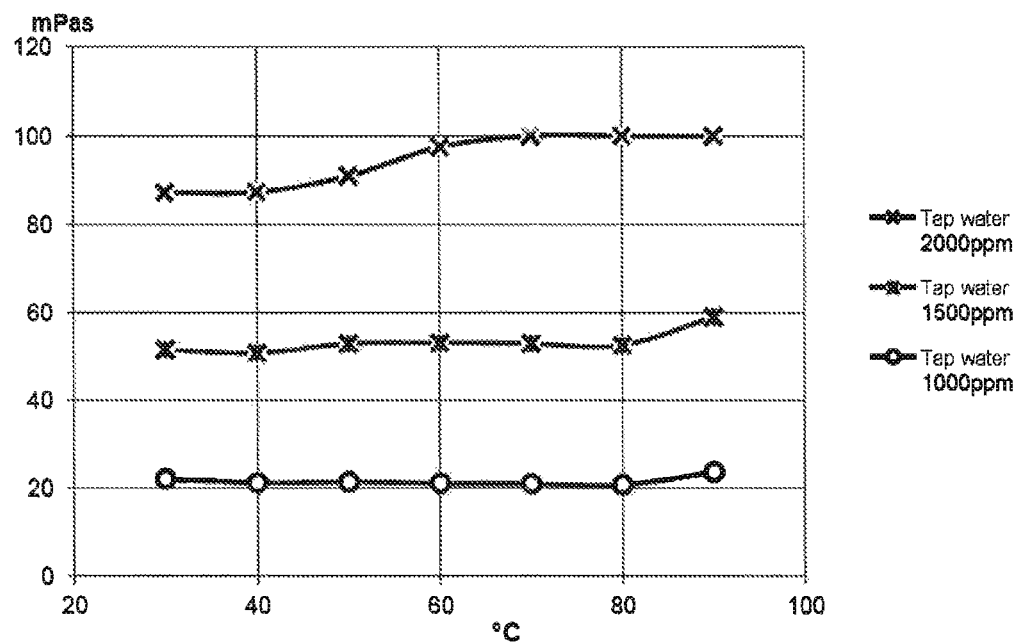
Figure 5b: Viscosity of solutions of copolymer 3 in tap water at various temperatures and concentrations.

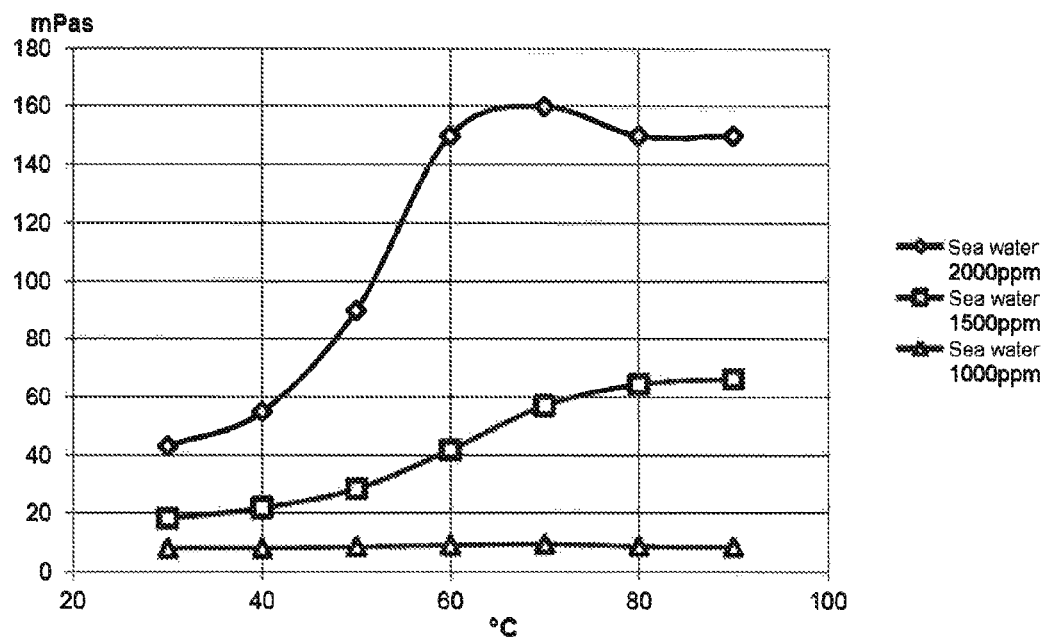
Figure 5c: Viscosity of solutions of copolymer 3 in seawater at various temperatures and concentrations.
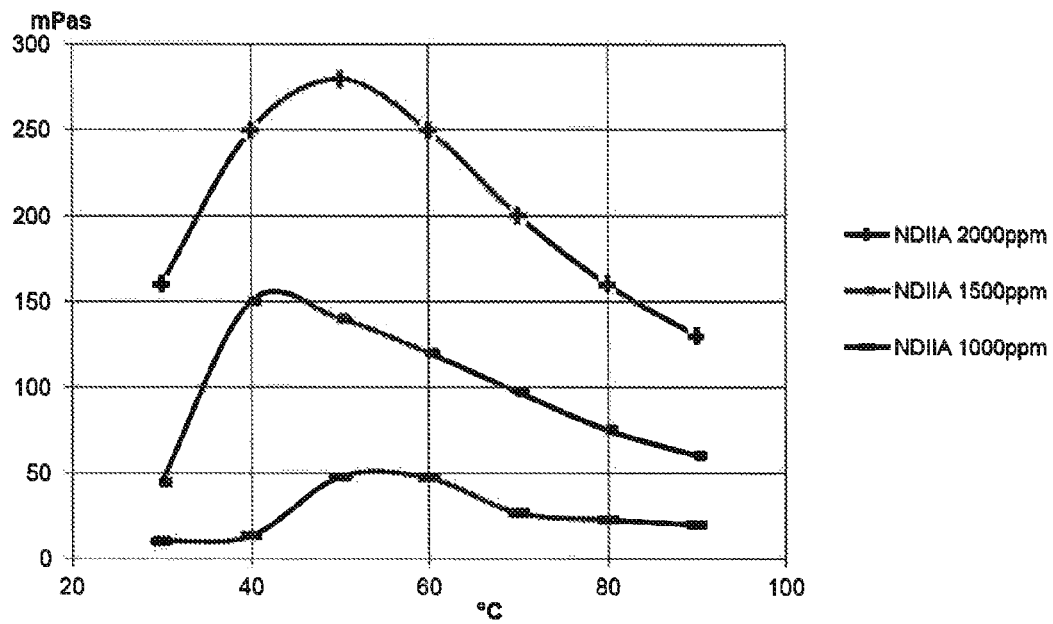
Figure 5d: Viscosity of solutions of copolymer 3 in deposit water at various temperatures and concentrations.

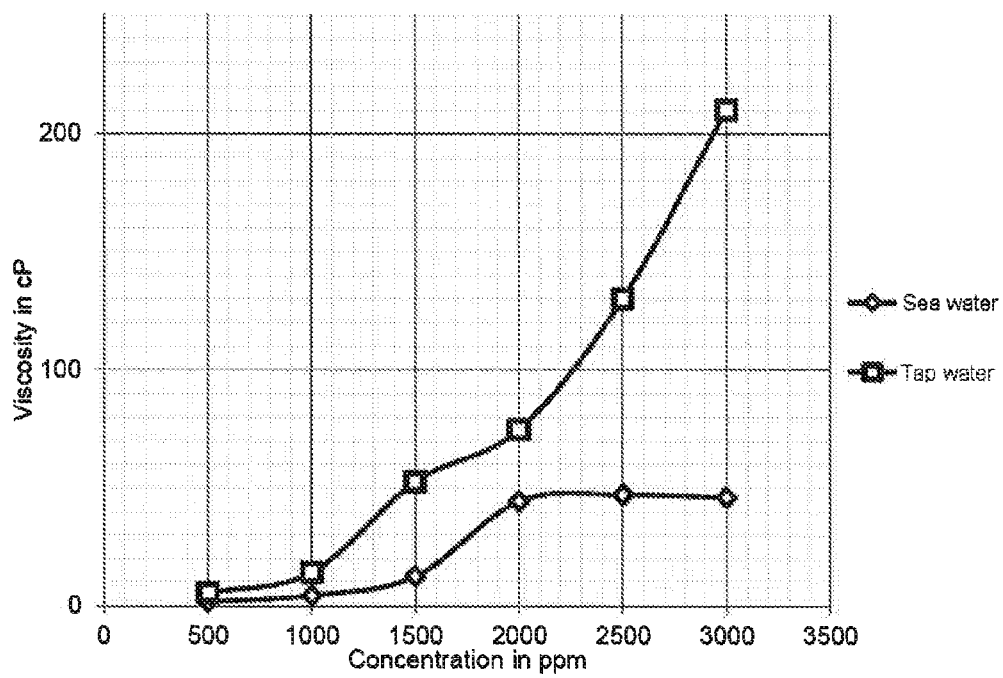
Figure 6a: Viscosity of copolymer 4 at 60°C at various concentrations in seawater and tap water.
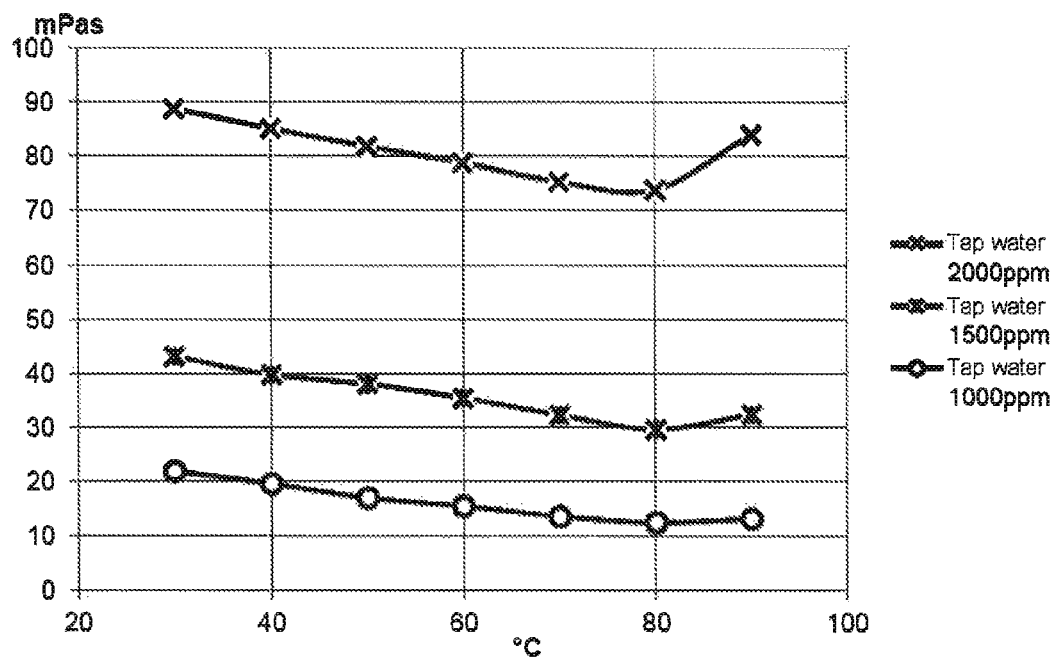
Figure 6b: Viscosity of solutions of copolymer 4 in tap water at various temperatures and concentrations.

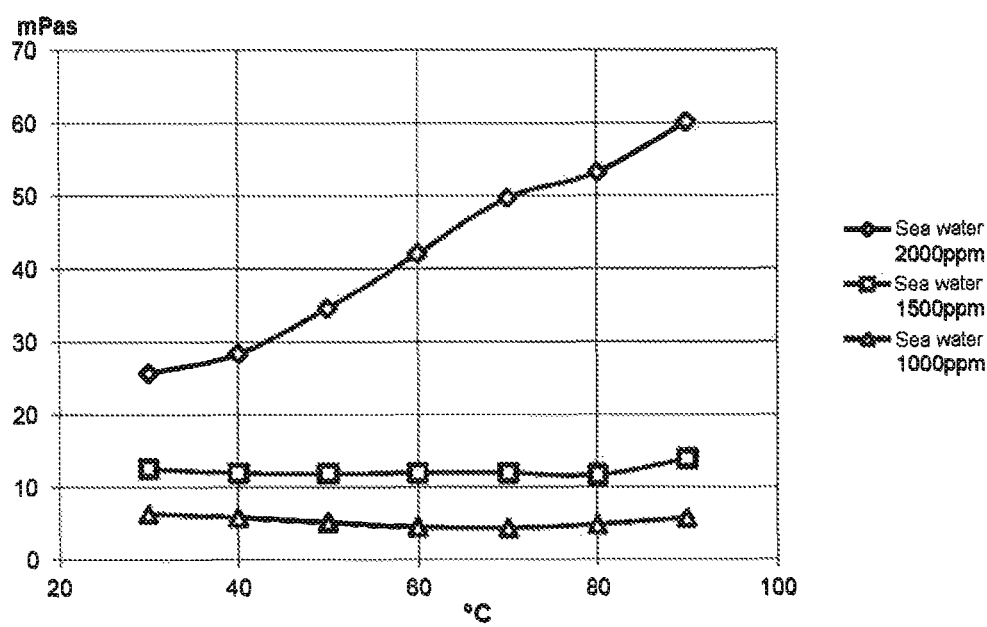
Figure 6c: Viscosity of solutions of copolymer 4 in seawater at various temperatures and concentrations.

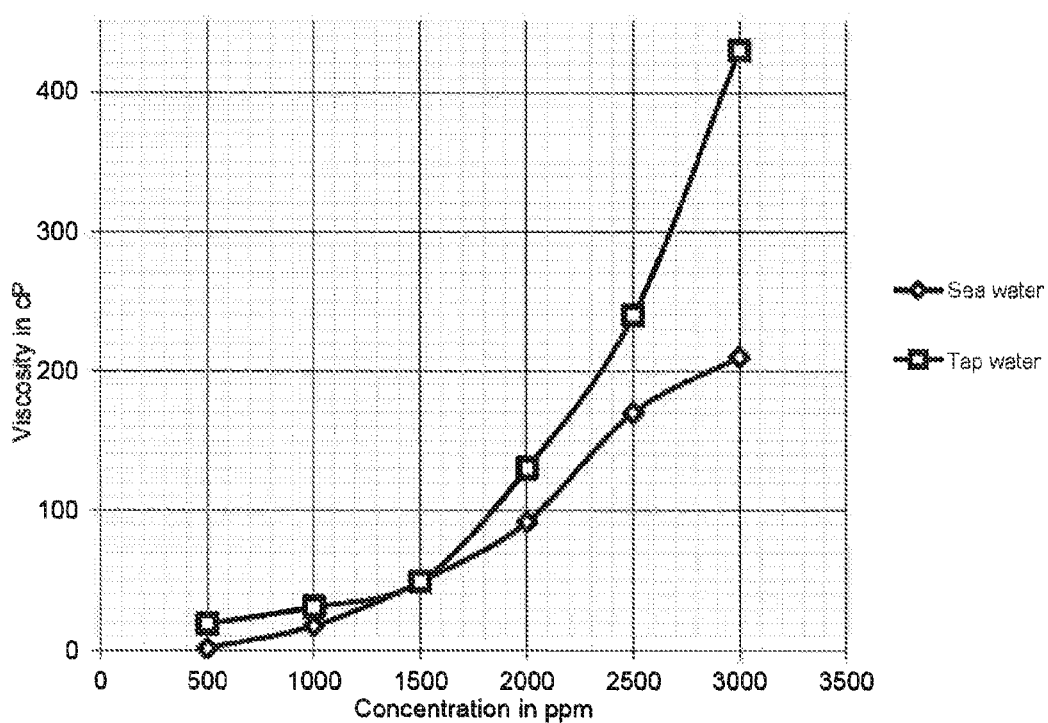
Figure 7a: Viscosity of copolymer 5 at 60°C at various concentrations in seawater and tap water.
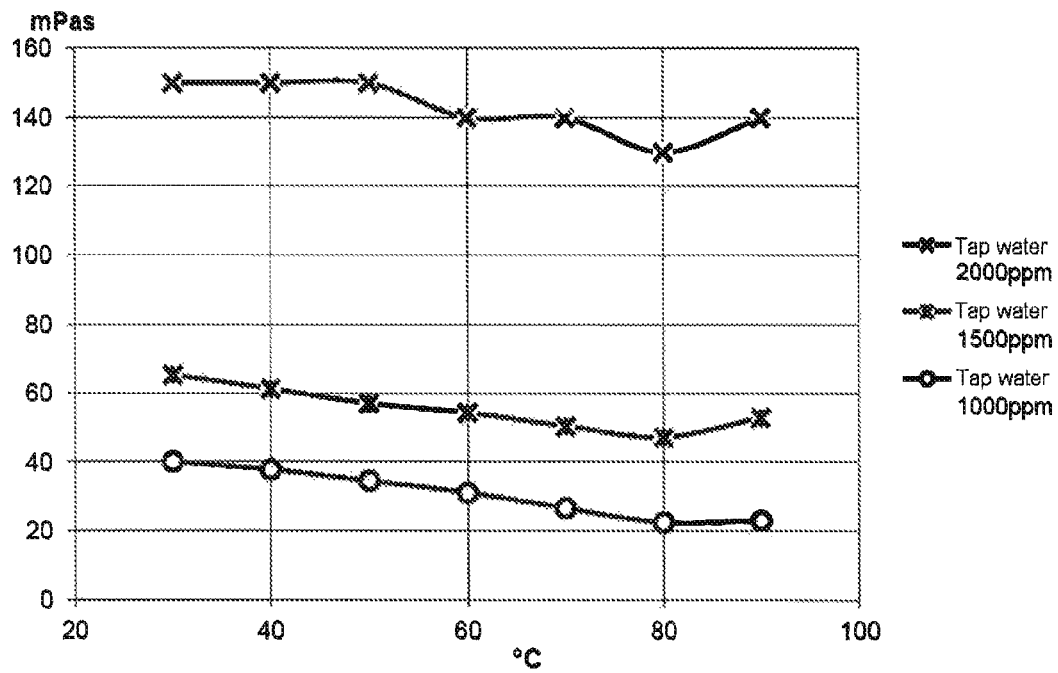
Figure 7b: Viscosity of solutions of copolymer 5 in tap water at various temperatures and concentrations.

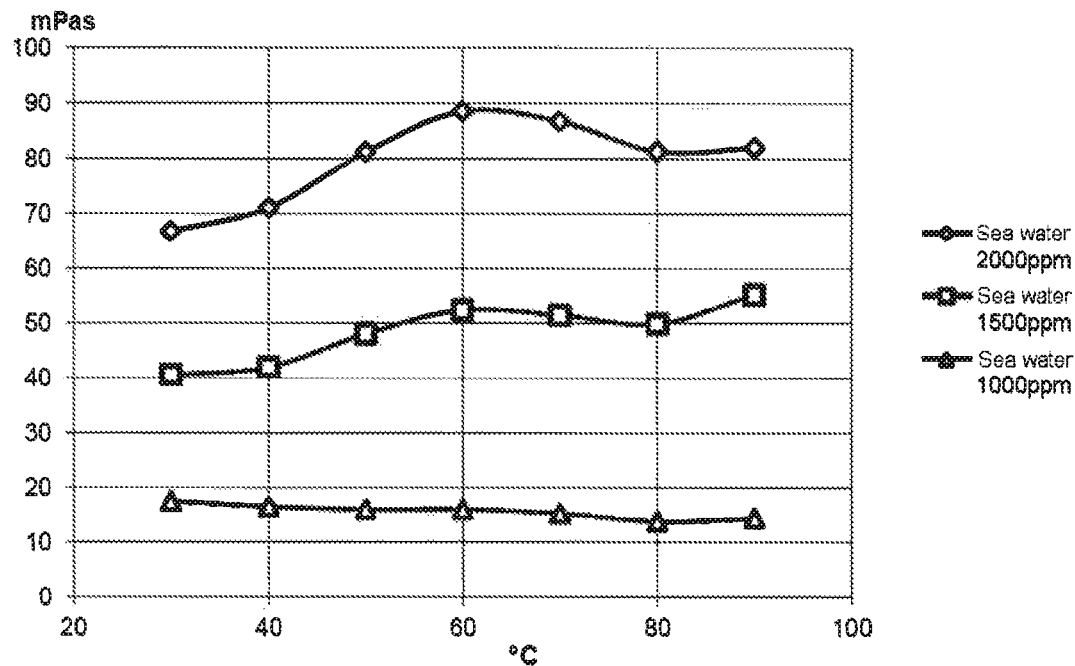
Figure 7c: Viscosity of solutions of copolymer 5 in seawater at various temperatures and concentrations.
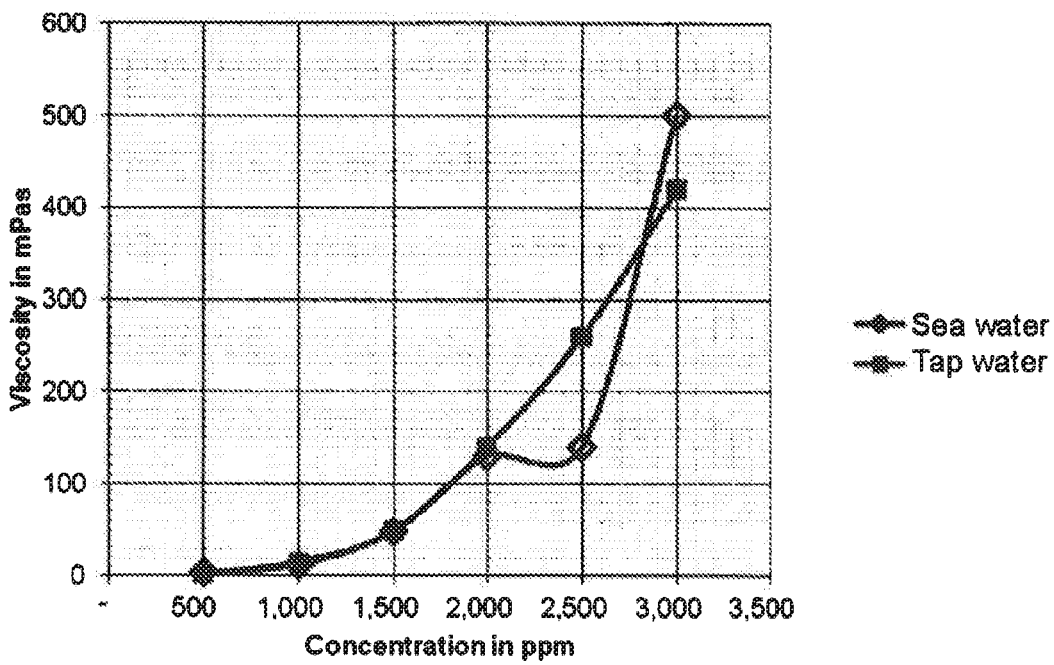
Figure 8a: Viscosity of copolymer 6 at 60°C at various concentrations in sea water and tap water

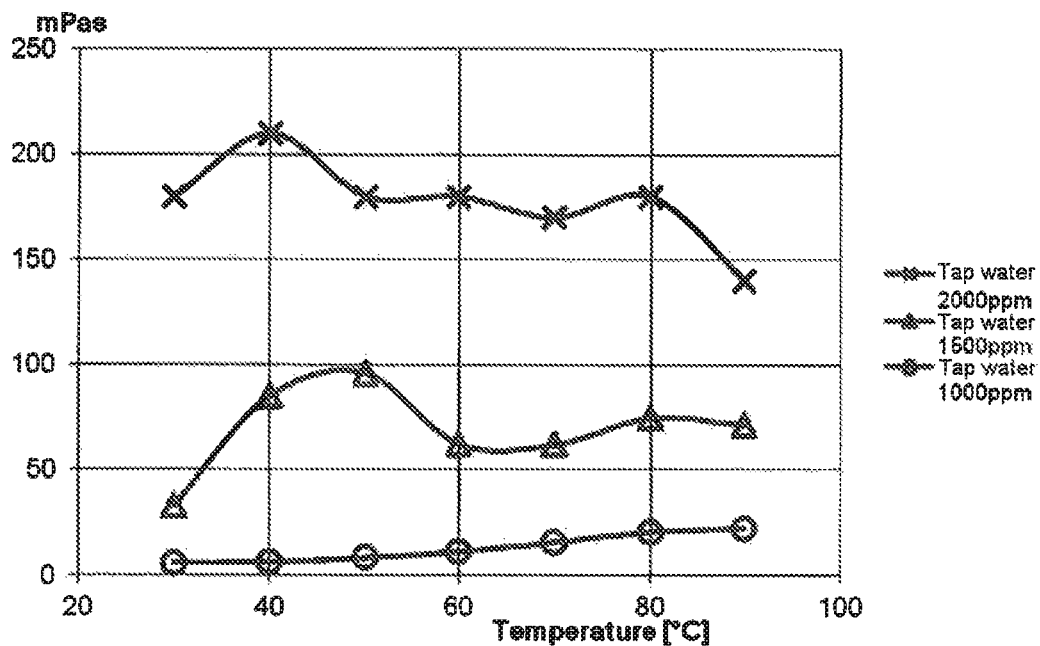
Figure 8b: Viscosity of solutions of copolymer 6 in tap water at various temperatures and concentrations
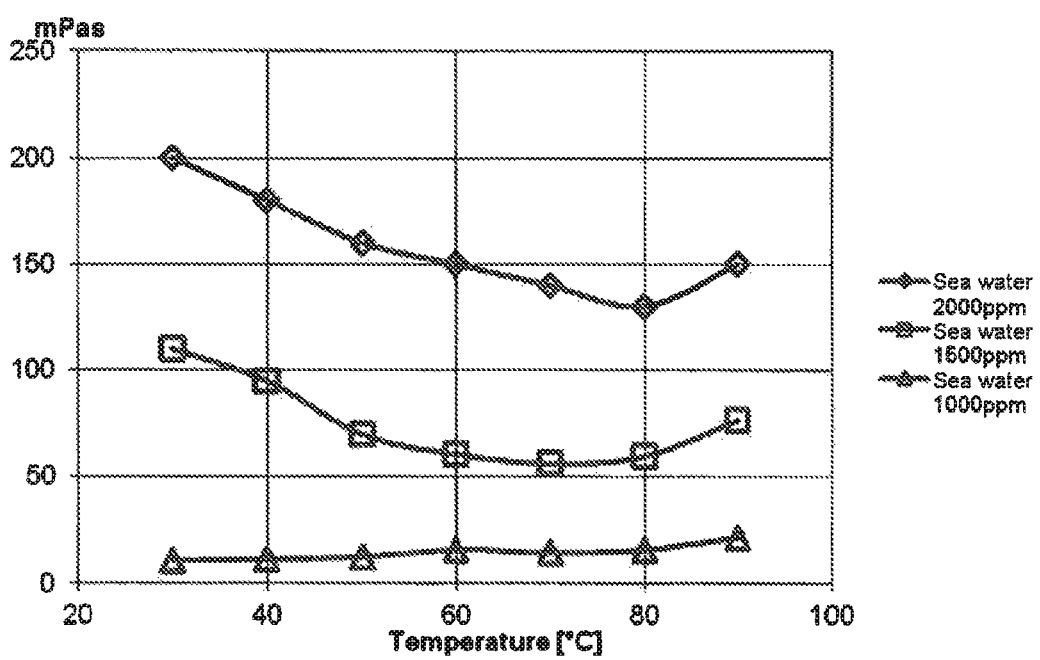
Figure 8c: Viscosity of solutions of copolymer 6 in sea water at various temperatures and concentrations

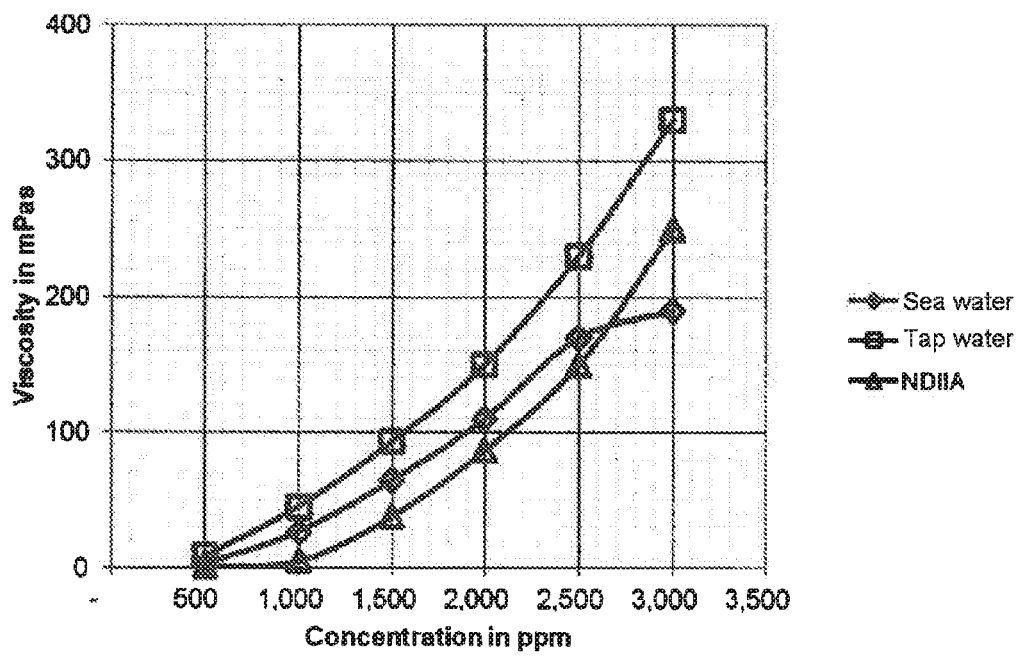
Figure 9a: Viscosity of copolymer 7 at 60°C at various concentrations in tap water, sea water and deposit water.
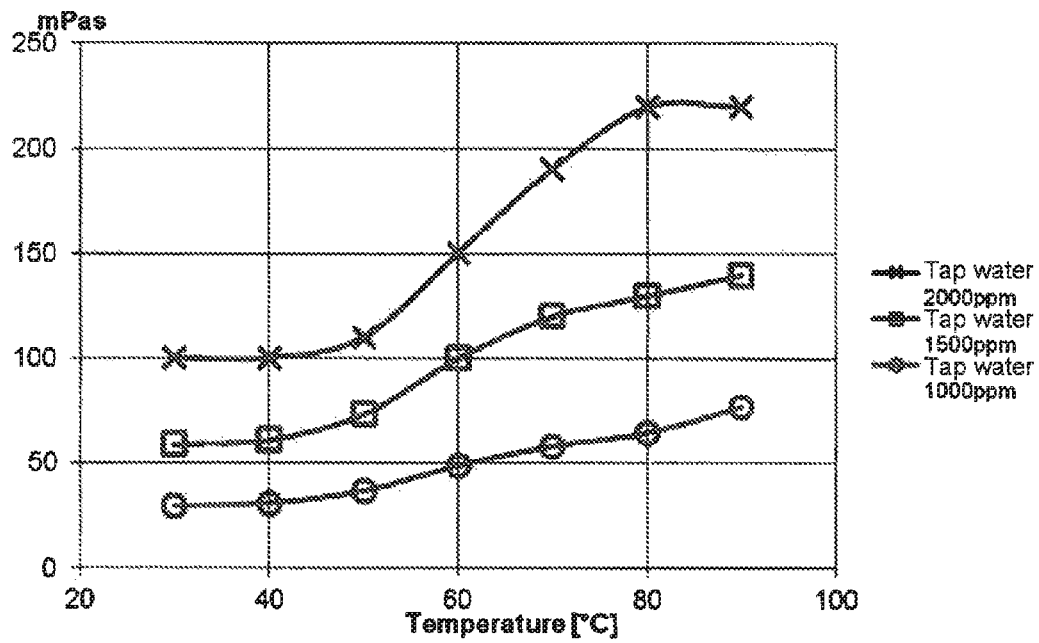
Figure 9b: Viscosity of solutions of copolymer 7 in tap water at various temperatures and concentrations

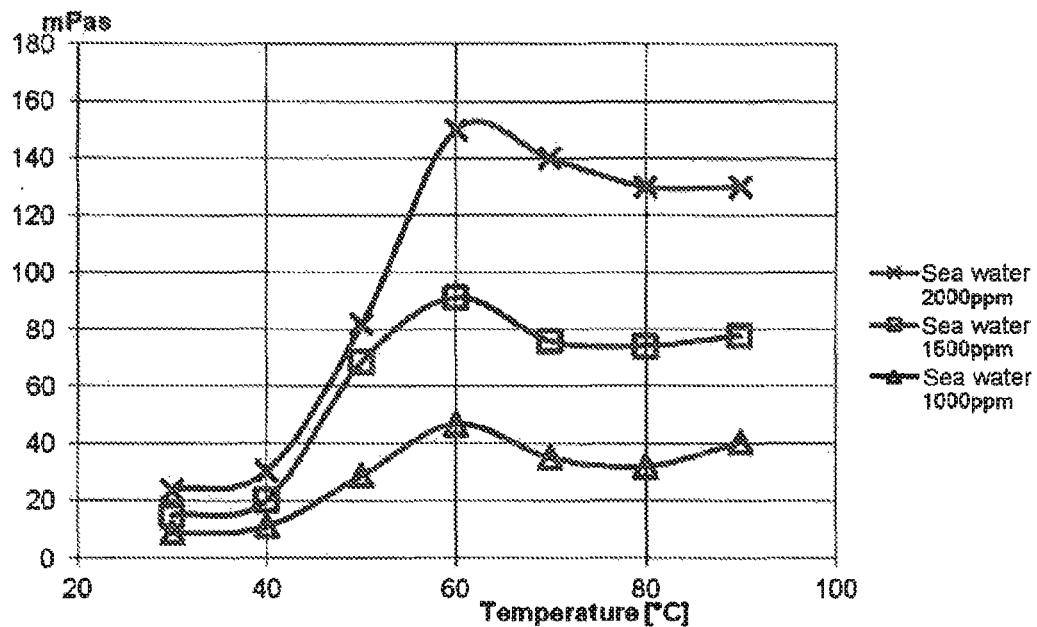
Figure 9c: Viscosity of solutions of copolymer 7 in sea water at various temperatures and concentrations
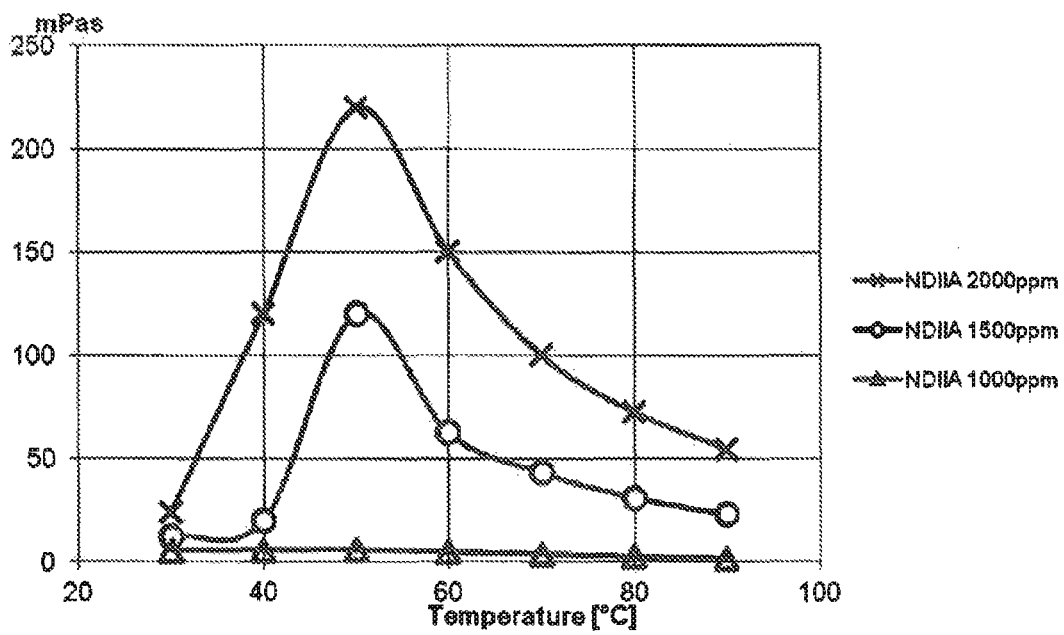
Figure 9d: Viscosity of solutions of copolymer 7 in deposit water at various temperatures and concentrations

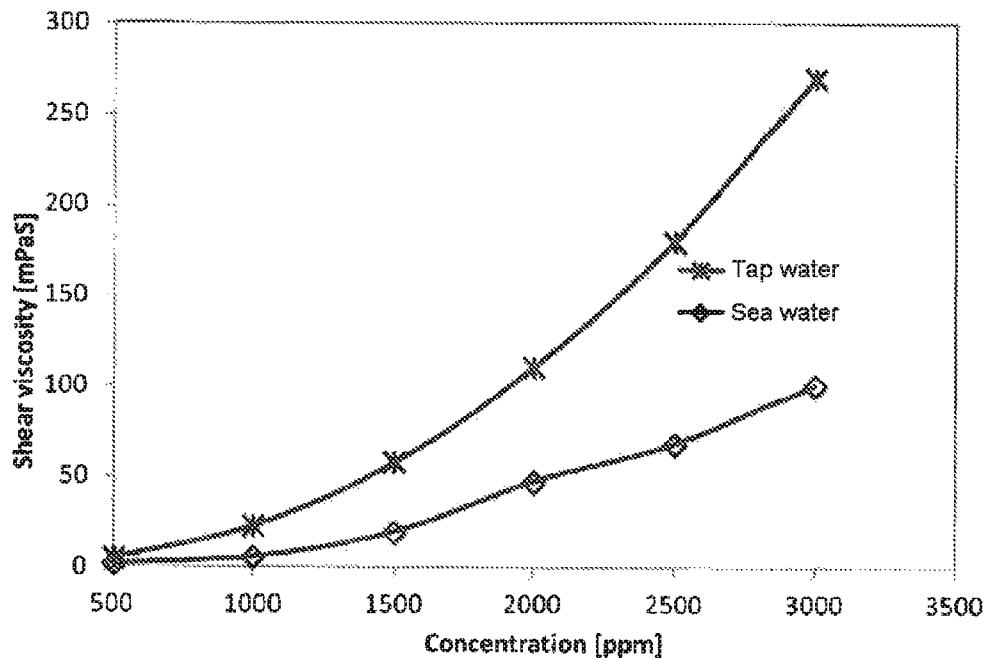
Figure 10a: Viscosity of copolymer V5 at 60°C at various concentrations in sea water and tap water.
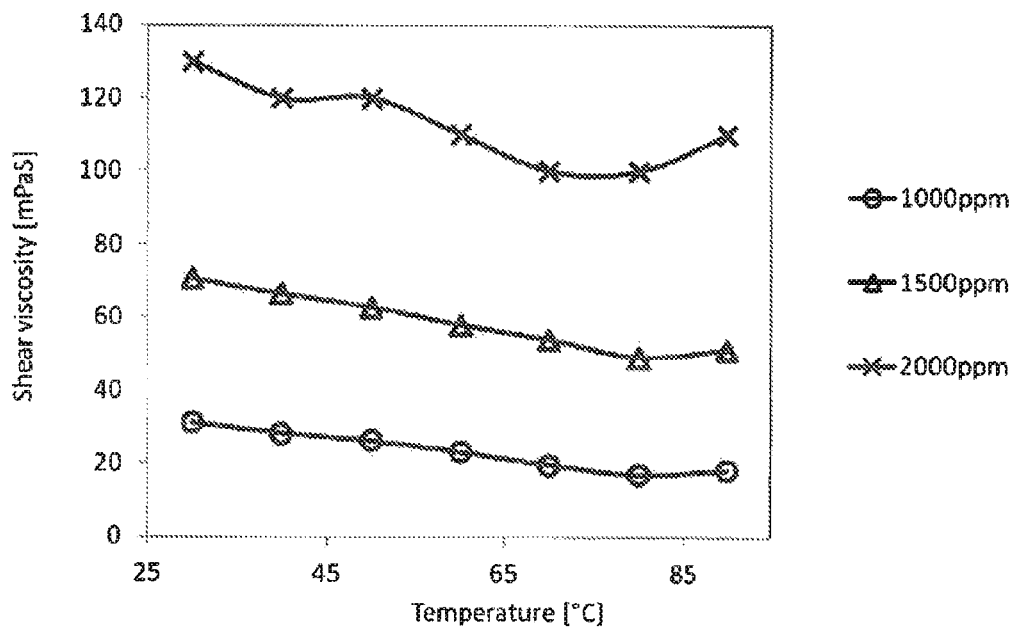
Figure 10b: Viscosity of solutions of copolymer V5 in tap water at various temperatures and concentrations

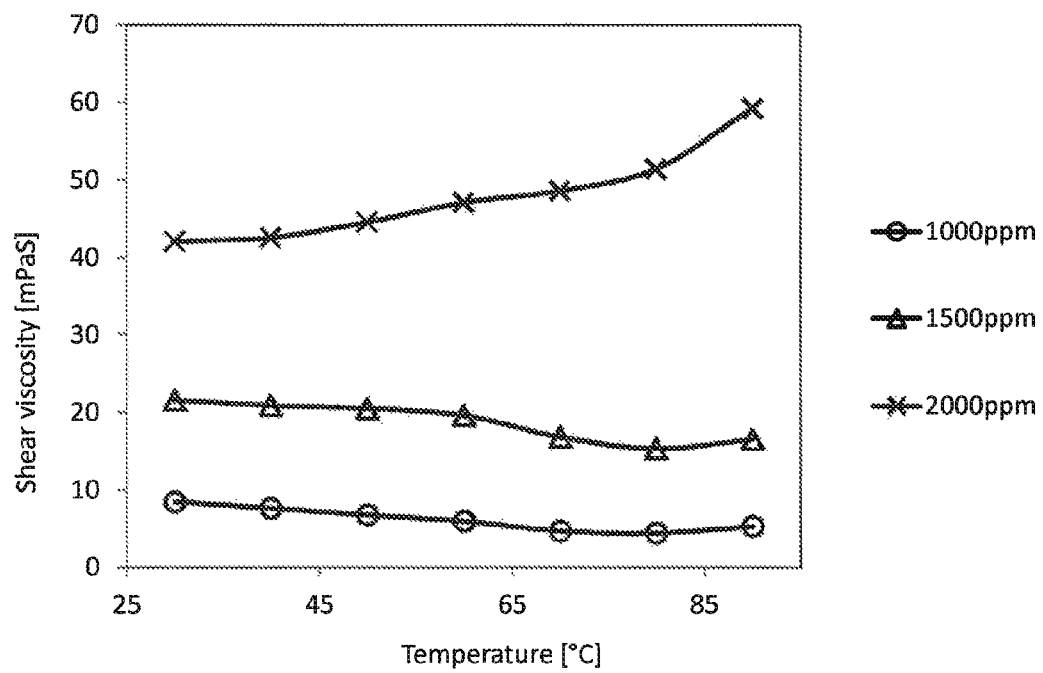
Figure 10c: Viscosity of solutions of copolymer V5 in sea water at various temperatures and concentrations

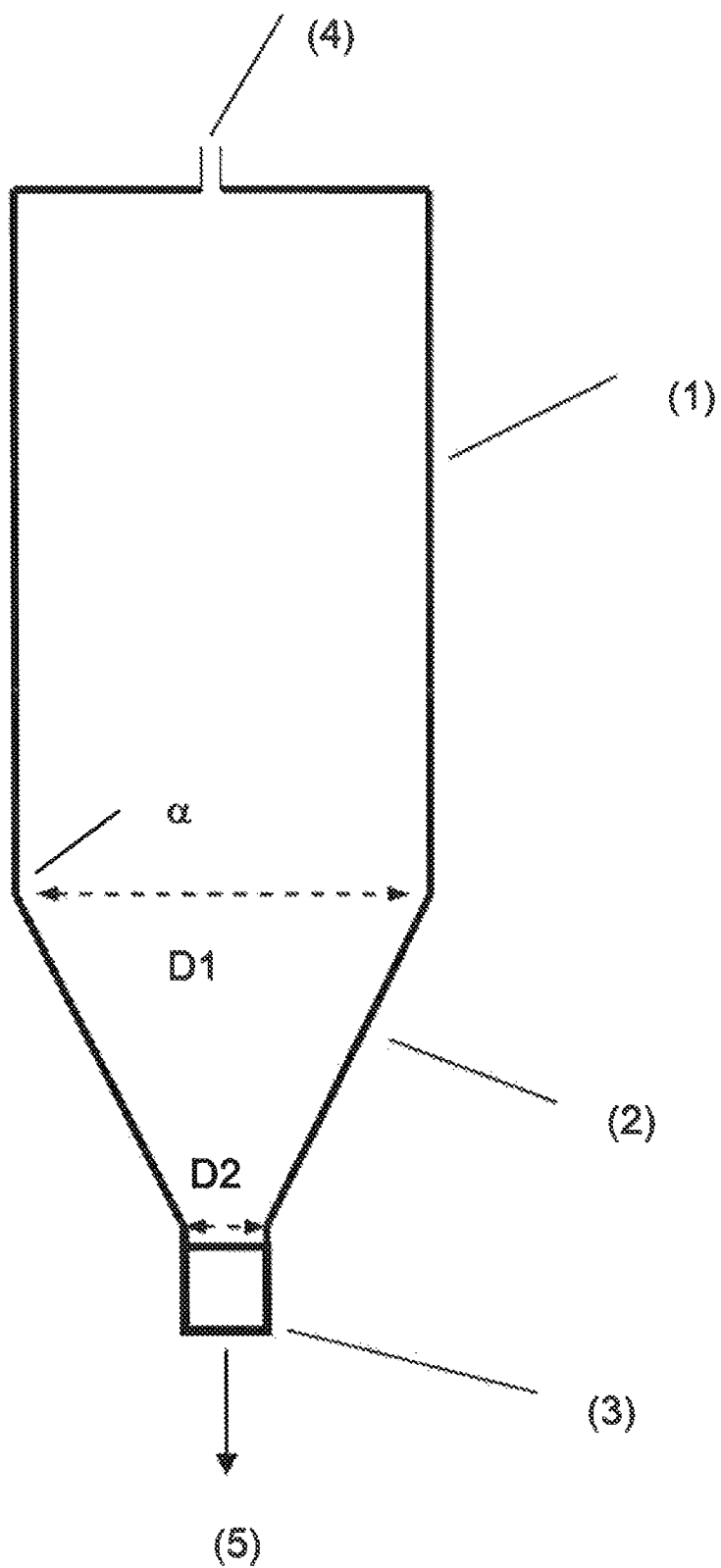
Figure 11: Partly conical reactor

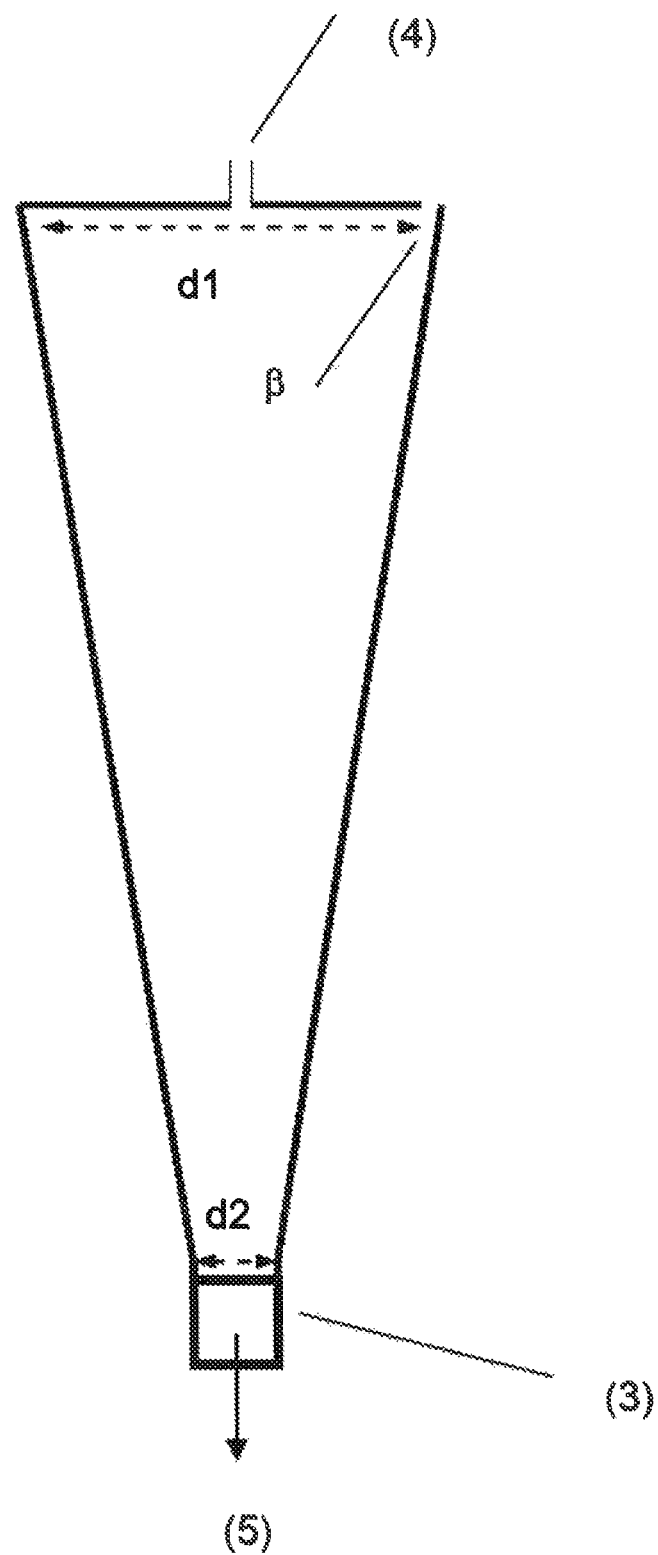
Figure 12: Fully conical reactor

METHOD FOR RECOVERING PETROLEUM

CROSS-REFERENCE TO RELATED APPLICATIONS

This application is a national stage application (under 35 U.S.C. §371) of PCT/EP2014/076772, filed Dec. 5, 2014, which claims benefit of European Application No. 13197065.9, filed Dec. 13, 2013, both of which are incorporated herein by reference in their entirety.

The present invention relates to a process for producing mineral oil from underground mineral oil deposits, in which an aqueous formulation comprising at least one water-soluble, hydrophobically associating copolymer is injected through at least one injection well into a mineral oil deposit having a deposit temperature of 20° C. to 120° C. and crude oil is withdrawn from the deposit through at least one production well, wherein the water-soluble copolymer comprises at least acrylamide and/or derivatives thereof and a mixture comprising at least two amphiphilic macromonomers.

In natural mineral oil deposits, mineral oil is present in the cavities of porous reservoir rocks sealed toward the surface of the earth by impervious overlying strata. The cavities may be very fine cavities, capillaries, pores or the like. Fine pore necks may have, for example, a diameter of only about 1 µm. As well as mineral oil, including fractions of natural gas, a deposit generally also comprises water of greater or lesser salt content.

If a mineral oil deposit has a sufficient autogenous pressure, after drilling of the deposit has commenced, mineral oil flows through the well to the surface of its own accord because of the autogenous pressure (primary mineral oil production). Even if a sufficient autogenous pressure is present at first, however, the autogenous pressure of the deposit generally declines relatively rapidly in the course of withdrawal of mineral oil, and so usually only small amounts of the amount of mineral oil present in deposit can be produced in this manner, according to the deposit type.

Therefore, when primary production declines, a known method is to drill further wells into the mineral oil-bearing formation in addition to the wells which serve for production of the mineral oil, called the production wells. Through these so-called injection wells, water is injected into the deposit in order to maintain the pressure or increase it again. The injection of the water forces the mineral oil through the cavities in the formation, proceeding gradually from the injection well in the direction of the production well. This technique is known as water flooding and is one of the techniques of what is called secondary oil production. In water flooding, however, there is always the risk that the mobile water will not flow homogeneously through the formation and in doing so mobilize oil, but will flow from the injection well to the production well, particularly along paths with a low flow resistance, without mobilizing oil, while there is only little flow, if any, through regions in the formation with high flow resistance. This is discerned from the fact that the proportion of the water which is produced via the production well increases ever further. By means of primary and secondary production, generally not more than about 30 to 35% of the amount of mineral oil present in the deposit can be produced.

A known method is to use techniques for tertiary mineral oil production (also known as "Enhanced Oil Recovery (*EOR*)") to enhance the oil yield, if economically viable production is impossible or no longer possible by means of primary or secondary mineral oil production. Tertiary mineral oil production includes processes in which suitable chemicals, such as surfactants and/or polymers, are used as auxiliaries for oil production. A review of tertiary oil production using chemicals can be found, for example, in the article by D. G. Kessel, *Journal of Petroleum Science and Engineering*, 2 (1989) 81-101.

The techniques of tertiary mineral oil production include what is called "polymer flooding". Polymer flooding involves injecting an aqueous solution of a thickening polymer into the mineral oil deposit through the injection wells, the viscosity of the aqueous polymer solution being matched to the viscosity of the mineral oil. Through the injection of the polymer solution, the mineral oil, as in the case of water flooding, is forced through said cavities in the formation from the injection well proceeding in the direction of the production well, and the mineral oil is produced through the production well. By virtue of the polymer formulation having about the same viscosity as the mineral oil, the risk that the polymer formation will break through to the production well with no effect is reduced. Thus, the mineral oil is mobilized much more homogeneously than when water, which is mobile, is used, and additional mineral oil can be mobilized in the formation. Details of polymer flooding and of polymers suitable for this purpose are disclosed, for example, in "*Petroleum, Enhanced Oil Recovery*, Kirk-Othmer, *Encyclopedia of Chemical Technology, Online Edition*, John Wiley & Sons, 2010".

A known method is to use hydrophobically associating copolymers for polymer flooding. "Hydrophobically associating copolymers" are understood by the person skilled in the art to mean water-soluble polymers having lateral or terminal hydrophobic groups, for example relatively long alkyl chains. In aqueous solution, hydrophobic groups of this kind can associate with one another or with other substances having hydrophobic groups. This forms an associative network which causes an (additional) thickening effect. Details of the use of hydrophobically associating copolymers for tertiary mineral oil production are described, for example, in the review article by Taylor, K. C. and Nasr-El-Din, H. A. in J. Petr. Sci. Eng. 1998, 19, 265-280.

WO 85/03510 A1 discloses water-soluble, hydrophobically associating copolymers having a weight-average molecular weight $M_w$ of 800 000 g/mol to 3 million g/mol and the use thereof for tertiary mineral oil production. The copolymers comprise 40 to 99.9 mol % of acrylamide, 0 to 50 mol % of acrylic acid and 0.1 to 10 mol % of the macromonomer $H_2C=CH-COO-(EO)_{5-40}$—R where EO represents ethyleneoxy groups and R is an alkyl radical having 8 to 16 carbon atoms.

WO 2006/002936 A1 discloses water-soluble copolymers consisting of (meth)acrylamide, (meth)acrylamide modified with sulfo groups, for example ATBS, and allyl ethers or acrylates comprising polyalkoxy groups. The polyalkoxy groups may comprise a terminal hydrocarbyl group having 10 to 40 carbon atoms. The document further discloses the use of such copolymers as an additive for aqueous building materials systems, for example cement, lime or gypsum.

WO 2010/133527 A2 discloses hydrophobically associating copolymers and the use thereof for tertiary mineral oil production. The copolymers comprise 25 to 99.9% by weight of monoethylenically unsaturated, hydrophilic monomers, for example acrylamide or acrylic acid, and 0.1 to 20% by weight of at least one macromonomer of the general formula $H_2C=CH-R-O-(EO)_{10-150}(AO)_{5-15}R'$ where EO represents ethyleneoxy groups, AO represents alkyleneoxy groups having at least 4 carbon atoms, R is a linking group and R' is H or a hydrocarbyl radical having 1 to 30 carbon atoms. WO 2011/015520 A1 discloses a process for preparing hydrophobically associating copolymers of this kind by polymerization in aqueous solution in the presence of surfactants.

WO 2012/069477 A1 discloses a process for tertiary mineral oil production from mineral oil formations having a deposit temperature of 35 to 120° C., preferably 40° C. to 90° C., in which a hydrophobically associating copolymer comprising 0.1 to 15% by weight of the above-described macromonomer $H_2C=CH-R-O-(EO)_{10-150}(AO)_{5-15}R'$ and 85 to 99.9% by weight of acrylamide or acrylamide derivatives and monoethylenically unsaturated monomers having COOH, $SO_3H$ or $PO_3H_2$ groups is used. EO, AO, R and R' are each as defined above. The weight-average molecular weight $M_w$ of the copolymer is 1 million to 3 million g/mol. Particular preference is given to a copolymer comprising acrylamide, 2-acrylamido-2-methylpropanesulfonic acid (ATBS) and said macromonomer.

WO 2012/069478 A1 discloses a process for tertiary mineral oil production, in which the copolymer described by WO 2012/069477 A1 is used. The formulation used has a viscosity of at least 5 mPas and is injected into the formation at a shear rate of at least 30 000 $s^{-1}$.

Our prior European application WO 2014/095608 A1 discloses a process for preparing macromonomers $H_2C=CH-R-O-(EO)_{10-150}(AO)_{5-25}(EO)_{0-15}R'$ where EO represents ethyleneoxy groups, AO represents alkyleneoxy groups having at least 4 carbon atoms, R is a linking group and R' is H or a hydrocarbyl radical having 1 to 4 carbon atoms. In the process, an alcohol $H_2C=CH-R-OH$ s ethoxylated and alkoxylated using a basic catalyst comprising KOMe and/or NaOMe, the alkoxylation with alkylene oxides being conducted at a temperature of less than or equal to 135° C. and the amount of $K^+$ ions being not more than 0.9 mol % based on the alcohol. This affords macromonomers having particularly low proportions of crosslinking by-products. The application further discloses a macromonomer obtainable by means of the process, copolymers comprising the macromonomer, and the use thereof for oilfield applications.

Our prior European application WO 2014/095621 A1 discloses hydrophobically associating copolymers comprising 25 to 99.9% by weight of at least one hydrophilic monomer, for example acrylamide and/or acrylic acid, and 0.1 to 20% by weight of at least one macromonomer $H_2C=CH-R-O-(EO)_{23-26}(CH_2CH(R''))_{8.15-17.25}(EO)_{0-15}R'$ where EO represents ethyleneoxy groups, R is a linking group, R' is H or a hydrocarbyl radical having 1 to 4 carbon atoms, and R" is a hydrocarbyl radical having at least 2 carbon atoms, with the proviso that the sum total of the carbon atoms in all the R" radicals is 25.5 to 34.5. This macromonomer is obtainable by means of the process described in 12197538.7, and the polymerization is conducted in the presence of a non-polymerizable, surface-active component. 12197504.9 further discloses the use of copolymers of this kind for tertiary mineral oil production, but does not disclose any details of EOR processes. Because of the use of macromonomers having particularly low proportions of crosslinking by-products, copolymers having very low gel contents are obtained.

Polymer flooding is an industrial scale process. The polymers used are used only as dilute solutions, but the volumes injected per day are high and the injection is typically continued over months up to several years. The polymer requirement for an average oilfield may quite possibly be 5000 to 10 000 t of polymer per year. For an economically viable process, maximum viscosity efficiency, i.e. viscosity per mole, is of great significance. Even a small improvement in the viscosity efficiency can lead to a significant improvement in economic viability.

Aqueous solutions of the associative copolymers according to WO 2012/069477 A1 having the macromonomers $H_2C=CH-R-O-(EO)_{10-150}(AO)_{5-15}R'$ have a characteristic viscosity profile as a function of temperature. FIGS. 1a and 1b of the present application each show the dependence of the viscosity of aqueous solutions of various copolymers on the temperature, specifically the viscosity of two commercial, non-associative copolymers, namely a copolymer of about 50% by weight of acrylamide and about 50% by weight of sodium-ATBS (copolymer V3) (ATBS=sodium salt of 2-acrylamido-2-methylpropanesulfonic acid), a copolymer of 75 mol % of acrylamide and 25 mol % of sodium acrylate (copolymer V4), and additionally an associative copolymer of about 50% by weight of acrylamide, about 48% by weight of sodium-ATBS and 2% by weight of said macromonomer (copolymer V1). In the case of the two commercial, non-associative copolymers, the viscosity decreases with increasing temperature. In the case of the associative copolymer, the viscosity of aqueous solutions increases significantly at first, passes through a maximum at about 60° C. and then decreases again. Aqueous solutions of the associative copolymers according to WO 2012/069477 A1 thus have a high viscosity efficiency in the region of 60° C., and therefore allow particularly economically viable performance of polymer flooding in deposits with deposit temperatures around 60° C.

However, there are deposits with even higher deposit temperatures. In the case of polymer flooding in such deposits using the copolymers described, viscosity efficiency deteriorates. It would therefore be desirable to have available thickening copolymers which can be used with a high viscosity efficiency even at higher deposit temperatures.

There is a very particular need to improve acrylamide-sodium acrylate copolymers. Copolymers comprising sulfo groups, for example copolymers comprising ATBS, have much higher viscosities when used in a saline environment, very particularly when used in a high-salinity environment, than copolymers comprising acrylic acid. From a purely technical point of view, therefore, copolymers comprising ATBS are preferable to those comprising acrylic acid. Disadvantageously, however, the ATBS monomer is much costlier than acrylic acid. Acrylamide-sodium acrylate copolymers are accordingly still frequently employed in polymer flooding for economic reasons, at least in deposits having not too high a salinity. It would therefore be desirable to have available thickening polymers of the acrylamide-sodium acrylate type having a distinctly improved viscosity efficiency.

It was therefore an object of the Invention to provide improved thickening polymers for use in polymer flooding.

Accordingly, a process has been found for producing mineral oil from underground mineral oil deposits, in which an aqueous formulation comprising at least one thickening, water-soluble copolymer (P) is injected into a mineral oil deposit through at least one injection well and crude oil is withdrawn from the deposit through at least one production well, said water-soluble copolymer (P) comprising at least
    (A) 30 to 99.99% by weight of at least one uncharged, monoethylenically unsaturated, hydrophilic monomer (A) selected from the group of (meth)acrylamide, N-methyl(meth)acrylamide, N,N'-dimethyl(meth)acrylamide and N-methylol(meth)acrylamide, and (B) 0.01 to 15% by weight of at least one monoethylenically unsaturated macromonomer (B) at least comprising—as well as the monoethylenically unsaturated group—a hydrophilic group and a hydrophobic group, and wherein at least one macromonomer (B) is a mixture comprising macromonomers (B1) and (B2) of the general formulae (B1) $H_2C=C(R^1)-R^2-O-(R^3O)_a-(R^4O)_b-[-(R^4O)_c(R^5O)_d]-H$ (I)

and (B2) $H_2C=C(R^1)-R^2-O-(R^3O)_a-(R^4O)_b-H$ (II), where the stated amounts of the monomers are each based on the total amount of all the monomers in the copolymer (P), the molar proportion x of the macromonomers (B1) based on the sum total of (B1) and (B2) is 0.1 to 0.99, and where the radicals and indices are each defined as follows:

$R^1$: H or methyl,
$R^2$: a single bond or a divalent linking group —$OR^{35}$— where $R^{35}$ is an alkylene group having 1 to 6 carbon atoms,
$R^3$: independently ethylene groups —$CH_2CH_2$—, 1,2-propylene groups or alkylene groups $R^4$, with the proviso that at least 90 mol % of the $R^3$ radicals are ethylene groups,
$R^4$: independently alkylene groups —$CR^6(R^7)$—$CR^8(R^9)$— where the $R^6$, $R^7$, $R^8$ and $R^9$ radicals are each independently H or a linear or branched alkyl radical having 1 to 8 carbon atoms, with the proviso that not all radicals are H and the sum total of the carbon atoms in the $R^6$, $R^7$, $R^8$ and $R^9$ radicals is 2 to 8,
$R^5$ an ethylene group —$CH_2CH_2$—,
a a number from 10 to 35,
b a number from 5 to 30,
c a number from 0 to 2,
d a number from 1 to 15
and where, in addition,
the copolymer has a weight-average molecular weight $M_w$ of $1*10^6$ g/mol to $30*10$ g/mol,
the amount of the copolymer in the aqueous formulation is 0.02 to 2% by weight, and
the temperature of the mineral oil deposit is 20° C. to 120° C.

In one embodiment of the Invention, copolymers additionally comprising monomers comprising —$SO_3H$ groups are used.

In one embodiment of the Invention, copolymers additionally comprising monomers comprising —COOH groups are used.

In one embodiment of the invention, copolymers additionally comprising monomers comprising —$SO_3H$ groups and —COOH groups are used.

It has been found that, surprisingly, the short, terminal poly(ethylene oxide/alkylene oxide) block in the macromonomer (B1) does not significantly impair the association of the copolymers in aqueous solution, but rather, on the contrary, leads to copolymers having an improved profile of properties, which are of particularly good suitability for tertiary oil production.

In a second aspect of the invention, water-soluble copolymers (P) of the above-described composition have been found.

In a third aspect of the invention, a process for preparing such copolymers (P) has been found.

With regard to the invention, the following should be stated specifically:

Water-Soluble Copolymers (P)

For the process according the invention for mineral oil production, an aqueous formulation of at least one thickening, water-soluble copolymer (P) is used, injected into a mineral oil deposit through an injection well and crude oil withdrawn from the deposit through at least one production well. A process of this kind is also referred to as "polymer flooding".

The inventive copolymer (P), or that used in accordance with the Invention, is a hydrophobically associating copolymer. The term "hydrophobically associating copolymer" is known in principle to those skilled in the art. This comprises water-soluble copolymers which have hydrophobic groups as well as hydrophilic molecular moieties. In aqueous solution, the hydrophobic groups can associate with one another or with other substances having hydrophobic groups on the basis of intermolecular forces. This gives rise to a polymeric network linked by intermolecular forces, which enhances the viscosity-increasing action of the copolymers.

Ideally, the copolymers used in accordance with the invention should be miscible with water in any ratio. However, it is sufficient for the invention when the copolymers are water-soluble at least at the desired use concentration and at the desired pH. In general, the solubility in water at room temperature under the use conditions should be at least 25 g/l.

According to the invention, the water-soluble, hydrophobically associating copolymer comprises 30 to 99.99% by weight of at least one uncharged, monoethylenically unsaturated, hydrophilic monomer (A), preferably acrylamide, and 0.01 to 15% by weight of at least one monoethylenically unsaturated, amphiphilic macromonomer (B) comprising—as well as the monoethylenically unsaturated group—a hydrophilic group and a hydrophobic group. In addition, it is of course also possible for further ethylenically unsaturated monomers, especially mono-ethylenically unsaturated monomers, to be present.

By means of further monomers, it is possible to modify the properties of the water-soluble copolymers and match them to the desired end use. The person skilled in the art will make a suitable selection with regard to further ethylenically unsaturated monomers according to the desired properties of the polymer.

Further ethylenically unsaturated monomers are especially hydrophilic monoethylenically unsaturated monomers, preferably those selected from the group of hydrophilic anionic monoethylenically unsaturated monomers (C) comprising at least one acidic group or salts thereof, and hydrophilic cationic monoethylenically unsaturated monomers (D) comprising at least one ammonium group.

Monomers (A)

According to the invention, the copolymer (P) comprises at least one uncharged, monoethylenically unsaturated, hydrophilic monomer (A) selected from a group of (meth)acrylamide, N-methyl(meth)acrylamide, N,N'-dimethyl(meth)acrylamide or N-methylol(meth)acrylamide. Preference is given to (meth)acrylamide, especially to acrylamide. If mixtures of the various monomers (A) are used, at least 50 mol % of the monomers (A) should be (meth)acrylamide, preferably acrylamide.

According to the invention, the amount of the monomers (A) is 30 to 99.99% by weight based on the sum total of all the monomers in the copolymer (P), preferably 30 to 99.9% by weight, especially 35% by weight to 99.5% by weight, and, for example, 45 to 99.5% by weight.

Macromonomers (B)

The copolymer (P) comprises at least one amphiphilic, monoethylenically unsaturated macromonomer (B) comprising—as well as the monoethylenically unsaturated group—a hydrophilic group Y and a hydrophobic group Z. Optionally, a spacer X may also be present between the monoethylenic group and the Y group. The macromonomers B may especially have the following structure: $H_2C=C(R^1)$—X—Y—Z or $H_2C=C(R^1)$—Y—Z.

According to the invention, at least one of the macromonomers (B) is a mixture at least comprising macromonomers (B1) and (B2) of the general formulae (B1) $H_2C=C(R^1)$—$R^2$—O—$(R^3O)_a$—$(R^4O)_b$—[—$(R^4O)_c(R^5O)_d$]—H     (I)

and (B2) $H_2C=C(R^1)$—$R^2$—O—$(R^3O)_a$—$(R^4O)_b$—H     (II).

The radicals and indices in these formulae (I) and (II) are each as defined below.

$R^1$ is H or a methyl group, preferably H.

$R^2$ is a single bond or preferably a divalent linking group —$OR^{35}$— where $R^{35}$ is a linear or branched alkylene group having 1 to 6 carbon atoms. Preferably, $R^6$ is a linear 1,ω-alkylene group —$(CH_2)_k$— where k is 1 to 6, preferably 3 to 6 and more preferably 4.

The $R^3$ radicals are each independently ethylene groups —$CH_2CH_2$—, 1,2-propylene groups —$CH_2CH(CH_3)$— or 1,2-alkylene groups $R^4$, with the proviso that at least 90 mol % of the $R^3$ radicals are ethylene groups. Preferably at least 95 mol % of the $R^3$ radicals are ethylene groups, and the $R^3$ radicals are most preferably exclusively ethylene groups. —$(R^3O)_a$— is thus a block which consists essentially of ethyleneoxy groups and may additionally optionally comprise small amounts of higher alkyleneoxy groups.

The index a is a number from 10 to 35, preferably 15 to 30, more preferably 20 to 28 and, for example, 23 to 26.

The $R^4$ radicals are each independently alkylene groups —$CR^6R^7$—$CR^8R^9$— where the $R^6$, $R^7$, $R^8$ and $R^9$ radicals are each independently H or a linear or branched alkyl radical having 1 to 8 carbon atoms, preferably 1 to 3 carbon atoms, with the proviso that not all the radicals are H and the sum total of the carbon atoms in the $R^6$, $R^7$, $R^8$ and $R^9$ radicals is 2 to 8, preferably 2 or 3. The radicals may, for example, be methyl, ethyl or propyl radicals. —$(R^4O)_b$— is thus a block of alkyleneoxy groups comprising at least 4 carbon atoms.

In one embodiment of the invention, 2 or 3, preferably 3, of the $R^6$, $R^7$, $R^8$ and $R^9$ radicals in each of the $R^4$ radicals are H. In one embodiment, 2 or 3, preferably 3, of the $R^6$, $R^7$, $R^8$ and $R^9$ radicals in each of the $R^4$ radicals are H, where the sum total of the carbon atoms in the $R^6$, $R^7$, $R^8$ and $R^9$ radicals is 2 or 3 In each case.

In one embodiment of the Invention, the sum total of carbon atoms in the $R^6$, $R^7$, $R^8$ and $R^9$ radicals is 2 in each case, where $R^6$, $R^7$ and $R^8$ are H and $R^9$ is ethyl in at least 70 mol %, preferably at least 80 mol % and more preferably at least 95 mol % of the —$CR^6R^7CR^8R^9$— units. In this embodiment, —$R^4O$— thus comprises butyleneoxy groups, preferably butyleneoxy groups derived essentially from 1,2-butene oxide.

In one embodiment of the invention, the sum total of the carbon atoms in the $R^6$, $R^7$, $R^8$ and $R^9$ radicals is 3 in each case, where $R^6$, $R^7$ and $R^8$ are H and $R^9$ is n-propyl in at least 70 mol %, preferably at least 80 mol % and more preferably at least 95 mol % of the —$CR^6R^7CR^8R^9$— units. In this embodiment, —$R^4O$— thus comprises pentyleneoxy groups, more preferably pentyleneoxy groups derived essentially from 1,2-pentene oxide.

The index b is a number from 5 to 30, especially 5 to 25, preferably 7 to 25, more preferably 8 to and, for example, 8 to 18 or, for example, 12 to 20.

$R^5$ is an ethylene group —$CH_2CH_2$—.

In the above formula (I), —$[(R^4O)_c(R^5O)_d]$— is an alkylene oxide block comprising ethyleneoxy units —$R^5O$— and optionally alkyleneoxy units —$R^4O$— as defined above, where the —$R^5O$— and —$R^4O$-units are generally arranged randomly, but may also be arranged in blocks or in alteration.

The index c is a number from 0 to 2, especially 0 to 1.5 and, for example, 0.1 to 1.

The index d is a number from 1 to 15, preferably 1.5 to 10 and more preferably 2 to 5.

In formula (I), the —$(R^3O)_a$—, —$(R^4O)_b$— and —$[(R^4O)_c(R^5O)_d]$— groups are in the sequence shown in formula (I) and, in formula (II), the —$(R^3O)_a$— and —$(R^4O)_b$— groups are in the sequence shown in formula (II).

It will be apparent to the person skilled in the art in the field of polyalkoxylates that a distribution of chain lengths is obtained in an alkoxylation, and that the indices a, b, c and d are averages over all the molecules. The indices a, b, c and d are accordingly not natural numbers but rational numbers.

For the macromonomer (B1) this means, for example, that, even in the case of values of c>0 in the mixture, macromonomers not having any $R^4O$ units are present, while other macromonomers (B1) have one or even more than one $R^4O$ unit.

According to the invention, the molar proportion x of the macromonomers (B1) based on the sum total of (B1) and (B2) is 0.1 to 0.99, especially 0.3 to 0.99, preferably 0.3 to 0.95, more preferably 0.45 to 0.9, even more preferably 0.5 to 0.9 and, for example, 0.5 to 0.8.

In a preferred embodiment of the invention, the number b+c of the $R^4O$ radicals present is selected with the proviso that the sum total of all the carbon atoms in all the $R^6$, $R^7$, $R^8$ and $R^9$ radicals present together is 25 to 50, preferably 28 to 46. In other words, in this embodiment, the more carbon atoms are present in the alkyleneoxy units $R^4O$, the smaller the number of $R^4O$ radicals.

In a further embodiment of the invention, 2 or 3, preferably 3, of the $R^6$, $R^7$, $R^8$ and $R^9$ radicals in $R^4$ is H, where the sum total of the carbon atoms in the $R^6$, $R^7$, $R^8$ and $R^9$ radicals is 2 or 3, where the number b+c of the $R^4O$ radicals present is selected with the proviso that the sum total of all the carbon atoms in all the $R^6$, $R^7$, $R^8$ and $R^9$ radicals present together is 25 to 50, preferably 28 to 46.

In a preferred embodiment of the invention, the macromonomers (B) are macromonomers (B1) and (B2) in which $R^3$ represents ethylene groups and the sum total of the carbon atoms in the $R^6$, $R^7$, $R^8$ and $R^9$ radicals is 2, where $R^6$, $R^7$ and $R^8$ are H and $R^9$ is ethyl in at least 70 mol %, preferably at least 80 mol % and more preferably at least 95 mol % of the —$CR^6R^7CR^8R^9$— units. In other words, the $R^4$ radicals are butylene groups. In addition, a is a number from 20 to 28, preferably 23 to 26, b is a number from 10 to 25, preferably 14 to 23, more preferably 14 to 20, most preferably 14 to 18, c is 0 to 1.5, preferably 0.5 to 1.5, d is a number from 1.5 to 10, preferably 1.5 to 5. The molar proportion x of the macromonomers (B1) in this embodiment is especially 0.3 to 0.95, preferably 0.45 to 0.9, based on the sum total of the monomers (B1) and (B2) together.

In a further embodiment of the invention, the macromonomers (B) are macromonomers (B1) and (B2) in which $R^3$ represents ethylene groups and the sum total of the carbon atoms in the $R^6$, $R^7$, $R^8$ and $R^9$ radicals is 3, where $R^6$, $R^7$ and $R^8$ are H and $R^9$ is n-propyl in at least 70 mol %, preferably at least 80 mol % and more preferably at least 95 mol % of the —$CR^6R^7CR^8R^9$— units. In other words, the $R^4$ radicals are pentylene groups. In addition, a is a number from 20 to 28, preferably 23 to 26, b is a number from 5 to 16, preferably 8 to 12, c is 0 to 1.5, preferably 0.5 to 1.5, d is a number from 1.5 to 10, preferably 1.5 to 5. The molar proportion x of the macromonomers (B1) in this embodiment is especially 0.3 to 0.95, preferably 0.45 to 0.9, based on the sum total of the monomers (B1) and (B2) together.

As well as the macromonomers (B1) and (B2), it is of course also possible for further, different macromonomers comprising amphiphilic, hydrophobic and hydrophilic groups to be present. Macromonomers of this kind are known in principle to those skilled in the art. These may especially be derivatives of acrylamide, acrylic acid, maleic acid, vinyl or allyl units. Examples include especially macromonomers based on (meth)acrylic acid of the general formula $H_2C=C(R^{18})$—COO—$(CH_2CH_2O)_l$—$R^{19}$ where $R^{18}$ is H or methyl, l is a number from 5 to 50 and $R^{19}$ is a hydrocarbyl group having 8 to 36 carbon atoms. Further examples include cationic monomers of the general formula $H_2C=C(R^{18})$—CO—NH—$R^{36}$—$N^+(CH_3)_2R^{37}X^-$ where $R^{36}$ is an alkylene group having 2 to 6 carbon atoms, preferably a 1,ω-alkylene group having 2 to 6 carbon atoms, $R^{37}$ is a hydrocarbyl group having 8 to 30 carbon atoms and $X^-$ is an anion.

If further macromonomers (B) are present as well as the macromonomers (B1) and (B2), the proportion of (B1) and (B2) should be at least 50% by weight based on the sum total of all the macromonomers used, preferably at least 80% by weight. More preferably, exclusively macromonomers (B1) and (B2) are present.

According to the invention, the amount of the macromonomers (B), preferably the total amount of (B1) and (B2), is 0.01 to 15% by weight based on the sum total of all the monomers in the copolymer (P), preferably 0.1 to 10% by weight, more preferably 0.5 to 8% by weight, even more preferably 0.8 to 5% by weight and, for example, 1 to 2.5% by weight.

Preparation of the Macromonomers (B1) and (B2)

The macromonomers (B1) and (B2) can be prepared in a manner known in principle by alkoxylation of a monoethylenically unsaturated alcohol of the general formula $H_2C=C(R^1)$—$R^2$—OH (III) where $R^1$ and $R^2$ are each as defined above.

The alcohol $H_2C=C(R^1)$—$R^2$—OH (III) can be alkoxylated in a three-stage process.

In a first step (S1), alkoxylation is first effected with the desired amount of ethylene oxide, optionally with a mixture of ethylene oxide, and not more than 10 mol % of higher alkylene oxides. This gives rise to an alkoxylated alcohol of the general formula $H_2C=C(R^1)$—$R^2$—O—$(R^3O)_a$—H (IV) where $R^3$ is as defined above.

In a second step (S2), the alkoxylated alcohol $H_2C=C(R^1)$—$R^2$—O—$(R^3O)_a$—H (IV) is reacted with alkylene oxides of the general formula (V)

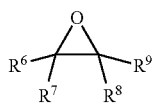

(V)

where $R^6$, $R^7$, $R^8$ and $R^9$ are each as defined at the outset. This alkoxylation gives rise to the already described macromonomer (B2) of the general formula $H_2C=C(R^1)$—$R^2$—O—$(R^3O)_a$—$(R^4O)_b$—H (II).

The macromonomer (B2) is reacted with ethylene oxide in a third step (S3), giving the above mixture comprising macromonomers (B1) and (B2).

The performance of alkoxylation, including the preparation of block copolymers from various alkylene oxides, is known in principle to those skilled in the art. It is likewise known to those skilled in the art that the molecular weight distribution of the alkoxylates and the orientation of alkylene oxide units in a polyether chain can be influenced through the reaction conditions, more particularly the choice of catalyst.

The alkoxylation can especially be undertaken by base-catalyzed alkoxylation. In the first step (S1), the alcohol used as the starting material can be admixed in a pressure reactor with alkali metal hydroxides, preferably potassium hydroxide, or with alkali metal alkoxides, for example sodium methoxide. By means of reduced pressure (for example <100 mbar) and/or an Increase in the temperature (30 to 150° C.), water still present in the mixture can be removed. Thereafter, the alcohol is in the form of the corresponding alkoxide. This is followed by inertization with inert gas (e.g. nitrogen) and, in a first step, ethylene oxide, optionally in a mixture with small amounts of propylene oxide and/or higher alkylene oxides is added stepwise at temperatures of 120 to 160° C., preferably 130 to 150° C. The addition is effected typically within 5 to 15 h, without any intervention that the invention be restricted thereto. After the addition has ended, the reaction mixture is appropriately left to react further, for example for % h to 1 h.

In a second step (S2), alkylene oxides of the general formula (IV) are subsequently metered in stepwise. The reaction temperature in the second stage can be kept the same or else altered, and it has been found to be useful not to exceed a temperature of 135° C. in the 2nd stage. At higher temperatures, there is the risk, especially in the case of relatively long reaction times, that small amounts of crosslinking by-products will be formed in the alkoxylation. By-products of this kind are extremely undesirable since they lead, in the polymerization, to a rise in gel fractions in the polymer. Since the polymer in the course of polymer flooding has to be forced through pores having a size of only few micrometers, even small gel fractions are extremely disruptive because they can lead to blockage of the formation.

In the third step (S3), ethylene oxide is added once again. S3 is especially effected without further addition of an alkaline catalyst and is performed especially at a pressure in the range from $1*10^5$ Pa to $7*10^5$ Pa, preferably from $1*10^5$ Pa to $5*10^5$ Pa, and a temperature in the range from 120° C. to 140° C., more preferably from 125 to 135° C. In particular, the ethoxylation in step S3 is effected over a period of 0.5 to 7 h, especially 0.5 to 5 h, preferably of 0.5 to 4 h.

The alkoxylation can also be undertaken by means of techniques which lead to narrower molecular weight distributions than in the base-catalyzed synthesis. For this purpose, the catalysts used may, for example, be double hydroxide clays as described in DE 43 25 237 A1. The alkoxylation can more preferably be effected using double metal cyanide catalysts (DMC catalysts). Suitable DMC catalysts are disclosed, for example, in DE 102 43 361 A1, especially paragraphs [0029] to [0041] and literature cited therein. For example, it is possible to use catalysts of the Zn—Co type.

To perform the reaction, the alcohol used as the starting material can be admixed with the catalyst, and the mixture can be dewatered as described above and reacted with the alkylene oxides as described. Typically, not more than 250 ppm of catalyst based on the mixture are used, and the catalyst can remain in the product because of this small amount.

The alkoxylation can additionally also be undertaken with acid catalysis. The acids may be Brønsted or Lewis acids. To perform the reaction, the alcohol used as the starting material can be admixed with the catalyst, and the mixture can be dewatered as described above and reacted with the alkylene oxides as described. At the end of the reaction, the acidic catalyst can be neutralized by addition of a base, for example KOH or NaOH, and filtered off if required. In the case of acid-labile vinyl ethers as alcohols of the general formula (III), an acid-catalyzed alkoxylation is usually avoided.

The outlined performance of the three steps S1, S2 and S3 affords a mixture comprising macromonomers (B1) and (B2) in the ratio already outlined. The formation of a mixture can be explained as follows: after the second alkoxylation step (S2) with alkylene oxides of the formula (V), macromonomers (B2) of the general formula $H_2C=C(R^1)$—$R^2$—O—$(R^3O)_a$—$(R^4O)_b$—H (II) are at first obtained. In formula (II), the polyoxyalkylene chain, according to the nature of the alkylene oxides used, has a secondary (or even a tertiary) alcohol group as the terminal group, namely a —$CR^6(R^7)$—$CR^8(R^9)$—OH group. The further reaction with ethylene oxide in step (S3) gives rise to molecules having terminal, primary OH groups, namely-$CR^6(R^7)$—$CR^8(R^9)$—O—$CH_2CH_2OH$. Since primary OH groups are more reactive than secondary or tertiary OH groups, the primary OH groups react preferentially with further ethylene oxide. The ethylene oxide added in step (II) thus does not react homogeneously with the macromonomers (B2) of the general formula $H_2C=C(R^1)$—$R^2$—O—$(R^3O)_a$—$(R^4O)_b$—H (II) present after step S2. If a portion of the macromonomers (B2) has first of all reacted with ethylene oxide to give $H_2C=C(R^1)$—$R^2$—O—$(R^3O)_a$—$(R^4O)_b$—$CH_2CH_2OH$, these intermediates react preferentially with further ethylene oxide. Since the amount of ethylene oxide in step S3 is relatively small, the result of this different reactivity is that a portion of the (B2) molecules do not react at all, while others react to a disproportionately high degree. Thus, if p equivalents of ethylene oxide are added and the proportion the proportion of the macromonomers (B1) in the mixture is x, the value of d=p/x can be calculated therefrom. Of course, d can also be determined analytically.

According to the reaction conditions, the alkoxylation in step (S2) proceeds to completion or does not proceed to completion, such that small amounts of the alkylene oxides (V) can remain in the reaction mixture without having reacted. This may be the case especially in the above-described preferred alkoxylation at not more than 135° C. Residues of the alkylene oxides (V) can of course be removed in a customary manner before the final ethoxylation. However, it is also possible to leave these in the product for the alkoxylation. It has been found that said residual amount of alkylene oxides (V) is distinctly reduced in the course of step S3. In other words, a portion of any alkylene oxides (V) remaining is incorporated in the terminal block —$[(R^4O)_c(R^5O)_d]$—H in the course of step S3, meaning that this may be a mixed block of alkyleneoxy units $R^4O$ and ethyleneoxy units $R^5O$. If the alkylene oxides react to completion in step S2 or are then removed in step S2, the terminal block may also be a pure ethylene oxide block, i.e. c=0.

Preferred Preparation Process for the Macromonomers (B)

In an advantageous embodiment, the macromonomers (B) can be prepared by means of the preferred process outlined below.

In this case, step S1 is performed with addition of an alkaline catalyst K1 comprising KOMe and/or NaOMe.

Step S2 is undertaken with addition of an alkaline catalyst K2, where the concentration of potassium ions in the reaction in step S2 is less than or equal to 0.9 mol %, preferably less than 0.9 mol %, preferably in the range from 0.01 to 0.9 mol %, especially preferably 0.01 to 0.5 mol %, based on the alcohol $H_2C=C(R^1)$—$R^2$—O—$(R^3O)_a$—H (IV) used, and where the reaction in step S2 is performed at a temperature of less than or equal to 135° C., preferably of less than 135° C., more preferably of less than or equal to 130° C., for example 120° C. to 130° C., giving the macromonomer (B2).

In step S3, a portion of the macromonomer (B2) is reacted with ethylene oxide, forming the mixture comprising macromonomers (B1) and (B2).

The preferred conditions specified hereinafter (e.g. pressure and/or temperature ranges) in the reactions in steps S1, S2 and S3 mean that the respective step is performed entirely or partly under the conditions specified.

Preferably, step S1 first comprises the reaction of the monoethylenically unsaturated alcohol (III) with the alkaline catalyst K1. For this purpose, the alcohol (III) used as the starting material is typically admixed with an alkaline catalyst K1 in a pressure reactor. By means of reduced pressure of typically less than 100 mbar, preferably in the range from 30 to 100 mbar, and/or an increase in the temperature, typically within the range from 30 to 150° C., water and/or low boilers still present in the mixture can be drawn off. Thereafter, the alcohol is essentially in the form of the corresponding alkoxide. Subsequently, the reaction mixture is typically treated with inert gas (e.g. nitrogen).

Preferably, step S1 comprises the addition of ethylene oxide and optionally small amounts of higher alkylene oxides to the mixture of alcohol (III) and alkaline catalyst K1. After the addition of the ethylene oxide and optionally further alkylene oxides has ended, the reaction mixture is typically left to react further. The addition, including optional decompressions (temporary reduction in the pressure from, for example, $6*10^5$ Pa to $3*10^5$ Pa absolute) and including further reaction, is effected typically over a period of 2 to 36 h, preferably of 5 to 24 h, especially preferably of 5 to 15 h, more preferably of 5 to 10 h.

Step S1 is effected typically at temperatures of 120 to 160° C., preferably of 130 to 150° C., more preferably of 140 to 150° C. More particularly, step S1 comprises the addition of the ethylene oxide and optionally small amounts of further alkylene oxides to the mixture of alcohol (III) and alkaline catalyst K1 at a temperature of 120 to 160° C., more preferably of 140 to 150° C.

Preference is given to adding the ethylene oxide and optionally small amounts of further alkylene oxides to the mixture of alcohol (III) and alkaline catalyst K1 at a pressure in the range from 1 to 7 bar, preferably in the range from 1 to 6 bar. In order to comply with the safety conditions, the addition in step S1 is performed typically at a pressure in the range from $1*10^5$ Pa to $4*10^5$ Pa, preferably $1*10^5$ Pa to $3.9*10^5$ Pa, more preferably from $1*10^5$ Pa to $3.1*10^5$ Pa or, in a further execution of the invention, from $3*10^5$ Pa to $6*10^5$ Pa. More particularly, the addition of ethylene oxide and/or the further reaction is/are performed at the above-mentioned pressures.

Preferably, step S1 comprises the addition of the ethylene oxide and optionally small amounts of further alkylene oxides to the mixture of alcohol A1 and alkaline catalyst K1 over a period of less than or equal to 36 h, preferably less than or equal to 32 h, more preferably over a period of 2 to 32 h, especially preferably over a period of 5 to 15 h, and at a pressure of less than or equal to $5*10^5$ Pa, preferably at $1*10^5$ Pa to $4*10^5$ Pa, especially preferably $1*10^5$ Pa to $3.9*10^5$ Pa. More particularly, the above-specified period includes the addition of ethylene oxide and/or the further reaction.

More particularly, the reaction of a monoethylenically unsaturated alcohol (III) with ethylene oxide and optionally small amounts of further alkylene oxides can be effected with addition of an alkaline catalyst K1 comprising KOMe (potassium methoxide) and/or sodium methoxide (NaOMe) in step S1 of the preferred process in one or more ethoxylation steps.

Particular preference is given to a process as described above, wherein step S1 comprises the following component steps:
reaction of the monoethylenically unsaturated alcohol (III) with the alkaline catalyst K1,
reaction of the mixture of alcohol (III) and catalyst K1 with a portion of the ethylene oxide and optionally small amounts of further alkylene oxides, especially 10 to 50% by weight, especially 10 to 30% by weight, of the total amount of ethylene oxide and optionally small amounts of further alkylene oxides,
an intermediate step comprising a rest phase and/or a decompression,
and the reaction with the remaining portion of the ethylene oxide and optionally small amounts of further alkylene oxides.

Further preference is given to a process as described above, wherein step S1 comprises the following component steps:
reaction of the monoethylenically unsaturated alcohol (III) with the alkaline catalyst K1,
reaction of the mixture of alcohol (Ill) and catalyst K1 with a portion of the ethylene oxide and optionally small amounts of further alkylene oxides, especially 50 to 98% by weight, especially 80 to 98% by weight, of the total amount of ethylene oxide and optionally small amounts of further alkylene oxides,
a step for removal of low boilers with decompression to a pressure of less than 100 mbar, preferably 30 to 100 mbar and/or an increase in the temperature, typically within the range from 30 to 150° C.,
reaction of the ethoxylation product obtained with the alkaline catalyst K1 and reaction of the remaining portion of the ethylene oxide with the mixture of ethoxylation product and alkaline catalyst K1.

The alkaline catalyst K1 comprises especially 10 to 100% by weight, preferably 20 to 90% by weight, of KOMe and/or NaOMe. The catalyst K1 may, as well as KOMe and/or NaOMe, comprise further alkaline compounds and/or a solvent (especially a C1 to C6 alcohol). For example, a further alkaline compound may be present, selected from alkali metal hydroxides, alkaline earth metal hydroxides, potassium C2 to C6 alkoxides, sodium C2 to C6 alkoxides (preferably ethoxide), alkaline earth metal alkoxides (especially C1 to C6 alkoxides, preferably methoxide and/or ethoxide). Preferably, the catalyst K1 comprises, as well as KOMe and/or NaOMe, at least one further alkaline compound selected from sodium hydroxide and potassium hydroxide.

In a further preferred embodiment, the alkaline catalyst K1 consists of KOMe or of a solution of KOMe in methanol (MeOH). Typically, it is possible to use a solution of 20 to 50% by weight KOMe in methanol (MeOH).

In a further preferred embodiment, the alkaline catalyst K1 consists of NaOMe or of a solution of NaOMe in methanol.

In a further preferred embodiment, the catalyst K1 consists of a mixture of KOMe and NaOMe or of a solution of KOMe and NaOMe in methanol.

It is advantageous to use the catalyst K1 in such an amount as to comply with an upper limit of 2500 ppm (approx. 0.4 mol %) of KOMe in relation to the alcohol (III) used, in order to avoid the decomposition of the monoethylenically unsaturated alcohol (III). Preferably, the concentration of potassium ions in step S1 is less than or equal to 0.4 mol % based on the total amount of the alcohol A1 used, more preferably 0.1 to 0.4 mol %.

If KOMe is added in such an amount that the concentration exceeds 0.9 mol % based on the alkoxylated alcohol (IV) (product of process step S1), KOMe is fully or partly removed prior to step S2 in the preferred process for preparing the macromonomers (B), in order to obtain a potassium ion concentration of less than 0.9 mol % in process step S2. This can be effected, for example, by isolating and optionally purifying the alkoxylated alcohol A2 after step S1.

In a further preferred embodiment, KOMe is used in such an amount that the concentration of potassium ions after the reaction in step S1 is already less than or equal to 0.9 mol % based on (IV).

Step S2 of the preferred process comprises the reaction of the alkoxylated alcohol (IV) with at least one alkylene oxide of the general formula (V) as described above, with addition of an alkaline catalyst K2 to the above-described macromonomer (B2) of the general formula $H_2C=C(R^1)-R^2-O-(R^3O)_a-(R^4O)_b-H$ (II).

Preferably, step S2 at first comprises the reaction of the alkoxylated alcohol (IV) with the alkaline catalyst K2. For this purpose, the alcohol A2 is typically admixed with the alkaline catalyst K2 In a pressure reactor. By means of a reduced pressure of typically less than 100 mbar, preferably in the range from 30 to 100 mbar, and/or an increase in the temperature, typically in the range from 30 to 150° C., it is possible to draw off water and/or low boilers still present in the mixture. Thereafter, the alcohol is substantially in the form of the corresponding alkoxide. Subsequently, the reaction mixture is typically treated with inert gas (e.g. nitrogen).

Preferably, step S2 comprises the addition of the at least one alkylene oxide (V) to the above-describe mixture of alcohol (IV) and alkaline catalyst K2. After the addition of the alkylene oxide (V) has ended, the reaction mixture is typically left to react further. The addition, including optional decompression and including further reaction, is typically effected over a period of 2 to 36 h, preferably of 5 to 30 h, especially preferably of 10 to 28 h, more preferably of 11 to 24 h.

In the preferred preparation process, the concentration of potassium ions in the reaction in step S2 is less than or equal to 0.9 mol %, preferably less than 0.9 mol %, preferably from 0.01 to 0.9 mol %, more preferably from 0.1 to 0.6 mol %, based on the alcohol (IV) used.

In a preferred embodiment, the concentration of potassium ions in the reaction in step S2 is 0.01 to 0.5 mol %, based on the alcohol (IV) used.

In a particularly preferred embodiment, the concentration of potassium ions in the reaction in step S2 is less than or equal to 0.9 mol %, preferably 0.1 to 0.5 mol %, based on the alcohol (IV) used, and the reaction in step S2 is performed at temperatures of 120 to 130° C.

The alkaline catalyst K2 preferably comprises at least one alkaline compound selected from alkali metal hydroxides, alkaline earth metal hydroxides, alkali metal alkoxides (especially C1 to C6 alkoxides, preferably methoxide and/or ethoxide), alkaline earth metal alkoxides (especially C1 to C6 alkoxides, preferably methoxide and/or ethoxide). Preferably, the catalyst K2 comprises at least one basic sodium compound, especially selected from NaOH, NaOMe, and NaOEt, more preferably NaOMe or NaOH. The catalyst K2 used may be a mixture of the alkaline compounds mentioned, the catalyst K2 preferably consisting of one of the basic compounds mentioned or mixtures of the alkaline compounds mentioned. Frequently, an aqueous solution of the alkaline compounds is used. In another preferred embodiment, the alkaline catalyst K2 consists of NaOMe or of a solution of NaOMe in methanol (MeOH). Typically, it is possible to use a solution of 20 to 50% by weight NaOMe in methanol (MeOH). Preferably, the catalyst K2 does not comprise any KOMe.

Preferably, in step S2, a catalyst K2 comprising at least one basic sodium compound, especially selected from NaOH, NaOMe, and NaOEt, is used, where the concentration of sodium ions in the reaction in step S2 is in the range from 3.5 to 12 mol %, preferably from 3.5 to 10 mol %, more preferably from 3.5 to 7 mol %, most preferably from 4 to 6 mol %, based on the alcohol (IV) used.

The reaction in step S2 is performed at a temperature of less than or equal to 135° C., preferably at less than or equal to 130° C. Preferably, the reaction in step S2 is performed at temperatures of 60 to 135° C., preferably at 100 to 135° C., more preferably at 120 to 135° C., most preferably at 120 to 130° C. More particularly, step S2 comprises the addition of at least one alkylene oxide (V) to a mixture of alcohol (IV) and alkaline catalyst K2 at a temperature of less than or equal to 135° C., preferably at less than or equal to 130° C., especially at temperatures of 100 to 135° C., preferably at 120 to 130° C.

Preferably, step S2 is performed at a pressure in the range from $1*10^5$ Pa to $6*10^5$ Pa, preferably from $1*10^5$ Pa to $3.1*10^5$ Pa. In order to comply with the safety conditions, the reaction in step S2 is performed preferably at a pressure in the region of less than or equal to $3.1*10^5$ Pa (preferably $1*10^5$ Pa to $3.1*10^5$ Pa) if the sum total of all the carbon atoms in the $R^6$, $R^7$, $R^8$ and $R^9$ radicals is 2, or at a pressure of less than or equal to 2.1 bar (preferably 1 to 2.1 bar) if the sum total of all the carbon atoms in the $R^6$, $R^7$, $R^8$ and $R^9$ radicals is more than 2. More particularly, the addition of alkylene oxide (V) and/or the further reaction are performed at the abovementioned pressure. In a further preferred embodiment, step S2 is performed within a pressure range from 3 to 6 bar absolute. In a further preferred execution, step S2 can be performed within a pressure range from $0.2*10^5$ Pa to $3.1*10^5$ Pa.

Preferably, step S2 comprises the addition of the at least one alkylene oxide (V) to a mixture of alcohol (IV) and alkaline catalyst K2 at a pressure in the range of $1*10^5$ Pa to $3.1*10^5$ Pa.

In one embodiment, the sum total of all the carbon atoms in the $R^6$, $R^7$, $R^8$ and $R^9$ radicals is 2, and step S2 comprises the addition of the at least one alkylene oxide (V) to a mixture of alcohol (IV) and alkaline catalyst K2 at a pressure in the range from $1*10^5$ Pa to $3.1*10^5$ Pa.

In a further embodiment, the sum total of all the carbon atoms in the $R^6$, $R^7$, $R^8$ and $R^9$ radicals is more than 3, preferably 3, and step S2 comprises the addition of the at least one alkylene oxide (V) to a mixture of alcohol (IV) and alkaline catalyst K2 at a pressure in the range from $1*10^5$ Pa to $2.1*10^5$ Pa.

More preferably, step S2 is performed at a pressure in the range from $1*10^5$ Pa to $3.1*10^5$ Pa (preferably at the abovementioned pressures) and at a temperature of 120 to 130° C.

Preferably, step S2 comprises the addition (including further reaction time) of the at least one alkylene oxide (V) to a mixture of alcohol (IV) and alkaline catalyst K2 over a period of less than or equal to 36 h, preferably less than or equal to 32 h, more preferably over a period of 2 to 32 h, most preferably over a period of 11 to 24 h, and at a pressure of less than or equal to $3.1*10^5$ Pa (preferably at the abovementioned pressures).

Step S3 is especially effected without further addition of an alkaline catalyst. Step S3 is performed especially at a pressure in the range from $1*10^5$ Pa to $7*10^5$ Pa, preferably from $1*10^5$ Pa to $6*10^5$ Pa, most preferably within a range from $3*10^5$ Pa to $6*10^5$ Pa absolute and a temperature in the range from 60 to 140° C., preferably from 120 to 140° C., more preferably from 120 to 135° C. The ethoxylation in step S3 is effected especially over a period of 0.5 to 7 h, especially 1 to 5 h, preferably of 1 to 4 h.

Preferably, step S3 comprises the addition of ethylene oxide to the reaction mixture after step S2 comprising the macromonomer (B2) of the general formula (II) without further workup and/or decompression. After the addition of the ethylene oxide has ended, the reaction mixture is typically left to react further. The addition, including optional decompression and including further reaction, is effected typically over a period of 0.5 to 10 h, especially 2 to 10, most preferably 4 to 8 h.

The result of performance of step S3 is generally that alkylene oxide (V) still present in the reaction mixture after step S2 is at least partly depleted and hence at least partly removed. It is of course possible to remove alkylene oxide (V) which has not been depleted after step S2 by a decompression and/or temperature increase after step S2.

Monomers (C)

As well as monomers (A) and (B), the water-soluble copolymers (P) may optionally comprise further hydrophilic, monoethylenically unsaturated monomers.

In one embodiment of the Invention, the water-soluble copolymers (P) comprise, as well as monomers (A) and (B), at least one hydrophilic, anionic, monoethylenically unsaturated monomer (C) comprising at least one acidic group or salts thereof.

More preferably, the hydrophilic monomers (C) optionally used are miscible with water in any ratio. In general, the solubility of the monomers (C) in water at room temperature should be at least 50 g/l, preferably at least 150 g/l and more preferably at least 250 g/l.

The acidic group is preferably at least one acidic group selected from the group of —COOH, —SO$_3$H or —PO$_3$H$_2$ or salts thereof. Preference is given to monomers comprising COOH groups and/or —SO$_3$H groups.

Examples of monomers comprising COOH groups include acrylic acid, methacrylic acid, crotonic acid, taconic acid, maleic acid and fumaric acid. Preference is given to acrylic acid.

Examples of monomers comprising sulfo groups include vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid and 2-acrylamido-2,4,4-trimethylpentanesulfonic acid. Preference is given to vinylsulfonic acid, allylsulfonic acid or 2-acrylamido-2-methylpropanesulfonic acid, and particular preference to or 2-acrylamido-2-methylpropanesulfonic acid.

Examples of monomers comprising phosphonic acid groups include vinylphosphonic acid, allylphosphonic acid, N-(meth)acrylamidoalkylphosphonic acids and (meth)acryloyloxyalkyl-phosphonic acids, preference being given to vinylphosphonic acid.

The acidic groups may of course be fully or partly neutralized, meaning that they may be present as salts. Suitable counterions for the acidic group include especially alkali metal ions such as $Li^+$, $Na^+$ or $K^+$ and ammonium ions $NH_4^+$ and ammonium ions having organic radicals.

Examples of ammonium ions having organic radicals include ammonium ions of the general formula $[NHR^{20}R^{21}R^{22}]^+$ (VI) where the $R^{20}$, $R^{21}$ and $R^{22}$ radicals are each independently H or aliphatic and/or aromatic hydrocarbyl radicals having 1 to 12, preferably 1 to 6 carbon atoms, where the hydrocarbyl radicals may be substituted by OH groups and/or nonadjacent carbon atoms may be replaced by O or N, with the proviso that at least one of the $R^{20}$, $R^{21}$ and $R^{22}$ radicals is not H. In addition, the ammonium ion may also be of the general formula $[R^{20}R^{21}HN-R^{23}-NHR^{20}R^{21}]^{2+}$ (VII) where $R^{20}$ and $R^{21}$ are each as defined above and $R^{23}$ is an alkylene radical having 1 to 6 carbon atoms, preferably a 1,ω-alkylene radical having 2 to 6 carbon atoms. Examples of ammonium ions having organic radicals include $[NH(CH_3)_3]^+$, $[NH_2(CH_3)_2]^+$, $[NH_3(CH_3)]^+$, $[NH(C_2H_5)_3]^+$, $[NH_2(C_2H_5)_2]^+$, $[NH_3(C_2H_5)]^+$, $[NH_3(CH_2CH_2OH)]^+$, $[H_3N-CH_2CH_2-NH_3]^{2+}$ and $[H(H_3C)_2N-CH_2CH_2CH_2NH_3]^{2+}$.

Salts can be obtained by fully or partly neutralizing monomers (C) in the acid form with the appropriate bases prior to the polymerization. It is of course also possible to use monomers (C) in the acid form for polymerization and to fully or partly neutralize acid groups in the water-soluble copolymer (P) obtained after the polymerization.

The amount of the monomers (C) is—if they are present—up to 69.99% by weight, preferably 0.1 to 69.99% by weight, especially 5 to 64.9% by weight, based on the sum total of all the monomers in the water-soluble copolymer (P).

Monomers (D)

In a further embodiment of the invention, the water-soluble copolymers (P) comprise, as well as the monomers (A) and (B) and optionally the monomers (C), at least one hydrophilic, cationic, monoethylenically unsaturated monomer (D) comprising at least one ammonium group.

More preferably, the hydrophilic monomers (D) optionally used are miscible with water in any ratio. In general, the solubility of the monomers (D) in water at room temperature should be at least 50 g/l, preferably at least 150 g/l and more preferably at least 250 g/l.

Examples of cationic monomers (D) having ammonium groups include especially ammonium derivatives of N-(ω-aminoalkyl)(meth)acrylamides and ω-aminoalkyl(meth)acrylic esters.

More particularly, monomers (D) having ammonium groups may be compounds of the general formulae $H_2C=C(R^{10})-CO-NR^{11}-R^{12}-NR^{13}_3{}^+X^-$ (VIII) and/or $H_2C=C(R^{10})-COO-R^{12}-NR^{13}_3{}^+X^-$ (IX). In these formulae, $R^{10}$ is H or methyl, $R^{11}$ is H or a $C_1$- to $C_4$-alkyl group, preferably H or methyl, and $R^{10}$ is a preferably linear $C_1$- to $C_4$-alkylene group, for example a 1,2-ethylene group $-CH_2-CH_2-$ or a 1,3-propylene group $-CH_2CH_2-CH_2-$. The $R^{13}$ radicals are each independently $C_1$- to $C_4$-alkyl radicals, preferably methyl, or a group of the general formula $-R^{14}-SO_3H$ where $R^{14}$ is a preferably linear $C_1$- to $C_4$-alkylene group or a phenyl group, with the proviso that generally not more than one $R^{13}$ substituent is a substituent having sulfo groups. More preferably, the three $R^{13}$ substituents are methyl groups, meaning that the monomer has one $-N(CH_3)_3{}^+$ group. X in the above formula is a monovalent anion, for example $Cl^-$. Of course, X may also be an appropriate fraction of a polyvalent anion, although this is not preferred.

Examples of preferred monomers (D) of the general formula (VI) or (VII) include salts of 3-trimethylammoniopropyl(meth)acrylamides and 2-trimethylammonioethyl (meth)acrylates, for example the corresponding chlorides such as 3-trimethylammoniopropylacrylamide chloride (DIMAPAQUAT) and 2-trimethylammonioethyl methacrylate chloride (MADAME-QUAT).

The amount of the monomers (D) is—if they are present—up to 69.99% by weight, preferably 0.1 to 69.99% by weight, especially 5 to 64.9, based on the sum total of all the monomers in the water-soluble copolymer (P).

Monomers (E)

The water-soluble copolymers (P) may additionally comprise further monoethylenically unsaturated monomers (E), preferably hydrophilic monomers (E), other than the monomers (A), (B), (C) and (D).

More preferably, hydrophilic monomers (E) optionally used are miscible with water in any ratio. In general, the solubility of the monomers (E) in water at room temperature should be at least 25 g/l, preferably at least 50 g/l and more preferably at least 100 g/l.

Examples of monoethylenically unsaturated monomers of this kind include monomers comprising hydroxyl and/or ether groups, for example hydroxyethyl (meth)acrylate, hydroxypropyl (meth)acrylate, allyl alcohol, hydroxyvinyl ethyl ether, hydroxyvinyl propyl ether, hydroxyvinyl butyl ether and compounds of the formula $H_2C=C(R^{15})-COO-(-CH_2-CH(R^{16})-O-)_b-R^{17}$ (X) or $H_2C=C(R^{15})-O-(-CH_2-CH(R^{16})-O-)_b-R^{17}$ (XI) where $R^{15}$ is H or methyl and b is a number from 2 to 200, preferably 2 to 100. The $R^{16}$ radicals are each independently H, methyl or ethyl, preferably H or methyl, with the proviso that at least 50 mol % of the $R^{13}$ radicals are H. More preferably, at least 75 mol % of the $R^{16}$ radicals are H, more preferably at least 90 mol %, and they are most preferably exclusively H. The $R^{17}$ radical is H, methyl or ethyl, preferably H or methyl. Further examples of monomers (E) include N-vinyl derivatives, for example N-vinylformamide, N-vinylacetamide, N-vinylpyrrolidone and N-vinylcaprolactam, and vinyl esters, for example vinyl formate or vinyl acetate. N-Vinyl derivatives can be hydrolyzed after polymerization to give vinylamine units, and vinyl esters to vinyl alcohol units.

If they are present at all, the amount of such further monomers (E) should not exceed 15% by weight, preferably 10% by weight, more preferably 5% by weight, based on the sum total of all the monomers, and most preferably no further monomers (E) are present.

Preparation of the Copolymers (P)

The inventive copolymers can be prepared by methods known in principle to those skilled in the art, by free-radical polymerization of the monomers (A), (B) and optionally (C), (D) and (E) in aqueous solution, for example by means of solution polymerization, gel polymerization or inverse emulsion polymerization. These polymerization techniques are known in principle to those skilled in the art.

For polymerization, it is possible to use and polymerize aqueous solutions or of the monomers together with suitable initiators for the free-radical polymerization. The polymerization can be effected thermally and/or photochemically. It is of course possible to use further additives and auxiliaries for polymerization, for example defoamers or complexing agents.

In a preferred embodiment of the Invention, the copolymers used are prepared in the presence of at least one non-polymerizable, surface-active compound (T). The non-polymerizable, surface-active compound (T) is preferably at least one nonionic surfactant, but anionic and cationic surfactants are also suitable, provided that they do not take part in the polymerization reaction. The compounds may especially be surfactants, preferably nonionic surfactants of the general formula $R^{18}$—Y where $R^{18}$ is a hydrocarbyl radical having 8 to 32, preferably 10 to 20 and more preferably 12 to 18 carbon atoms and Y is a hydrophilic group, preferably a nonionic hydrophilic group, especially a polyalkoxy group.

The nonionic surfactant is preferably an ethoxylated long-chain, aliphatic alcohol which may optionally comprise aromatic components.

Examples include: $C_{12}C_{14}$ fatty alcohol ethoxylates, $C_{16}C_{18}$ fatty alcohol ethoxylates, $C_{13}$ oxo alcohol ethoxylates, $C_{10}$ oxo alcohol ethoxylates, $C_{13}C_{15}$ oxo alcohol ethoxylates, $C_{10}$ Guerbet alcohol ethoxylates and alkyiphenol ethoxylates. Particularly useful examples are compounds having 5 to 20 ethyleneoxy units, preferably 8 to 18 ethyleneoxy units. Optionally, small amounts of higher alkyleneoxy units, especially propyleneoxy and/or butyleneoxy units, may also be present, although the amount of ethyleneoxy units should generally be at least 80 mol % based on all the alkyleneoxy units.

Especially suitable are surfactants selected from the group of ethoxylated alkyl phenols, ethoxylated saturated iso-C13-alcohols and/or ethoxylated C10-Guerbet alcohols, where 5 to 20 ethyleneoxy units, preferably 8 to 18 ethyleneoxy units, are present in each of the alkyleneoxy radicals.

The addition of the non-polymerizable, interface-active compounds (T) during the polymerization leads to a distinct improvement in performance properties of the copolymer (P) in polymer flooding. More particularly, the thickening effect is increased and, in addition, the gel content of the copolymer is reduced. This effect can probably be explained as follows, without any intention that the Invention be restricted to this explanation. In the case of polymerization in the absence of a surfactant, the macromonomers (B) form micelles in the aqueous reaction medium. In the polymerization, this leads to blockwise incorporation of the hydrophobically associating regions into the polymer. If an additional surface-active compound is then present in the course of preparation of the copolymers, mixed micelles are formed. These mixed micelles comprise polymerizable and non-polymerizable components. As a result, the macromonomers (B) are then incorporated in shorter blocks. At the same time, the number of these shorter blocks per polymer chain is greater. Thus, the structure of the copolymers prepared in the presence of a surfactant differs from those in the absence of a surfactant.

The non-polymerizable, interface-active compounds (T) can generally be used in an amount of 0.1 to 5% by weight, based on the amount of all the monomers used. The weight ratio of the non-polymerizable, interface-active compounds (T) used to the monomers (B) is generally 4:1 to 1:4, preferably 2:1 to 1:2, more preferably 1.5:1 to 1:1.5 and, for example, about 1:1.

In a preferred embodiment, the free-radical polymerization is undertaken by means of gel polymerization, preferably adiabatic gel polymerization in aqueous phase.

For gel polymerization, a solution comprising the monomers (A), (B) and optionally (C), (D) and/or (E), and also water or an aqueous solvent mixture, is first provided. Suitable aqueous solvent mixtures comprise water and water-miscible organic solvents, where the proportion of water is generally at least 60% by weight, preferably at least 85% by weight and more preferably at least 95% by weight. In one embodiment of the invention, exclusively water is used as the solvent. Water-miscible organic solvents which should be mentioned are especially alcohols such as methanol, ethanol or propanol. The concentration of all the monomers together is typically 10 to 60% by weight, preferably 20 to 50% by weight, for example 25 to 45% by weight, based on the aqueous monomer solution.

Acidic monomers may be fully or partly neutralized prior to the polymerization. This can be effected, for example, with alkali metal hydroxides, or else with ammonia or amines. The polymerization should be performed especially at a pH in the range from 5 to 7.5, preferably 5 to 7 and, for example, at a pH of 6. The aqueous monomer solution may further comprise various additives, for example defoamers or complexing agents.

To perform the gel polymerization, the aqueous monomer solution is cooled to a temperature of less than +10° C., preferably to −5° C. to +5° C. The mixture is inertized before, during or after the cooling. After the cooling, at least one initiator for the free-radical polymerization, which is soluble in the monomer solution, is added. The initiators may preferably be water-soluble, but even initiators which do not have good water solubility are soluble in the monomer solution. The initiators may be either thermal initiators or photoinitiators.

In one embodiment, the polymerization is initiated at temperatures of less than +10° C. using thermal polymerization initiators. For this purpose, thermal polymerization initiators which can initiate the polymerization even at such low temperatures are used. The person skilled in the art is aware of such polymerization initiators. Examples include redox initiators or azo initiators having an appropriately low temperature for a 10 h half-life. Because of the polymerization initiators added, the polymerization starts slowly at low temperatures. As a result of the heat of reaction released, the mixture heats up and the polymerization accelerates. The temperature of the mixture generally rises up to 80 to 90° C. The polymerization affords a generally solid polymer gel.

In a further embodiment of the gel polymerization, the reaction can be executed with a mixture of a redox initiator system and at least one thermal initiator which breaks down only at relatively high temperatures. This may, for example, be a water-soluble azo initiator which breaks down within the temperature range from 40° C. to 70° C. The polymerization here starts initially at the lower temperatures mentioned of less than +10° C., preferably −5° C. to +5° C., by virtue of the redox initiator system. As a result of the heat of reaction released, the mixture heats up, as a result of which the initiator which breaks down to free radicals only at relatively high temperatures starts to break down.

In a further embodiment, the polymerization can be performed using a combination of a photochemical initiator with a thermal initiator. In this case, the polymerization is initiated photochemically at low temperatures, and the heat of reaction released ultimately additionally triggers the thermal initiators.

The gel polymerization is generally effected without stirring. It can preferably be effected batchwise, for example in a raw reactor as described by GB 1,054,028. Particularly advantageously, it is possible to use conical reactors for this purpose, as described, for example, by U.S. Pat. No. 5,633,329 or U.S. Pat. No. 7,619,046 B2.

FIG. 8 shows a conical reactor which can be used for performance of the gel polymerization. This is a vertical tubular reactor (1) which has a diameter D1 and narrows conically (2) at the lower end, where the diameter at the end of the conical narrowing is D2. The ratio D1/D2 is generally 2:1 to 25:1, preferably 2:1 to 20:1 and, for example, 3:1 to 10:1. The angle $\alpha$ between the wall in the cylindrical section (1) and the wall in the region of the conical narrowing (2) is more than 120° and less than 180, especially 135° to 175°, preferably 150° to 175° and, for example, 155° to 170°. The ratio of height to diameter D1 of the cylindrical section (1) of the reactor may be 4 to 40. The capacity of the reactors is chosen by the person skilled in the art according to the desired production capacity and may be 1 to 100 m$^3$, for example 5 to 50 m$^3$, without any intention that the invention be restricted thereto.

The inner surface of the reactor has preferably been provided with a coating to reduce the adhesion of the reaction mixture to the reactor wall, for example with a Teflon coating. The reactor may optionally be surrounded with a shell for cooling or heating of the reaction mixture.

At the lower end, the reactor has a shut-off device (3). The reactor further comprises at least one feed (4). Through this feed (4), the aqueous monomer solution and/or gases and/or further components can be passed into the reactor. Gases may especially be inert gases such as nitrogen, argon or $CO_2$. Inert gases can be used to purge the reactor for inertization. Of course, it is also possible for different feeds to be present for different components, for example separate feeds for the aqueous reaction solution and gases. The at least one feed (4) may preferably be mounted at the top of the reactor or at the side in the upper region of the reactor, but other arrangements are of course also possible.

The reactor may of course comprise further components, for example further feeds, for example for compressed air or solvents, or discharge apparatuses for the gel, for example movable rams arranged within the reactor, as described, for example, by GB 1,054,028.

FIG. 9 shows a fully conical reactor. It is of similar construction to the partly conical reactor just outlined, but does not have any cylindrical section, the diameter being d1 at the upper end of the conical reactor and d2 at the lower end. The ratio d1/d2 is generally 1.1:1 to 25:1, especially 2:1 to 25:1, preferably 2.1 to 10:1 and, for example, 3.1 to 10:1. The angle $\beta$ between the upper diameter d1 and the reactor wall is more than 45° and less than 90°, preferably 60° to 89°, for example 70° to 88°. For the rest, reference is made to the above description.

The gel polymerization in the fully or partly conical reactors can preferably be performed under adiabatic conditions or at least essentially adiabatic conditions. In the case of this procedure, the reactor does not have any cooling or heating. It will be apparent to the person skilled in the art that—according to the internal temperature of the reactor and/or the ambient temperature—certain amounts of heat can of course be released or absorbed via the reactor wall, but this effect naturally plays an ever smaller role with increasing reactor size.

For polymerization, the above-described aqueous monomer mixture is mixed in a suitable mixing and cooling apparatus disposed outside the conical reactor, and is cooled to less than +10° C., preferably to −5° C. to +5° C. This can be effected, for example, in a mixing tank which is cooled in a suitable manner, for example by means of circulation cooling. After the monomer mixture has been cooled, it is already possible to add initiators which do not yet form any free radicals at the low temperatures, for example at least one of the above-written azo initiators which initiate the polymerization only at 40° C. to 70° C. However, such initiators can also be added only at a later juncture.

The cooled is finally transferred through the feed (4) or another feed into the fully or partly conical reactor. The reactor should be purged with an inert gas before and/or during the filling.

For polymerization, the monomer solution is generally inertized, i.e. freed of any oxygen present. This can be effected, for example, by purging the monomer solution with an Inert gas such as nitrogen, argon or carbon dioxide. This purging can already be effected during the mixing and cooling of the aqueous monomer solution, in a separate apparatus for inertization, for example the apparatus described in WO 03/066190 A1, or else in the reactor itself. Preference is given to inertizing upstream of the reactor.

Polymerization initiators which can trigger the polymerization even at low temperatures are dissolved separately and added to the aqueous monomer solution only immediately before the polymerization. This can be effected, for example, by injecting a solution of the initiators into the reactor during the filling of the reactor with the aqueous monomer solution, or preferably into the feed (4) or into the line by which the mixing and cooling apparatus is connected to the reactor. For complete mixing of the initiator solution with the aqueous monomer solution, suitable mixing units, especially static mixers, may be integrated into the monomer feed. Of course, it is possible to add all initiators to the monomer solution in this way.

Because of the polymerization initiators added, the polymerization commences at temperatures of less than +10° C. The heat of reaction released heats up the mixture, and the polymerization accelerates. The temperature of the mixture generally rises to up to 80 to 90° C. The polymerization affords a generally solid polymer gel.

To withdraw the polymer gel from the reactor, the shut-off device (3) is opened. In general, the polymer gel obtained is solid and does not flow out of the reactor without additional measures. If the reactor used has mechanical aids, for example a movable ram arranged within the reactor, as described by GB 1,054,028, the polymer gel can be expelled using such aids.

Preferably, the expulsion of the polymer gel from the fully or partly conical reactor can be undertaken using gases. For this purpose, a gas is injected at the top of the tubular reactor via the feed (4) or another feed. For this purpose, it is possible to use any gases which cannot react with the polymer gel. Advantageously, it is possible for this purpose to inject inert gases such as nitrogen, carbon dioxide or argon via the feed (4), because this feed is already present. It is also possible to use other gases, for example compressed air. Alternatively, it is also possible to inject an inert liquid, especially a precipitant for the polymer, at the top of the reactor. The pressure of the gas or the liquid is selected suitably by the person skilled in the art and may, for example, be $2*10$ to $65*10^5$ Pa, especially $4*10^5$ to $25*10^5$ Pa. More particularly, it is selected such that the polymer gel is discharged homogeneously from the reactor.

The polymer gel obtained is preferably comminuted and dried. The drying should preferably be effected at temperatures below 100° C. To avoid sticking, a suitable separating agent can be used for this step. The hydrophobically associating copolymer is obtained in the form of granules or powder.

Since the polymer powder or granules obtained is/are generally used in the form of an aqueous solution in the course of the employment at the site of use, the polymer has to be dissolved in water on site. This can cause unwanted formation of lumps with the high molecular weight polymers described. In order to avoid this, as early as in the course of synthesis, it is possible to add an auxiliary which accelerates or improves the dissolution of the dried polymer in water to the inventive polymers. This auxiliary may, for example, be urea.

The gel polymerization may also be continuous. For this purpose, for example, a polymerization apparatus having a conveyor belt to accommodate the mixture to be polymerized can be. The conveyor belt may be equipped with devices for heating and/or for irradiation with UV radiation. In this method, the mixture is poured on by means of a suitable apparatus at one end of the belt, the mixture is polymerized in the course of transport in belt direction, and the solid gel can be removed at the other end of the belt.

The copolymers obtained generally have a weight-average molecular weight $M_w$ of $1*10^6$ g/mol 10 to $30*10^6$ g/mol, preferably $6*10^6$ g/mol to $25*10^6$ g/mol and, for example, $8*10^6$ g/mol to $20*10^6$ g/mol.

Preferred Copolymers (P)

In a preferred embodiment of the invention, the water-soluble copolymers comprise
- 30 to 99.99% by weight, preferably 35 to 99.9% by weight, more preferably 45 to 99.5% by weight, of at least one monomer (A),
- 0.01 to 15% by weight, preferably 0.1 to 15% by weight, more preferably 0.5 to 8% by weight, of at least one macromonomer (B),
- 0 to 69.99% by weight, preferably 0 to 64.9% by weight, more preferably 0 to 54.5% by weight, of at least one monomer (C),
- 0 to 69.99% by weight, preferably 0 to 64.9% by weight, more preferably 0 to 54.5% by weight, of at least one monomer (D), and
- 0 to 15% by weight, preferably 0 to 10% by weight, more preferably 0 to 5% by weight, of at least one monomer (E),
based in each case on the total amount of all the monomers, with the proviso that the total amount of monomers (A) to (E) is 100% by weight.

In other words, no further monomers are present apart from the monomers (A), (B) and optionally (C), (D) and (E). Preferably, in this embodiment, no monomers (E) are present.

The monomers (A) to (E), including preferred monomers (A) to (E), have already been described.

In a further preferred embodiment of the invention, the copolymer (P) is a copolymer selected from the group of copolymer (P1), copolymer (P2), copolymer (P3) and copolymer (P4), preferably a copolymer selected from the group of copolymer (P1), (P2) and (P3). The copolymers (P1), (P2), (P3) and (P4) are described below.

Copolymer (P1)

In a preferred embodiment of the invention, the water-soluble copolymers (P) are water-soluble copolymers (P1).

The copolymers (P1) comprise, as monomer (A), (meth) acrylamide, preferably acrylamide.

The water-soluble copolymers (P1) comprise, as macromonomers (B), the already described mixture of the macromonomers (B1) and (B2), where the molar proportion of the macromonomers (B1) is especially 0.3 to 0.95, preferably 0.45 to 0.9, more preferably 0.5 to 0.9 and, for example, 0.5 to 0.8, based on the sum total of (B1) and (B2).

In addition, in the copolymer (P1), in the formulae (I) and (II) of the macromonomers (B1) and (B2), the radicals and indices are each defined as follows:
- $R^1$: H or methyl,
- $R^2$: a divalent linking group —$OR^{35}$— where $R^{35}$ is a linear 1,ω-alkylene group having 1 to 6, preferably 3 to 6 and more preferably 4 carbon atoms,
- $R^3$: ethylene groups —$CH_2CH_2$—,
- $R^4$: independently alkylene groups —$CR^6(R^7)$—$CR^8(R^9)$—, where the sum total of the carbon atoms $R^6$, $R^7$, $R^8$ and $R^9$ is 2 in each case, and where, in at least 70 mol %, preferably at least 80 mol % and more preferably at least 95 mol % of the —$CR^6(R^7)CR^8(R^9)$— units, $R^6$, $R^7$ and $R^8$ are each H and $R^9$ is ethyl,
- $R^5$ an ethylene group —$CH_2CH_2$—,
- a a number from 20 to 28, preferably 23 to 26,
- b a number from 10 to 25, preferably 14 to 23, more preferably 14 to 20, most preferably 14 to 18,
- c a number from 0 to 2, preferably 0 to 1.5, and
- d a number from 1.5 to 10, preferably 1.5 to 5.

The copolymers (P1) further comprise, as well as monomers (A) and (B), at least one monomer (C) comprising —$SO_3H$ groups or salts thereof. Examples of such monomers have already been mentioned. Preference is given to vinylsulfonic acid, allylsulfonic acid or 2-acrylamido-2-methylpropanesulfonic acid; more preferably, monomer (C) is 2-acrylamido-2-methylpropanesulfonic acid.

In the copolymers (P1) the amount of the monomers (A) is generally 40 to 60% by weight, preferably 45 to 55% by weight, the amount of the monomers (B) is 0.1 to 5% by weight, preferably 0.5 to 3% by weight and, for example, 0.8 to 2.5% by weight, and the amount of the monomers (C) is 40 to 60% by weight, preferably 45 to 55% by weight, based in each case on the sum total of all the monomers in the water-soluble copolymer (P1). Preferably, the total amount of monomers (A), (B) and (C) in the water-soluble copolymer (P1) is 100% by weight.

The copolymers (P1) generally have a weight-average molecular weight $M_w$ of $1*10^6$ g/mol to $30*10^6$ g/mol, preferably $2*10^6$ g/mol to $16*10^6$ g/mol.

Copolymer (P2)

In a further preferred embodiment of the invention, the copolymer (P) is a copolymer (P2).

The copolymers (P2) comprise, as monomer (A), (meth) acrylamide, preferably acrylamide.

The water-soluble copolymers (P2) comprise, as macromonomers (B), the already described mixture of the macromonomers (B1) and (B2), where the molar proportion of the macromonomers (B1) is especially 0.3 to 0.95, preferably 0.45 to 0.9, more preferably 0.5 to 0.9 and, for example, 0.5 to 0.8, based on the sum total of (B1) and (B2).

In addition, in the copolymer (P2), in the formulae (I) and (II) of the macromonomers (B1) and (B2), the radicals and indices are each as already defined for copolymer (P1), including the preferred ranges outlined.

The copolymers (P2) further comprise, as well as the monomers (A) and (B), at least one monomer (C) comprising COOH groups or salts thereof. Examples of such monomers have already been mentioned and include acrylic acid, methacrylic acid, crotonic acid, itaconic acid, maleic acid and fumaric acid. Preference is given to (meth)acrylic acid, particular preference to acrylic acid.

In the copolymers (P2), the amount of the monomers (A) is generally 50 to 85% by weight, preferably 55 to 80% by weight, the amount of the monomers (B) is 0.1 to 10% by weight, preferably 0.5 to 8% by weight and, for example, 0.8 to 5% by weight, and the amount of the monomers (C) is 5 to 45% by weight, preferably 10 to 40% by weight and, for example, 15 to 30% by weight, based in each case on the sum total of all the monomers in the water-soluble copolymer (P2). Preferably, the total amount of monomers (A), (B) and (C) in the water-soluble copolymer (P2) is 100% by weight.

The copolymers (P2) generally have a weight-average molecular weight $M_w$ of $1*10^6$ g/mol to $30*10^6$ g/mol, preferably $4*10^6$ g/mol to $22*10^6$ g/mol.

Copolymer (P3)

In a further preferred embodiment of the invention, the copolymer (P) is a copolymer (P3).

The copolymers (P3) comprise, as monomer (A), (meth)acrylamide, preferably acrylamide. The water-soluble copolymers (P3) comprise, as macromonomers (B), the already described mixture of the macromonomers (B1) and (B2), where the molar proportion of the macromonomers (B1) is especially 0.3 to 0.95, preferably 0.45 to 0.9, more preferably 0.5 to 0.9 and, for example, 0.5 to 0.8, based on the sum total of (B1) and (B2).

In addition, in the copolymer (P3) the radicals and indices in the formulae (I) and (II) of the macromonomers (B1) and (B2) are each as already defined for copolymer (P1), including the preferred ranges outlined.

The copolymers (P3) further comprise, as well as the monomers (A) and (B), at least two monomers (C), namely at least one monomer (C1) comprising COOH groups or salts thereof, and at least one monomer (C2) comprising $SO_3H$ groups or salts thereof.

Examples of monomers (C1) have already been mentioned and include acrylic acid, methacrylic acid, crotonic acid, itaconic acid, maleic acid and fumaric acid. Preference is given to (meth)acrylic acid, particular preference to acrylic acid.

Examples of monomers (C2) have already been mentioned. Preference is given to vinylsulfonic acid, allylsulfonic acid or 2-acrylamido-2-methylpropanesulfonic acid, and monomer (C2) is more preferably 2-acrylamido-2-methylpropanesulfonic acid.

In the copolymers (P3), the amount of the monomers (A) is generally 30 to 85% by weight, preferably 40 to 80% by weight, the amount of the monomers (B) is 0.5 to 10% by weight, preferably 0.8 to 5% by weight, the amount of the monomers (C1) is 5 to 40% by weight, preferably 5 to 30% by weight and the amount of the monomers (C2) is 5 to 40% by weight, preferably 5 to 30% by weight, based in each case on the sum total of all the monomers in the water-soluble copolymer (P). Preferably, the total amount of monomers (A), (B) and (C) in the water-soluble copolymer (P2) is 100% by weight.

The copolymers (P3) generally have a weight-average molecular weight $M_w$ of $1*10^6$ g/mol to $30*10^6$ g/mol, preferably $2*10^6$ g/mol to $20*10^6$ g/mol.

Copolymer (P4)

In a further preferred embodiment of the invention, the copolymer (P) is a copolymer (P4).

The copolymers (P4) comprise, as monomer (A), (meth)acrylamide, preferably acrylamide.

The water-soluble copolymers (P4) comprise, as macromonomers (B), the already described mixture of the macromonomers (B1) and (B2), where the molar proportion of the macromonomers (B1) is especially 0.3 to 0.95, preferably 0.45 to 0.9, more preferably 0.5 to 0.9 and, for example, 0.5 to 0.8, based on the sum total of (B1) and (B2).

In addition, in the case of copolymer (P4), in the formulae (I) and (II) of the macromonomers (B1) and (B2), the radicals and indices are each as already defined for copolymer (P1), including the preferred ranges outlined.

The copolymers (P4) comprise essentially only the monomers (A) and (B). In addition, further monomers may be present in small amounts, especially further monomers selected from the group of monomers (C), monomers (D) and monomers (E). In one embodiment, the copolymers P4 consist of the monomers (A) and (B).

In the copolymers (P4), the amount of the monomers (A) is generally 80 to 99.9% by weight, preferably 90 to 99.5% by weight, for example 97% by weight to 99.5% by weight, and the amount of the monomers (B) 0.1 to 5% by weight, preferably 0.5 to 3% by weight, based in each case on the sum total of all the monomers in the water-soluble copolymer (P4). Preferably, the total amount of the monomers (A) and (B) in the water-soluble copolymer (P4) is 100% by weight.

The copolymers (P4) generally have a weight-average molecular weight $M_w$ of $1*10^6$ g/mol to $30*10^6$ g/mol.

Process for Mineral Oil Production

To execute the process according the invention, at least one production well and at least one injection well are sunk into the mineral oil deposit. In general, a deposit will be provided with a plurality of injection wells and with a plurality of production wells. An aqueous formulation of the water-soluble copolymer (P) described is injected into the mineral oil deposit through the at least one injection well, and mineral oil is withdrawn from the deposit through at least one production well. By virtue of the pressure generated by the aqueous formulation injected, called the "polymer flood", the mineral oil flows in the direction of the production well and is produced through the production well. In this context, the term "mineral oil" does not of course just mean a single-phase oil; instead, the term also encompasses the customary crude oil-water emulsions.

According to the invention, the deposit temperature of the mineral oil deposit in which the process according the invention is employed is 20 to 120° C., especially 35° C. to 120° C., preferably 40° C. to 100° C., more preferably 45° C. to 90° C. and, for example, 50° C. to 80° C.

It will be apparent to the person skilled in the art that a mineral oil deposit may also have a certain temperature distribution. Said deposit temperature is based on the region of the deposit between the injection and production wells, which is covered by the polymer flooding. Means of determining the temperature distribution of a mineral oil deposit are known in principle to those skilled in the art. The temperature distribution is generally determined from temperature measurements at particular points in the formation, in combination with simulation calculations, which also take account of the amounts of heat introduced into the formation and the amounts of heat removed from the formation.

The process according the invention can be employed especially in the case of mineral oil deposits having an average porosity of 10 mD ($9.87*10^{-15}$ m$^2$) to 4 D ($3.95*10^{-12}$ m$^2$), preferably 100 mD ($9.87*10^{-14}$ m$^2$) to 2 D ($1.97*10^{-12}$ m$^2$) and more preferably 200 mD ($1.97*10^{-13}$ m$^2$) to 1 D ($9.87*10^{-13}$ m$^2$). The permeability of a mineral oil formation is reported by the person skilled in the art in the unit "darcies" (abbreviated to "D" or "mD" for "millidarcies", 1 D=$9.86923*10^{-13}$ m$^2$) and can be determined from the flow rate of a liquid phase in the mineral oil formation as a function of the pressure differential applied. The flow rate can be determined in core flooding experiments with drill cores removed from the formation. Details of this can be found, for example, in K. Weggen, G. Pusch, H. Rischmüller in "Oil and Gas pages", 37ff., *Ullmnann's Encyclopedia of Industrial Chemistry, Online Edition*, Wiley-VCH, Weinheim 2010. It will be apparent to a person skilled in the art that the permeability in a mineral oil deposit need not be homogeneous; instead, it may generally have a certain distribution and the stated permeability of a mineral oil deposit is accordingly an average permeability.

The process is executed using an aqueous formulation comprising, as well as water, at least the copolymer (P) described. It is of course also possible to use mixtures of various hydrophobically associating copolymers.

The formulation can be made up in freshwater or else in water comprising salts. Of course, mixtures of various salts may be involved. For example, it is possible to use seawater to make up the aqueous formulation, or it is possible to use produced formation water, which is reused in this way. In the case of offshore production platforms, the formulation is generally made up in seawater. In onshore production installations, the polymer can advantageously first be dissolved in freshwater, and the solution obtained can be diluted to the desired use concentration with formation water.

The salts may especially be alkali metal salts and alkaline earth metal salts. Examples of typical cations include $Na^+$, $K^+$, $Mg^{2+}$ and $Ca^{2+}$, and examples of typical anions include chloride, bromide, hydrogencarbonate, sulfate and borate.

If the formulation comprises salts, generally at least one or more than one alkali metal ion is present, especially at least $Na^+$. In addition, it is also possible for alkaline earth metal ions to be present, in which case the weight ratio of alkali metal ions/alkaline earth metal ions is generally ≥2, preferably ≥3. The anions present are generally at least one or more than one halide ion, especially at least $Cl^-$. In general, the amount of $Cl^-$ is at least 50% by weight, preferably at least 80% by weight, based on the sum total of all the anions.

The total amount of all the salts in the aqueous formulation may be up to 350 000 ppm (parts by weight) based on the sum total of all the components in the formulation, for example 2000 ppm to 350 000 ppm, especially 5000 ppm to 250 000 ppm. If seawater is used to make up the formulation, the salt content may be 2000 ppm to 40 000 ppm, and, if formation water is used, the salt content may be 100 000 ppm to 250 000 ppm, for example 100 000 ppm to 200 000 ppm. The amount of alkaline earth metal ions may preferably be 1000 to 53 000 ppm.

The aqueous formulation may of course comprise further components. Examples of further components include biocides, stabilizers, free-radical scavengers, initiators, surfactants, cosolvents, bases and complexing agents.

Surfactants and/or bases can be used, for example, to support the oil-removing effect of the copolymers (P). Examples of preferred surfactants are disclosed further down. Surfactants can also be used to increase the viscosity of the polymer used. For example, it is possible to use the surfactants disclosed by WO 2012/069438 A1.

Additives can be used, for example, to prevent unwanted side effects, for example the unwanted precipitation of salts, or to stabilize the copolymer (P) used. The polymer formulations injected into the formation in the course of polymer flooding flow only very gradually in the direction of the production well, meaning that they remain under formation conditions in the formation for a prolonged period. Degradation of the polymer results in a decrease in viscosity. This either has to be taken into account through the use of a higher amount of polymer, or else it has to be accepted that the efficiency of the process will worsen. In any case, the economic viability of the process worsens. A multitude of mechanisms may be responsible for the degradation of the polymer. By means of suitable additives, it is possible to prevent or at least delay the polymer degradation according to the conditions.

In one embodiment of the invention, the aqueous formulation used comprises at least one oxygen scavenger. Oxygen scavengers react with oxygen which may possibly be present in the aqueous formulation, and thus prevent the oxygen from attacking the polymer. Examples of oxygen scavengers include sulfites, for example $Na_2SO_3$, bisulfites or dithionites.

In a further embodiment of the invention, the aqueous formulation used comprises at least one free-radical scavenger. Free-radical scavengers can be used to counteract the degradation of the polymer by free radicals. Compounds of this kind can form stable compounds with free radicals. Free-radical scavengers are known in principle to those skilled in the art. For example, they may be stabilizers selected from the group of sulfur compounds, sterically hindered amines, N-oxides, nitroso compounds, aromatic hydroxyl compounds or ketones. Examples of sulfur compounds include thiourea, substituted thioureas such as N,N'-dimethylthiourea, N,N'-diethytthiourea, N,N'-diphenylthiourea, thiocyanates, for example ammonium thiocyanate or potassium thiocyanate, tetramethyithiuram disulfide, and mercaptans such as 2-mercaptobenzothiazole or 2-mercaptobenzimidazole or salts thereof, for example the sodium salts, sodium dimethyldithiocarbamate, 2,2'-dithiobis(benzothiazole), 4,4'-thiobis(6-t-butyl-m-cresol). Further examples include dicyandiamide, guanidine, cyanamide, paramethoxyphenol, 2,6-di-t-butyl-4-methylphenol, butylhydroxyanisole, 8-hydroxyquinoline, 2,5-di(t-amyl)-hydroquinone, 5-hydroxy-1,4-naphthoquinone, 2,5-di(t-amyl)hydroquinone, dimedone, propyl 3,4,5-trihydroxybenzoate, ammonium N-nitrosophenylhydroxylamine, 4-hydroxy-2,2,6,6-tetramethyoxylpiperidine, (N-(1,3-dimethylbutyl)-N'-phenyl-p-phenylenediamine and 1,2,2,6,6-pentamethyl-4-piperdinol. Preference is given to sterically hindered amines such as 1,2,2,6,6-pentamethyl-4-piperidinol and sulfur compounds, mercapto compounds, especially 2-mercaptobenzothiazole or 2-mercaptobenzimidazole or salts thereof, for example the sodium salts, and particular preference is given to 2-mercaptobenzothiazole or salts thereof.

In a further embodiment of the invention, the aqueous formulation used comprises at least one sacrificial reagent. Sacrificial reagents can react with free radicals and thus render them harmless. Examples include especially alcohols. Alcohols can be oxidized by free radicals, for example to ketones. Examples include monoalcohols and polyalcohols, for example 1-propanol, 2-propanol, propylene glycol, glycerol, butanediol or pentaerythritol.

In a further embodiment of the invention, the aqueous formulation used comprises at least one complexing agent. It is of course possible to use mixtures of various complexing agents. Complexing agents are generally anionic compounds which can complex especially divalent and higher-valency metal ions, for example $Mg^{2+}$ or $Ca^{2+}$. In this way, it is possible, for example, to prevent any unwanted precipitation. In addition, it is possible to prevent any polyvalent metal ions present from crosslinking the polymer by means of acidic groups present, especially COOH group. The complexing agents may especially be carboxylic acid or phosphonic acid derivatives. Examples of complexing agents include ethylenediaminetetraacetic acid (EDTA), ethylenediaminesuccinic acid (EDDS), diethylenetriaminepentamethylenephosphonic acid (DTPMP), methylglycinediacetic acid (MGDA) and nitriloacetic acid (NTA). Of course, the corresponding salts of each may also be involved, for example the corresponding sodium salts.

As an alternative to or in addition to the abovementioned chelating agents, it is also possible to use polyacrylates.

In a further embodiment of the invention, the formulation comprises at least one organic cosolvent. Preference is given to fully water-miscible solvents, but it is also possible to use only partly water-miscible solvents. In general, the solubility should be at least 50 g/l, preferably at least 100 g/l. Examples include aliphatic $C_4$ to $C_8$ alcohols, preferably $C_4$ to $C_6$ alcohols, which, to attain adequate water solubility, may be substituted by 1 to 5, preferably 1 to 3, ethyleneoxy units. Further examples include aliphatic diols having 2 to 8 carbon atoms, which may optionally also have further substitution. For example, the cosolvent may be at least one selected from the group of 2-butanol, 2 methyl-1-propanol, butylglycol, butyldiglycol and butyitriglycol.

The concentration of the copolymer in the aqueous formulation is fixed such that the aqueous formulation has the desired viscosity for the end use. The viscosity of the formulation should generally be at least 5 mPas (measured at 25° C. and a shear rate of 7 $s^{-1}$), preferably at least 10 mPas.

In general, the concentration of the copolymer (P) in the formulation is 0.02 to 2% by weight based on the sum total of all the components in the aqueous formulation. The amount is preferably 0.05 to 0.5% by weight, more preferably 0.1 to 0.3% by weight and, for example, 0.1 to 0.2% by weight.

In a further embodiment, the concentration of the copolymer (P) in the formulation is not more than 0.05% by weight used, especially 0.01% by weight to 0.05% by weight, preferably 0.02% by weight to 0.05% by weight.

If the copolymer (P) is in the form of a powder or granules, the copolymers have to be dissolved in the aqueous medium for injection. Granules may have, for example, an average particle size of 0.1 mm to 3 mm. The person skilled in the art is aware that excessive shear stresses should be avoided in the dissolution of high molecular weight polymers, in order to avoid degradation of the polymers. Apparatus and processes for dissolving polymers and injecting the aqueous solutions into underground formations are known in principle to those skilled in the art.

The aqueous formulation can be produced by initially charging the water, scattering in the copolymer in the form of powder or granules and mixing it with the water.

In a further embodiment of the invention, the copolymer granules or powder can be dissolved by means of a two-stage process. This involves dissolving, in a first dissolution stage, polymer granules or powder in an aqueous medium to obtain a concentrate. Such a concentrate may have, for example, a concentration of 1% by weight to 3% by weight. This can be done, for example, in appropriate dissolution tanks. In a second stage, the concentrate is diluted to use concentration. This can be done by injecting the concentrate directly into the pipeline together with the injection fluid. For rapid mixing, a mixer, especially a static mixer, may be disposed beyond the injection point. Such a process is disclosed by WO 2012/140092 A1.

In a further embodiment of the invention, the dissolution can be effected by moistening the polymer granules with an aqueous phase in a first step. This causes the polymer to swell in the aqueous phase. The concentration of the polymer may, for example, be about 2 to 10% by weight, based on the total amount of aqueous phase and polymer. The swollen polymer is subsequently comminuted by means of a suitable comminuting apparatus, for example to a size of 0.05 mm to 0.2 mm, and mixed with further water. This gives rise to a polymer dispersion which may have, for example, a concentration of 1 to 3% by weight of polymer. The polymer dispersion can be dissolved fully in further dissolution tanks. In one variant, dissolution tanks can be dispensed with and the polymer dispersion can be injected directly into the pipeline together with the injection fluid, where the polymer dissolves fully on the way to the injection site. The latter is advantageous especially when the injection fluid is transported over a certain distance in the pipeline, for example from a central dissolution station on the oilfield to various injection wells. Suitable apparatuses for the process outlined are disclosed, for example, WO 2008/071808 A1 and WO 2008/081048 A1.

If the copolymer (P) is already in the form of a solution or inverse emulsion, are optionally mixed with further components and diluted to the use concentration. Such a dilution can also be effected in two stages, by first producing a concentrate and then diluting it further. A suitable apparatus for this purpose is disclosed, for example, by EP 2 283 915 A1.

The injection of the aqueous formulation can be undertaken by means of customary apparatus. The formulation can be injected by means of customary pumps into one or more injection wells. The injection wells have typically been lined with cemented steel tubes, and the steel tubes have been perforated at the desired point. The formulation enters the mineral oil formation from the injection well through the perforation. The pressure applied by means of the pumps, in a manner known in principle, fixes the flow rate of the formulation and hence also the shear stress with which the aqueous formulation enters the formation. The shear stress on entry into the formation can be determined by the person skilled in the art in a manner known in principle on the basis of the Hagen-Poiseuille law using the area through which the flow passes on entry into the formation, the mean pore radius and the volume flow rate. The average permeability of the formation can be determined as described in a manner known in principle. Naturally, the greater the volume flow rate of aqueous copolymer formulation injected into the formation, the greater the shear stress.

The rate of injection can be fixed by the person skilled in the art according to the conditions in the formation. The shear rate on entry of the aqueous polymer formulation into the formation is preferably at least 30 000 $s^{-1}$, preferably at least 60 000 $s^{-1}$ and more preferably at least 90 000 $s^{-1}$.

In the process according to the invention, what is withdrawn from the production well will generally not be single-phase oil but a crude oil/water emulsion. The term "crude oil/water emulsion" here shall include both water-in-oil and oil-in-water emulsions. The oil-water emulsions may comprise, for example, 0.1 to 99% by weight of water. The water may be saline deposit water. With increasing duration of polymer injection, the water produced may, however, also comprise the copolymers injected.

For further processing of the crude oil in the refinery, the crude oil/water emulsion produced has to be separated. For this purpose, it is possible to add demulsifiers in a manner known per se. Plants and processes for splitting crude oil emulsions are known to those skilled in the art. The emulsion is typically split on site, i.e. while still at the oilfield. This may be a plant installed at a production well or a central plant in which the splitting of the crude oil emulsions is undertaken for several production wells of an oilfield.

The splitting already proceeds at the temperature of the freshly produced crude oil emulsion at such a rate that the emulsion can already be split on the way to the treatment plant. This broken emulsion is then separated into pure oil and water, or salt water, in an optionally heated separator and possibly with the aid of an electrical field. The separator may comprise plants which separate only under the influence of gravity, i.e., for example, settling tanks, or else other separators, for example hydrocyclones.

After the separation, the crude oil phase can be transported into the refinery for further processing. The aqueous phase removed can preferably be reused for injection.

If the aqueous phase of the oil-water emulsion produced comprises proportions of the copolymer injected, the phase separation can be delayed or in the extreme case even prevented. It is therefore regularly advisable to at least partly degrade the polymer. This can be done by the addition of oxidizing agents to the aqueous phase. Examples of suitable oxidizing agents comprise hydrogen peroxide, persulfates, hypochlorites or chlorites.

Use of Preferred Copolymers (P)

The nature of the copolymers (P) used for the process according to the invention is guided by factors including the deposit temperature and salinity. The person skilled in the art makes a suitable selection according to the conditions.

In one embodiment of the invention, copolymers (P1) are used in the process according to the invention. Copolymers (P1) are also especially suitable for relatively high salt contents and relatively high formation temperatures. They are therefore suitable especially when formation water is used to make up the aqueous formulations. Of course, it is also possible to use seawater and/or freshwater. The salinity of an aqueous formulation comprising copolymers (P1) may, for example, be 2000 ppm to 350 000 ppm, especially 5000 ppm to 250 000 ppm and, for example, 100 000 ppm to 200 000 ppm. The amount of alkaline earth metal ions may preferably be 1000 to 53 000 ppm. The deposit temperature may especially be 50° C. to 120° C., preferably 50° C. to 100° C. and, for example, 50° C. to 90° C. An advantageous concentration of the copolymer (P1) in the aqueous formulation is at least 0.1% by weight, for example 0.15 to 0.5% by weight. It is of course also possible to use copolymers (P1) under other conditions, especially at deposit temperatures of less than 50° C. and when using freshwater.

In a further embodiment of the invention, copolymers (P2) are used in the process according to the invention. Copolymers (P2) are suitable particularly for salt contents that are not too high. They are therefore suitable especially when seawater is used to make up the aqueous formulations. It is of course also possible to use freshwater. The salinity of an aqueous formulation comprising a copolymer (P2) may, for example, be 2000 ppm to 100 000 ppm, especially 2000 ppm to 60 000 ppm and, for example, 30 000 ppm to 40 000 ppm. The deposit temperature may especially be 35° C. to 90° C., more preferably 35° C. to 80° C. and, for example, 40° C. to 80° C. An advantageous concentration of the copolymer in the aqueous formulation is at least 0.1% by weight, for example 0.15 to 0.5% by weight. Of course, it is also possible to use copolymers (P2) under other conditions, especially at deposit temperatures of less than 35° C. and when using freshwater.

In a further embodiment of the Invention, copolymers (P3) are used in the process according to the invention. Copolymers (P3) are especially suitable for moderate salt contents and moderate formation temperatures. The salinity of an aqueous formulation comprising a copolymer (P3) may, for example, be 5000 ppm to 150 000 ppm, especially 5000 ppm to 100 000 ppm and, for example, 30 000 ppm to 80 000 ppm. The deposit temperature may especially be 40° C. to 100° C., preferably 45° C. to 90° C. and, for example, 45° C. to 85° C. An advantageous concentration of the copolymer (P3) in the aqueous formulation is at least 0.1% by weight, for example 0.15 to 0.5% by weight. Of course, it is also possible to use copolymers (P3) under other conditions, especially at deposit temperatures of less than 50° C. and when using freshwater.

Alkali-Polymer Flooding

In one embodiment of the invention, the process according the invention is an alkali-polymer flooding operation.

For alkali-polymer flooding, an aqueous formulation comprising, as well as water, at least the copolymer (P) described, for example a copolymer (P1), (P2) or (P3), and at least one base is used. The pH of the aqueous formulation is generally at least 8, preferably at least 9, especially 9 to 13, preferably 10 to 12 and, for example, 10.5 to 11.

In principle, it is possible to use any kind of base with which the desired pH can be attained, and the person skilled in the art will make a suitable selection. Examples of suitable bases include alkali metal hydroxides, for example NaOH or KOH, or alkali metal carbonates, for example $Na_2CO_3$. In addition, the bases may be basic salts, for example alkali metal salts of carboxylic acids, phosphoric acid, or especially complexing agents comprising acidic groups in the base form, such as $EDTANa_4$.

The addition of a base has the effect that additional mineral oil can be mobilized. Mineral oil typically also comprises various carboxylic acids, for example naphthenic acids, which are converted to the corresponding salts by the basic formulation. The salts act as naturally occurring surfactants and thus support the process of oil removal.

With regards to further details of the process and of the aqueous formulations used, reference is made to the above description. The formulations used for alkali-polymer flooding may be the above-described formulations, including the preferred embodiments, with the proviso that the formulation additionally comprises at least one base and has the above-described pH.

In one embodiment of the invention, the formulation used for alkali-polymer flooding additionally comprises at least one complexing agent. In this way, it is advantageously possible to prevent unwanted precipitation of sparingly soluble salts, especially Ca and Mg salts, when the alkaline aqueous formulation comes into contact with the corresponding metal ions and/or aqueous formulations for the process comprising corresponding salts are used. The amount of complexing agents is selected by the person skilled in the art. It may, for example, be 0.1 to 4% by weight, based on the sum total of all the components of the aqueous formulation.

Alkali-Surfactant-Polymer Flooding

In a further embodiment of the invention, the process according to the invention is an alkali-surfactant-polymer flooding operation.

For alkali-surfactant-polymer flooding, an aqueous formulation comprising, as well as water, at least the copolymer (P) described, at least one base and at least one surfactant is used. The pH of the aqueous formulation is at least 8, preferably at least 9, especially 9 to 13, preferably 10 to 12 and, for example, 10.5 to 11. Suitable bases have already been mentioned above.

The surfactants used may in principle be any surfactants suitable for surfactant flooding. Surfactants of this kind are known in principle to those skilled in the art. Examples of suitable surfactants for surfactant flooding include surfactants comprising sulfate groups, sulfonate groups, polyoxyalkylene groups, anionically modified polyoxyalkylene groups, betaine groups, glucoside groups or amine oxide groups, for example alkylbenzenesulfonates, olefinsulfonates, amidopropyl betaines, alkyl polyglucosides, alkyl polyalkoxylates or alkyl polyalkoxysulfates, -sulfonates or -carboxylates. It is possible with preference to use anionic surfactants, optionally in combination with nonionic surfactants.

The concentration of the surfactants is generally 0.01% by weight to 2% by weight, preferably 0.05 to 1% by weight and, for example, 0.1 to 0.8% by weight, based on the sum total of all the components of the aqueous formulation.

In a preferred embodiment of the invention, at least one of the surfactants is an anionic surfactant of the general formula $$R^{24}-O-(R^{28}O)_n(R^{29}O)_m(R^{30}O)_l-R^{25}-YM \quad (XII).$$

In formula (XII), $R^{24}$ is an aliphatic, cycloaliphatic and/or aromatic hydrocarbyl group, preferably a linear or branched, aliphatic, preferably primary aliphatic hydrocarbyl group having 10 to 36 carbon atoms, preferably 16 to 36 carbon atoms.

The $R^{20}$ radicals are each independently butylene groups $-CR^{31}(R^{32})-CR^{33}(R^{34})-$ where the $R^{31}$, $R^{32}$, $R^{33}$ and $R^{34}$ radicals are each independently H, methyl or ethyl, with the proviso that the sum total of the carbon atoms $R^{31}$, $R^{32}$, $R^{33}$ and $R^{34}$ is 2 In each case, and where, in at least 70 mol %, preferably at least 80 mol % and more preferably at least 95 mol % of the RN units, $R^{31}$, $R^{32}$ and $R^{33}$ are H and $R^3$ is ethyl.

The $R^{29}$ radicals are 1,2-propylene groups $-CH_2-CH(CH_3)-$ and the $R^{30}$ radicals are ethylene groups $-CH_2-CH_2-$.

$R^{25}$ is a single bond or an alkylene group having 2 to 6 carbon atoms, which may optionally also be substituted by OH groups.

Y is a group selected from the group of sulfate groups, sulfonate groups, carboxylate groups and phosphate groups, preferably sulfate or carboxylate groups, and M is H or a cation, especially an alkali metal cation such as $Na^+$.

In the above formula (XII), in addition, n is a number from 0 to 25, m is a number from 0 to 35 and l is a number from 0 to 50, with the proviso that the sum of n+m+l is 3 to 75, preferably 3 to 50 and where, in addition, $-(R^{28}O)-$, $-(R^{29}O)-$ and $-(R^{30}O)-$ units are incorporated into the surfactant in the sequence shown in formula (XII) to an extent of at least 80 mol %, preferably at least 90 mol %. It will be apparent to the person skilled in the art in the field of alkoxylates that the alkoxylation levels n, m and l are averages. They may also be rational numbers.

In one embodiment of the invention, the $R^{24}$ radicals in the surfactants (XII) are linear aliphatic hydrocarbyl radicals $R^{24a}$ having 12 to 22 carbon atoms, especially linear hydrocarbyl radicals derived from primary fatty alcohols. Radicals derived from fatty alcohols have an even number of carbon atoms, and are frequently mixtures of various radicals. For example, there may be a mixture of a $C_{16}$ radical and a $C_{18}$ radical.

Surfactants (XII) having linear aliphatic $R^{24a}$ radicals may, for example, be alkyl polyalkoxysulfates of the general formula $$R^{24a}-O-(R^{29}O)_m(R^{30}O)_lSO_3M \quad (XIIa)$$

i.e. n=0, $R^{25}$ is a single bond and Y is a sulfate group. In formula (XIIa), m is a number m from 0 to 15 and n is a number from 0 to 15, where the sum of m+l is 3 to 30. Preferably, m is 5 to 15 and n is 0.1 to 15, where the sum of m+l is 5.1 to 25. M is as defined above.

Surfactants (XII) having linear aliphatic $R^{24a}$ radicals may additionally be alkyl polyalkoxysulfates of the general formula $$R^{24a}-O-(R^{28}O)_n(R^{29}O)_m(R^{30}O)_lSO_3M \quad (XIIb)$$

i.e. $R^{25}$ is a single bond and Y is a sulfate group. In formula (XIIb), n is a number from 3 to 15, m is a number m from 0 to 15 and n is a number from 0 to 25, where the sum of n+m+l is 3 to 50, preferably 3 to 35. Preferably, n is 5 to 15, m is 1 to 15 and l is 1 to 25.

Surfactants (XII) having linear aliphatic $R^2$, radicals may additionally be alkyl polycarboxylates of the general formula $$R^{24a}-O-(R^{29}O)_m(R^{30}O)_l-CH_2-CO_2M \quad (XIIc)$$

i.e. n=0, $R^{25}$ is a methylene group $-CH_2-$ and Y is a carboxylate group. In formula (XIIc), m is a number m from 0 to 15 and n is a number from 0 to 15, where the sum of m+l is 3 to 30. Preferably, m is 5 to 15 and n is 0.1 to 15, where the sum of m+l is 5.1 to 25. M is as defined above.

In a further embodiment of the invention, the $R^{24}$ radicals in the surfactants (XII) are branched aliphatic hydrocarbyl radicals $R^{24b}$ having 10 to 36 carbon atoms, preferably 12 to 28 carbon atoms. The mean branching level of the $R^{24}$ radicals is generally 0.1 to 3.5, preferably 0.5 to 3.5, for example 0.9 to 3. The term "branching level" is defined here in a manner known in principle as the number of methyl groups in the $R^{24"}$ radical minus 1. The mean branching level is the statistical mean of the branching levels of all the radicals.

The branched aliphatic radicals $R^{24b}$ may be $R^{24b'}$ radicals which derive from Guerbet alcohols. Radicals derived from Guerbet alcohols comprise 2-branched radicals of the following general formula: $C_{v+2}H_{2(v+2)+1}(C_vH_{2v+1})CH-CH_2-$ (XIII) where v is a number from 3 to 18. Guerbet alcohols can be obtained by condensation of monoalcohols in the presence of bases, forming a dimer, called the Guerbet alcohol, having twice the number of carbon atoms. As well as the dimers, Guerbet alcohols may also obtain radicals of the monomer alcohols and higher condensation products.

Surfactants having branched aliphatic $R^{24b'}$ radicals derived from Guerbet alcohols may, for example, be alkyl polyalkoxysulfates of the general formula $$R^{24b'}-O-(R^{28}O)_n(R^{29}O)_m(R^{30}O)_lSO_3M \quad (XIId)$$

i.e. $R^{25}$ is a single bond and Y is a sulfate group. In formula (XIId), n is a number from 3 to 15, m is a number m from 0 to 15 and n is a number from 0 to 25, where the sum of n+m+l is 3 to 50, preferably 3 to 35. Preferably, n is from 5 to 15, m is 1 to 15 and l is 1 to 25.

Surfactants having branched aliphatic $R^{24b'}$ radicals derived from Guerbet alcohols may additionally be alkyl polyalkoxycarboxylates of the general formula $$R^{24b'}-O-(R^{28}O)_n(R^{29}O)_m(R^{30}O)_l-CH_2-CO_2M \quad (XIIe)$$

i.e. $R^{25}$ is a methylene group and Y is a carboxylate group. In formula (XIIe), n is a number from 0 to 15, m is a number m from 0 to 15 and n is a number from 0 to 25, where the sum of n+m+l is 3 to 50, preferably 3 to 35. Preferably, n is from 0 to 15, m is 1 to 15 and l is 2 to 25.

In one embodiment, the branched aliphatic $R^{24b}$ radicals are $R^{24b"}$ radicals having predominantly methyl branches. For example, the radicals may be those in which 80% of the branches are methyl branches, and which preferably have a branching level of 0.1 to 3.5.

Surfactants having $R^{24b"}$ radicals of this kind may, for example, be alkyl ether sulfates of the general formula $$R^{24b"}-O-(R^{29}O)_m(R^{30}O)_lSO_3M \quad (XIIf)$$

i.e. n=0, RN is a single bond and Y is a sulfate group. In formula (XIIf), m is a number m from 0 to 15 and n is a number from 0 to 15, where the sum of m+l is 3 to 30. Preferably, m is 5 to 15 and n is 0.1 to 15, where the sum of m+l is 5.1 to 25. M is as defined above. For example, $R^{24''}$ may have 16 to 17 aliphatic carbon atoms.

In a further embodiment of the invention, the surfactants are alkyl ether sulfates of the general formula

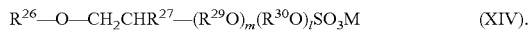
(XIV).

In formula (XIV), m is a number m from 0 to 35 and n is a number from 0 to 55, where the sum of m+l is 3 to 60. Preferably, m is 5 to 15 and n is 0.1 to 15, where the sum of m+I is 5.1 to 25. $R^{26}$ represents linear or branched aliphatic hydrocarbyl radicals comprising 4 to 22 carbon atoms. $R^{27}$ represents linear aliphatic hydrocarbyl radicals comprising 8 to 22 carbon atoms.

In a further embodiment of the invention, the surfactants are alkylarylsulfonates, for example alkylbenzenesulfonates. Examples of such surfactants include dodecylbenzenesulfonate and hexadecylbenzenesulfonate.

In a further embodiment of the invention, the surfactants are arylalkylsulfonates, for example phenylalkylsulfonates. Examples of such surfactants include phenyldodecylsulfonate.

In a further embodiment of the invention, the surfactants are paraffinsulfonates, for example secondary paraffinsulfonate comprising 14 to 17 carbon atoms.

In a further embodiment of the invention, the surfactants are olefinsulfonates, for example α-olefinsulfonates, preferably internal olefinsulfonates having 12 to 32 carbon atoms. Olefinsulfonates are obtained in a manner known in principle by sulfonating corresponding olefins. Preference is given to internal olefinsulfonates having 12 to 28 carbon atoms, for example internal $C_{15/16}$-olefinsulfonates, internal $C_{19/23}$-olefinsulfonates, internal $C_{20/24}$-olefinsulfonates or internal $C_{24/28}$-olefinsulfonates.

In a further embodiment of the invention, the surfactants are alkyl polyglucosides where the alkyl moiety comprises 8 to 18 aliphatic carbon atoms.

In a further embodiment of the Invention, the surfactants are alkyl ethoxylates where the alkyl moiety comprises 8 to 36 aliphatic carbon atom and the surfactant has an ethoxylation level of 8 to 39.

With regard to further details of the process and of the aqueous formulations used, reference is made to the above description. The formulations used for alkali-surfactant-polymer flooding may be the above-described formulations, including the preferred embodiments, with the proviso that the formulation additionally comprises at least one base and at least one surfactant, preferably the surfactants just outlined, and has the above-described pH.

In one embodiment of the invention, the formulation used for alkali-surfactant-polymer flooding additionally comprises at least one complexing agent. It is advantageously possible in this way to avoid unwanted precipitation of sparingly soluble salts, especially Ca and Mg salts, when the alkaline aqueous formulation comes into contact with the corresponding metal ions and/or aqueous formulations for the process comprising corresponding salts are used. The amount of complexing agents is selected by the person skilled in the art. It may, for example, be 0.1 to 4% by weight, based on the sum total of all the components of the aqueous formulation.

Combined Process

The process according to the invention can of course be combined with further process steps.

In one embodiment, the process can be combined with water flooding. In water flooding, water is injected into a mineral oil deposit through at least one injection well and crude oil is withdrawn from the deposit through at least one production well. The water may be freshwater or saline water, for example seawater or deposit water. After the water flooding, the process according the invention for polymer flooding can be employed.

In a further embodiment, the process can also be combined with surfactant flooding. In surfactant flooding, an aqueous surfactant solution is injected into a mineral oil deposit through at least one injection well and crude oil is withdrawn from the deposit through at least one production well. The water may be freshwater or saline water, such as seawater or deposit water. The surfactants may be the abovementioned surfactants, including the preferred surfactants described. The aqueous surfactant solution may also additionally comprise a base. Such a technique is called alkali-surfactant flooding. Possible process sequences are water flooding→surfactant flooding→polymer flooding or water flooding→alkali-surfactant flooding→polymer flooding.

Of course, the process according the invention can also be employed several times in succession with varying aqueous formulations. For example, it is possible to increase the concentration of the polymer in the formulations stepwise. A further combination may comprise, as the first step, alkali-surfactant flooding, followed by polymer flooding without surfactant and alkali as the second step.

A further embodiment comprises alkali-surfactant-polymer flooding as the first step, followed by polymer flooding without surfactant and alkali as the second step.

A further embodiment comprises surfactant-polymer flooding as the first step, followed by polymer flooding without surfactant as the second step.

In each of the latter combinations, aqueous formulations having higher salinity can be used in the first step than in the second step. Alternatively, both steps can also be conducted with water of equal salinity.

A further embodiment comprises the pumping of the aqueous polymer solution in the presence of, or in alternation with, gases (e.g. nitrogen, methane, ethane, propane, butane or carbon dioxide). This process can optionally be conducted in the presence of surfactants.

Advantages of the Invention

The hydrophobically associating copolymers known in the prior art, for example from WO 2010/133527 A2, WO 2012/069477 A1 or WO 2012/069478 A1 have the structure $H_2C=CH-R-O-(EO)_{10-150}(AO)_{5-15}R'$ where EO represents ethoxy groups, AO represents alkoxy groups having at least 4 carbon atoms, R represents a linking group and R' represents H or a hydrocarbyl radical having 1 to 30 carbon atoms, meaning that they have a terminal hydrophobic group.

The inventive copolymers (P) having the macromonomers (B) comprise macromonomers (B2) which likewise have a terminal hydrophobic group, and also macromonomers (B1) which additionally have a short hydrophilic terminal group. Surprisingly, the short terminal hydrophilic group does not impair the association in aqueous solution, but on the contrary actually results in an improvement in the properties of the copolymer.

Aqueous solutions of the associative copolymers according to WO 2012/069477 A1 having the macromonomers $H_2C=CH-R-O-(EO)_{10-150}(AO)_{5-15}R'$ have a characteristic profile of viscosity as a function of temperature. FIGS. 1a and 1b each show the dependence of the viscosity of aqueous solutions of various copolymers on temperature, specifically the viscosity of two commercial, non-associative copolymers, namely of a copolymer of about 50% by weight of acrylamide and about 50% by weight of sodium-ATBS (copolymer V3), ATBS=sodium salt of 2-acrylamido-2-methylpropanesulfonic acid), of a copolymer of 75 mol % of acrylamide and 25 mol % of sodium acrylate (copolymer V4), and additionally of an associative copolymer of about 50% by weight of acrylamide, about 48% by weight of sodium-ATBS and 2% by weight of said macromonomer (copolymer VI). In the case of the two commercial, non-associative copolymers, the viscosity decreases with increasing temperature. In the case of the associative copolymer, the viscosity of aqueous solutions at first distinctly increases, passes through a maximum at about 60° C., and then decreases again.

Aqueous solutions of the associative copolymers according to WO 2012/069477 A1 thus have a particularly high viscosity efficiency in the region of 60° C.

In the case of aqueous solutions of the inventive copolymers (P), the viscosity of the solutions with increasing temperature at first increases up to a maximum at about 60° C., as in the case of the copolymers from WO 2012/069477 A1. As the temperature rises further, the viscosity surprisingly, according to the copolymer and salinity, at least does not decrease as significantly or even remains more or less constant up to 90° C.

The inventive copolymers (P) thus have, at temperatures above 60° C., a better viscosity efficiency than the copolymers known from the prior art and allow more economically viable polymer flooding even at higher deposit temperatures.

The following examples are intended to illustrate the invention in detail:

Preparation of the Macromonomers (B):

Abbreviations

HBVE hydroxybutyl vinyl ether, $H_2C=CH-O-(CH_2)_4-OH$
EO ethylene oxide
BuO butylene oxide (>85% by weight of butylene 1,2-oxide)
PeO pentene oxide (predominantly pentene 1,2-oxide)
Macromonomer 1:
Alkoxylation of HBVE with 24.5 EO, followed by 16 BuO, followed by 3.5 EO
Mixture of pressure was set to 0.5 bar gauge (1.5 bar absolute) and the vessel was heated to 120° C. It was decompressed to 1 bar absolute and 1126 g (25.6 mol) of ethylene oxide (EO) were metered in up to p 3.9 bar absolute and $T_{max}$ 150° C. After 300 g EO had been metered in, the metered addition was stopped (about 3 h after the start), and the vessel was left for 30 min and decompressed to 1.3 bar absolute. Thereafter, the rest of the EO was metered in. The metered addition of EO including the decompression lasted for a total of 10 h.

The mixture was stirred to constant pressure at about 145-150° C. (1 h), cooled to 100° C. and freed of low boilers at a pressure of less than 10 mbar for 1 h. The material was dispensed at 80° C. under $N_2$. The analysis (OH number, GPC, 1H NMR in $CDCl_3$, 1H NMR in MeOD) confirmed the structure HBVE—22 EO.

A 2 l pressure autoclave with an anchor stirrer was initially charged with 588.6 g (0.543 mol) of HBVE-22 EO, and the stirrer was switched on. Thereafter, 2.39 g of 50% NaOH solution (0.030 mol of NaOH, 1.19 g of NaOH) were added, a vacuum of <10 mbar was applied, and the mixture was heated to 100° C. and kept there for 80 min in order to distill off the water. The vessel was purged three times with $N_2$. Thereafter, the vessel was tested for leaks, the pressure was set to 0.5 bar gauge (1.5 bar absolute), the vessel was heated to 127° C. and then the pressure was adjusted to 1.6 bar absolute. 59.7 g (1.358 mol) of EO were metered in at 127° C.; $p_{max}$ was 3.9 bar absolute. Establishment of constant pressure was awaited, which took 30 min, then the vessel was decompressed to 1.0 bar absolute. 625.5 g (8.688 mol) of BuO (butylene oxide) were metered in at 127° C.; $p_{max}$ was 3.1 bar absolute. An intermediate decompression was conducted because of an increase in fill level. The metered addition of BuO was stopped, the mixture was left to react for 1 h until the pressure was constant, and the vessel was decompressed to 1.0 bar absolute. Thereafter, the metered addition of BuO was continued. $P_{max}$ was still 3.1 bar (first decompression after 610 g of BuO, total metering time for BuO 8 h including break for decompression). After the metered addition of BuO had ended, the mixture was left to react for a further 8 h and then heated up to 135° C. The vessel was decompressed to 1.6 bar absolute. Thereafter, 83.6 g (1.901 mol) of EO (ethylene oxide) were metered in at 135° C.; $p_{max}$ was 3.1 bar absolute. After the metered addition of EO had ended, the mixture was left to react for a further 4 h. The mixture was cooled to 100° C., and residual oxide was drawn off until the pressure was below 10 mbar for at least 10 min. Then 0.5% water was added at 120° C. and then drawn off until the pressure was below 10 mbar

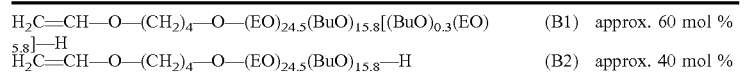

| | | |
|---|---|---|
| $H_2C=CH-O-(CH_2)_4-O-(EO)_{24.5}(BuO)_{15.8}[(BuO)_{0.3}(EO)_{5.8}]-H$ | (B1) | approx. 60 mol % |
| $H_2C=CH-O-(CH_2)_4-O-(EO)_{24.5}(BuO)_{15.8}-H$ | (B2) | approx. 40 mol % |

Preparation Method:

A 2 l pressure autoclave with an anchor stirrer was initially charged with 135.3 g (1.16 mol) of hydroxybutyl vinyl ether (HBVE) (stabilized with 100 ppm of potassium hydroxide (KOH)), and the stirrer was switched on. 1.06 g of potassium methoxide (KOMe) solution (32% KOMe in methanol (MeOH), corresponding to 0.0048 mol of potassium) were run in and the stirred vessel was evacuated to a pressure of 10-20 mbar, heated up to 65° C. and operated at 65° C. and a pressure of 10-20 mbar for 70 min. MeOH was distilled off. The vessel was purged three times with $N_2$ (nitrogen). Thereafter, the vessel was tested for leaks, the for at least 10 min. The vacuum was broken with $N_2$, and 100 ppm of BHT were added. The dispensing was effected at 80° C. under $N_2$. The analysis (mass spectrum, GPC, 1H NMR in $CDCl_3$, 1H NMR In MeOD) confirmed the mean composition HBVE—24.5 EO—16 BuO—3.5 EO.

Determination of the Amounts of the Macromonomers B1 and B2:

The macromonomers (B1) have a secondary, terminal OH group, whereas the macromonomers (B2) have a primary terminal OH group. They can therefore be distinguished by an analysis by means of 1H NMR in $CDCl_3$ in the presence of the shift reagent TAI (trichloroacetyl isocyanate), and the ratio of (B1) to (B2) can be determined quantitatively.

Since the enol ether group in HBVE-based products is acid-sensitive and could be hydrolyzed under the test conditions and form primary alcohols, which could distort the test result, the ratio of the monomers B1 and B2 was determined by conducting an experiment with butyldiglycol (BDG, $H_3C-(CH_2)_3-O-CH_2CH_2O-CH_2-CH_2H$), which is more stable to acid hydrolysis, instead of HBVE.

For the determination, BDG was alkoxylated first with 3 equivalents of BuO, followed by 3.5 equivalents of EO, under the abovementioned conditions. The BDG—3 BuO intermediate had exclusively secondary terminal OH groups. After the alkoxylation with 3.5 EO, 40 mol % of secondary alcohol and 60 mol % of primary alcohol were found, and so a portion of the BDG—3 BuO intermediates were not ethoxylated at all. The intermediates which have been ethoxylated accordingly comprise more than 3.5 equivalents of EO. This result can be explained as follows: the first EO molecule reacts with the sterically congested secondary alcohol and forms a sterically less congested and hence more reactive primary alcohol. The next EO molecule reacts preferentially with the primary alcohol group already formed and not with the secondary alcohol group.

Determination of Residual Amounts of Butylene Oxide

The value of c was determined by determining the residual content of butylene oxide in each reaction mixture after the end of the butoxylation (i.e. HBVE→24.5 EO→16 BuO) and after the end of the second ethoxylation (i.e. HBVE→24.5 EO→16 BuO→3.5 EO).

In the case of HBVE→24.5 EO→16 BuO, the method was conducted up to the end of the metered addition of BuO, including the further reaction for 8 h, and the subsequent ethoxylation was omitted. The batch was weighed, then vacuum (<10 mbar) was applied at 100° C. for 2 h and the batch was weighed again. About 6000 ppm of volatile component was removed, which was identified by GC headspace as butylene 1,2-oxide.

In the case of HBVE→24.5 EO→16 BuO→3.5 EO, the batch was weighed in an analogous manner after the last ethoxylation, including the further reaction time, then vacuum (<10 mbar) was applied at 100° C. for 2 h and the batch was weighed again. About 1500 ppm of volatile component was removed, which was identified by GC headspace as butylene 1,2-oxide.

Thus, about 4500 ppm of BuO was incorporated into the macromonomer during the final ethoxylation, and so the terminal EO blocks of the macromonomers B1 comprise small amounts of BuO. From the amounts, a value of c of about 0.3 is calculated.

Macromonomer 1a:

Alkoxylation of HBVE with 24.5 EO, followed by 16 BuO, followed by 3.5 EO

The procedure was as for macromonomer 1, except that butoxylation and ethoxylation were effected at a pressure of up to 6 bar.

A 2 l pressure autoclave with an anchor stirrer was initially charged with 135.3 g (1.16 mol) of hydroxybutyl vinyl ether (HBVE) (stabilized with 100 ppm of potassium hydroxide (KOH)), and the stirrer was switched on. 1.06 g of potassium methoxide (KOMe) solution (32% KOMe in methanol (MeOH), corresponding to 0.0048 mol of potassium) were run in and the stirred vessel was evacuated to a pressure of 10-20 mbar, heated up to 65° C. and operated at 65° C. and a pressure of 10-20 mbar for 70 min. MeOH was distilled off. The vessel was purged three times with $N_2$ (nitrogen). Thereafter, the vessel was tested for leaks, the pressure was set to 0.5 bar gauge (1.5 bar absolute) and the vessel was heated to 120° C. It was decompressed to 1 bar absolute and 1126 g (25.6 mol) of ethylene oxide (EO) were metered in up to $p_{max}$ 3.9 bar absolute and $T_{max}$ 150° C. After 300 g EO had been metered in, the metered addition was stopped (about 3 h after the start), and the vessel was left for 30 min and decompressed to 1.3 bar absolute. Thereafter, the rest of the EO was metered in. The metered addition of EO including the decompression lasted for a total of 10 h.

The mixture was stirred to constant pressure at about 145-150° C. (1 h), cooled to 100° C. and freed of low boilers at a pressure of less than 10 mbar for 1 h. The material was dispensed at 80° C. under $N_2$. The analysis (OH number, GPC, 1H NMR In $CDCl_3$, 1H NMR in MeOD) confirmed the structure HBVE—22 EO.

A 2 l pressure autoclave with an anchor stirrer was initially charged with 568.6 g (0.525 mol) of HBVE-22 EO, and the stirrer was switched on. Thereafter, 2.31 g of 50% NaOH solution (0.029 mol of NaOH, 1.16 g of NaOH) were added, a vacuum of <10 mbar was applied, and the mixture was heated to 100° C. and kept there for 80 min in order to distill off the water. The vessel was purged three times with $N_2$. Thereafter, the vessel was tested for leaks, the pressure was set to 0.5 bar gauge (1.5 bar absolute), the vessel was heated to 127° C. and then the pressure was adjusted to 3 bar absolute. 57.7 g (1.311 mol) of EO were metered in at 127° C.; $p_{max}$ was 6 bar absolute. Establishment of constant pressure was awaited, which took 30 min, then the vessel was decompressed to 4.0 bar absolute. 604.2 g (8.392 mol) of BuO (butylene oxide) were metered in at 127° C.; $p_{max}$ was 6 bar absolute. An intermediate decompression was conducted because of an increase in fill level. The metered addition of BuO was stopped, the mixture was left to react for 1 h until the pressure was constant, and the vessel was decompressed to 4.0 bar absolute. Thereafter, the metered addition of BuO was continued. $P_{max}$ was still 6 bar (first decompression after 505 g of BuO, total metering time for BuO 11 h including break for decompression). After the metered addition of BuO had ended, the mixture was left to react at 127° C. for a further 6 h. The vessel was decompressed to 4 bar absolute. Thereafter, 80.8 g (1.836 mol) of EO (ethylene oxide) were metered in at 127° C.; $p_{max}$ was 6 bar absolute. After the metered addition of EO had ended, the mixture was left to react for a further 4 h. The mixture was cooled to 100° C., and residual oxide was drawn off until the pressure was below 10 mbar for at least 10 min. About 1400 ppm of volatile components were removed. Then 0.5% water was added at 120° C. and then drawn off until the pressure was below 10 mbar for at least 10 min. The vacuum was broken with $N_2$, and 100 ppm of BHT were added. The dispensing was effected at 80° C. under $N_2$. The analysis (mass spectrum, GPC, 1H NMR in $CDCl_3$, 1H NMR in MeOD) confirmed the mean composition HBVE—24.5 EO—16 BuO—3.5 EO.

Macromonomer 1b:

Alkoxylation of HBVE with 24.5 EO, followed by 16 BuO, followed by 3.5 EO

The procedure was as for macromonomer 1, except that butoxylation was effected at a pressure of 0.3 up to 2 bar absolute.

A 2 l pressure autoclave with an anchor stirrer was initially charged with 135.3 g (1.16 mol) of hydroxybutyl vinyl ether (HBVE) (stabilized with 100 ppm of potassium hydroxide (KOH)), and the stirrer was switched on. 1.06 g of potassium methoxide (KOMe) solution (32% KOMe in methanol (MeOH), corresponding to 0.0048 mol of potassium) were run in and the stirred vessel was evacuated to a pressure of 10-20 mbar, heated up to 65° C. and operated at 65° C. and a pressure of 10-20 mbar for 70 min. MeOH was distilled off. The vessel was purged three times with N₂ (nitrogen). Thereafter, the vessel was tested for leaks, the pressure was set to 0.5 bar gauge (1.5 bar absolute) and the vessel was heated to 120° C. It was decompressed to 1 bar absolute and 1126 g (25.6 mol) of ethylene oxide (EO) were metered in up to $p_{max}$ 3.9 bar absolute and $T_{max}$ 150° C. After 300 g EO had been metered in, the metered addition was stopped (about 3 h after the start), and the vessel was left for 30 min and decompressed to 1.3 bar absolute. Thereafter, the rest of the EO was metered in. The metered addition of EO including the decompression lasted for a total of 10 h.

The mixture was stirred to constant pressure at about 145-150° C. (1 h), cooled to 100° C. and freed of low boilers at a pressure of less than 10 mbar for 1 h. The material was dispensed at 80° C. under N₂. The analysis (OH number, GPC, 1H NMR in CDCl₃, 1H NMR in MeOD) confirmed the structure HBVE—22 EO.

A 2 l pressure autoclave with an anchor stirrer was initially charged with 568.6 g (0.525 mol) of HBVE-22 EO, and the stirrer was switched on. Thereafter, 2.31 g of 50% NaOH solution (0.029 mol of NaOH, 1.16 g of NaOH) were added, a vacuum of <10 mbar was applied, and the mixture was heated to 100° C. and kept there for 80 min in order to distill off the water. The vessel was purged three times with N₂. Thereafter, the vessel was tested for leaks, the pressure was set to 0.5 bar gauge (1.5 bar absolute), the vessel was heated to 127° C. and then the pressure was adjusted to 3 bar absolute. 57.7 g (1.311 mol) of EO were metered in at 127° C.; $p_{max}$ was 6 bar absolute. Establishment of constant pressure was awaited, which took 30 min, then the vessel was decompressed to 1.0 bar absolute. Vacuum was applied and the pressure was lowered to 0.3 bar absolute. 604.2 g (8.392 mol) of BuO (butylene oxide) were metered in at 127° C.; $p_{max}$ was 2 bar absolute. There was no need for any intermediate decompression because of an Increase in fill level (metered addition of BuO took about 14 h). After the metered addition of BuO had ended, the mixture was left to react at 127° C. for a further 5 h. N₂ was injected and a pressure of 3 bar absolute was established. Thereafter, 80.8 g (1.836 mol) of EO (ethylene oxide) were metered in at 127° C.; $p_{max}$ was 6 bar absolute. After the metered addition of EO had ended, the mixture was left to react for a further 4 h. The mixture was cooled to 100° C., and residual oxide was drawn off until the pressure was below 10 mbar for at least 10 min. About 1400 ppm of volatile components were removed. Then 0.5% water was added at 120° C. and then drawn off until the pressure was below 10 mbar for at least 10 min. The vacuum was broken with N₂, and 100 ppm of BHT were added. The dispensing was effected at 80° C. under N₂. The analysis (mass spectrum, GPC, 1H NMR In CDCl₃, 1H NMR in MeOD) confirmed the mean composition HBVE—24.5 EO—16 BuO—3.5 EO.

Macromonomer 2:
Alkoxylation of HBVE with 24.5 EO, followed by 16 BuO, followed by 5 EO
Mixture of hydroxide (KOH)), and the stirrer was switched on. 1.06 g of potassium methoxide (KOMe) solution (32% KOMe in methanol (MeOH), corresponding to 0.0048 mol of potassium) were run in and the stirred vessel was evacuated to a pressure of 10-20 mbar, heated up to 65° C. and operated at 65° C. and a pressure of 10-20 mbar for 70 min. MeOH was distilled off. The vessel was purged three times with N₂ (nitrogen). Thereafter, the vessel was tested for leaks, the pressure was set to 0.5 bar gauge (1.5 bar absolute) and the vessel was heated to 120° C. It was decompressed to 1 bar absolute and 1126 g (25.6 mol) of ethylene oxide (EO) were metered in up to $p_{max}$ 3.9 bar absolute and $T_{max}$ 150° C. After 300 g EO had been metered in, the metered addition was stopped (about 3 h after the start), and the vessel was left for 30 min and decompressed to 1.3 bar absolute. Thereafter, the rest of the EO was metered in. The metered addition of EO including the decompression lasted for a total of 10 h.

The mixture was stirred to constant pressure at about 145 to 150° C. (1 h), cooled to 100° C. and freed of low boilers at a pressure of less than 10 mbar for 1 h. The material was dispensed at 80° C. under N₂. The analysis (OH number, GPC, 1H NMR in CDCl₃, 1H NMR in MeOD) confirmed the structure HBVE—22 EO.

A 2 l pressure autoclave with an anchor stirrer was initially charged with 566.4 g (0.522 mol) of HBVE-22 EO, and the stirrer was switched on. Thereafter, 2.30 g of 50% NaOH solution (0.029 mol of NaOH, 1.15 g of NaOH) were added, a vacuum of <10 mbar was applied, and the mixture was heated to 100° C. and kept there for 80 min in order to distill off the water. The vessel was purged three times with N₂. Thereafter, the vessel was tested for leaks, the pressure was set to 0.5 bar gauge (1.5 bar absolute), the vessel was heated to 127° C. and then the pressure was adjusted to 1.1 bar absolute. 57.5 g (1.306 mol) of EO were metered in at 127° C.; $p_{max}$ was 3.9 bar absolute. Establishment of constant pressure was awaited, which took 30 min, then the vessel was decompressed to 1.0 bar absolute. 601.7 g (8.357 mol) of BuO (butylene oxide) were metered in at 127° C.; $p_{max}$ was 3.1 bar absolute. An intermediate decompression was conducted because of an increase in fill level. The metered addition of BuO was stopped, the mixture was left to react for 1 h until the pressure was constant, and the vessel was decompressed to 1.0 bar absolute. Thereafter, the metered addition of BuO was continued. $P_{max}$ was still 3.1 bar (first decompression after 450 g of BuO, total metering time for BuO 8 h including break for decompression). After the metered addition of BuO had ended, the mixture was left to react for a further 8 h and then heated up to 135° C. The vessel was decompressed to 1.6 bar absolute. Thereafter, 114.9 g (2.612 mol) of EO (ethylene oxide) were metered in at 135° C.; $p_{max}$ was 3.1 bar absolute. After the metered addition of EO had ended, the mixture was left to react for a further 5 h. The mixture was cooled to 100° C., and residual oxide was drawn off until the pressure was below 10 mbar for at least 10 min. Then 0.5% water was added at 120° C. and then drawn off until the pressure was below 10 mbar for at least 10 min. The vacuum was broken with N₂, and 100 ppm of BHT were added. The dispensing was effected

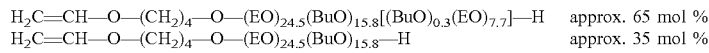

| H₂C=CH—O—(CH₂)₄—O—(EO)₂₄.₅(BuO)₁₅.₈[(BuO)₀.₃(EO)₇.₇]—H | approx. 65 mol % |
| H₂C=CH—O—(CH₂)₄—O—(EO)₂₄.₅(BuO)₁₅.₈—H | approx. 35 mol % |

A 2 l pressure autoclave with an anchor stirrer was initially charged with 135.3 g (1.16 mol) of hydroxybutyl vinyl ether (HBVE) (stabilized with 100 ppm of potassium at 80° C. under N₂. The analysis (mass spectrum, GPC, 1H NMR in CDCl₃, 1H NMR in MeOD) confirmed the mean composition HBVE—24.5 EO—16 BuO—5 EO.

The amounts of the macromonomers B1 and B2 and value of c were determined analogously to the procedure for macromonomer 1. Thus, in after the butoxylation HBVE→24.5 EO→16 BuO, about 6000 ppm of volatile components are found, which were identified as butene 1,2-oxide. After addition of 5 eq of EO, the proportion of volatile components was lowered to about 1200 ppm. From this, a value for c of about 0.3 is calculated.

Macromonomer 3:

Alkoxylation of HBVE with 22 EO, followed by 10 PeO, followed by 2.5 EO

Mixture of

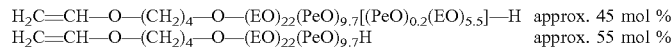

H$_2$C═CH—O—(CH$_2$)$_4$—O—(EO)$_{22}$(PeO)$_{9.7}$[(PeO)$_{0.2}$(EO)$_{5.5}$]—H    approx. 45 mol %
H$_2$C═CH—O—(CH$_2$)$_4$—O—(EO)$_{22}$(PeO)$_{9.7}$H    approx. 55 mol %

Preparation Method:
Preparation Method:

A 2 l pressure autoclave with an anchor stirrer was initially charged with 135.3 g (1.16 mol) of hydroxybutyl vinyl ether (HBVE) (stabilized with 100 ppm of potassium hydroxide (KOH)), and the stirrer was switched on. 1.06 g of potassium methoxide (KOMe) solution (32% KOMe in methanol (MeOH), corresponding to 0.0048 mol of potassium) were run in and the stirred vessel was evacuated to a pressure of 10-20 mbar, heated up to 65° C. and operated at 65° C. and a pressure of 10-20 mbar for 70 min. MeOH was distilled off. The vessel was purged three times with N$_2$ (nitrogen). Thereafter, the vessel was tested for leaks, the pressure was set to 0.5 bar gauge (1.5 bar absolute) and the vessel was heated to 120° C. It was decompressed to 1 bar absolute and 1126 g (25.6 mol) of ethylene oxide (EO) were metered in up to p$_{max}$ 3.9 bar absolute and T$_{max}$ 150° C. After 300 g EO had been metered in, the metered addition was stopped (about 3 h after the start), and the vessel was left for 30 min and decompressed to 1.3 bar absolute. Thereafter, the rest of the EO was metered in. The metered addition of EO including the decompression lasted for a total of 10 h.

The mixture was stirred to constant pressure at about 145-150° C. (1 h), cooled to 100° C. and freed of low boilers at a pressure of less than 10 mbar for 1 h. The material was dispensed at 80° C. under N$_2$. The analysis (OH number, GPC, 1H NMR in CDCl$_3$, 1H NMR in MeOD) confirmed the structure HBVE—22 EO.

A 2 l pressure autoclave with an anchor stirrer was initially charged with 713.6 g (0.658 mol) of HBVE-22 EO, and the stirrer was switched on. Thereafter, 2.89 g of 50% NaOH solution (0.036 mol of NaOH, 1.45 g of NaOH) were added, a vacuum of <10 mbar was applied, and the mixture was heated to 100° C. and kept there for 80 min in order to distill off the water. The vessel was purged three times with N$_2$. Thereafter, the vessel was tested for leaks, the pressure was set to 0.5 bar gauge (1.5 bar absolute), the vessel was heated to 127° C. and then the pressure was adjusted to 1.1 bar absolute. 566.1 g (6.583 mol) of PeO (pentene oxide) were metered in at 127° C.; p$_{max}$ was 2.1 bar absolute. An intermediate decompression was conducted because of an Increase in fill level. The metered addition of PeO was stopped, the mixture was left to react for 1 h until the pressure was constant, and the vessel was decompressed to 1.0 bar absolute. Thereafter, the metered addition of PeO was continued. P$_{max}$ was still 2.1 bar (first decompression after 310 g of PeO, total metering time for PeO 6.5 h including break for decompression). After the metered addition of PeO had ended, the mixture was left to react for a further 2 h and then heated up to 135° C. The vessel was decompressed to 1.6 bar absolute. Thereafter, 72.4 g (1.646 mol) of EO (ethylene oxide) were metered in at 135° C.; p$_{max}$ was 3.1 bar absolute. After the metered addition of EO had ended, the mixture was left to react for a further 5 h. The mixture was cooled to 100° C., and residual oxide was drawn off until the pressure was below 10 mbar for at least 10 min. Then 0.5% water was added at 120° C. and then drawn off until the pressure was below 10 mbar for at least 10 min. The vacuum was broken with N$_2$, and 100 ppm of BHT were added. The dispensing was effected at 80° C. under N$_2$. The analysis (mass spectrum, GPC, 1H NMR in CDCl$_3$, 1H NMR in MeOD) confirmed the mean composition HBVE→22 EO→10 PeO→2.5 EO.

The amounts of the macromonomers B1 and B2 and value of c were determined analogously to the procedure for macromonomer 1. Thus, in the case of HBVE→22 EO→10 PeO, about 12 000 ppm of volatile components are found, which were identified as pentene 1,2-oxide. After addition of 2.5 eq of EO, the proportion of volatile components was lowered to about 9000 ppm. From this, a value for c of about 0.2 is calculated.

Macromonomer 4:

Alkoxylation of HBVE with 22 EO, followed by 10 PeO, followed by 9 EO

Mixture of

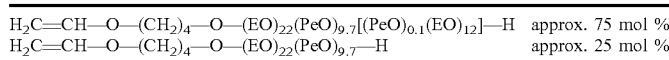

H$_2$C═CH—O—(CH$_2$)$_4$—O—(EO)$_{22}$(PeO)$_{9.7}$[(PeO)$_{0.1}$(EO)$_{12}$]—H    approx. 75 mol %
H$_2$C═CH—O—(CH$_2$)$_4$—O—(EO)$_{22}$(PeO)$_{9.7}$—H    approx. 25 mol %

Preparation Method:

A 2 l pressure autoclave with an anchor stirrer was initially charged with 135.3 g (1.16 mol) of hydroxybutyl vinyl ether (HBVE) (stabilized with 100 ppm of potassium hydroxide (KOH)), and the stirrer was switched on. 1.06 g of potassium methoxide (KOMe) solution (32% KOMe in methanol (MeOH), corresponding to 0.0048 mol of potassium) were run in and the stirred vessel was evacuated to a pressure of 10-20 mbar, heated up to 65° C. and operated at 65° C. and a pressure of 10-20 mbar ° C. for 70 min. MeOH was distilled off. The vessel was purged three times with N$_2$ (nitrogen). Thereafter, the vessel was tested for leaks, the pressure was set to 0.5 bar gauge (1.5 bar absolute) and the vessel was heated to 120° C. It was decompressed to 1 bar absolute and 1126 g (25.6 mol) of ethylene oxide (EO) were metered in up to p$_{max}$ 3.9 bar absolute and T$_{max}$ 150° C. After 300 g EO had been metered in, the metered addition was stopped (about 3 h after the start), and the vessel was left for 30 min and decompressed to 1.3 bar absolute. Thereafter, the rest of the EO was metered in. The metered addition of EO including the decompression lasted for a total of 10 h.

The mixture was stirred to constant pressure at about 145-150° C. (1 h), cooled to 100° C. and freed of low boilers at a pressure of less than 10 mbar for 1 h. The material was dispensed at 80° C. under N$_2$. The analysis (OH number, GPC, 1H NMR in CDCl$_3$, 1H NMR in MeOD) confirmed the structure HBVE—22 EO.

A 2 l pressure autoclave with an anchor stirrer was initially charged with 611.5 g (0.564 mol) of HBVE-22 EO, and the stirrer was switched on. Thereafter, 2.48 g of 50% NaOH solution (0.031 mol of NaOH, 1.24 g of NaOH) were added, a vacuum of <10 mbar was applied, and the mixture was heated to 100° C. and kept there for 80 min in order to distill off the water. The vessel was purged three times with N$_2$. Thereafter, the vessel was tested for leaks, the pressure was set to 0.5 bar gauge (1.5 bar absolute), the vessel was heated to 127° C. and then the pressure was adjusted to 1.1 bar absolute. 485.1 g (5.641 mol) of PeO (pentene oxide) were metered in at 127° C.; $p_{max}$ was 2.1 bar absolute. An intermediate decompression was conducted because of an increase in fill level. The metered addition of PeO was stopped, the mixture was left to react for 1 h until the pressure was constant, and the vessel was decompressed to 1.0 bar absolute. Thereafter, the metered addition of PeO was continued. $P_{max}$ was still 2.1 bar (first decompression after 360 g of PeO, total metering time for PeO 9 h including break for decompression). After the metered addition of PeO had ended, the mixture was left to react for a further 9 h and then heated up to 135° C. The vessel was decompressed to 1.6 bar absolute. Thereafter, 223.4 g (5.077 mol) of EO (ethylene oxide) were metered in at 135° C.; $p_{max}$ was 3.1 bar absolute. After the metered addition of EO had ended, the mixture was left to react for a further 5 h. The mixture was cooled to 100° C., and residual oxide was drawn off until the pressure was below 10 mbar for at least 10 min. Then 0.5% water was added at 120° C. and then drawn off until the pressure was below 10 mbar for at least 10 min. The vacuum was broken with N$_2$, and 100 ppm of BHT were added. The dispensing was effected at 80° C. under N$_2$. The analysis (mass spectrum, GPC, 1H NMR in CDCl$_3$, 1H NMR in MeOD) confirmed the structure HBVE—22 EO—10 PeO—9 EO.

The amounts of the macromonomers B1 and B2 and value of c were determined analogously to the procedure for macromonomer 1. Thus, in the case of HBVE—22 EO—10 PeO, about 12 000 ppm of volatile components are found, which were identified as pentene 1,2-oxide. After addition of 9 eq of EO, the proportion of volatile components was lowered to about 6000 ppm. From this, a value for c of about 0.1 is calculated.

Macromonomer V1:

Alkoxylation of HBVE with 22 EO, followed by 10 PeO

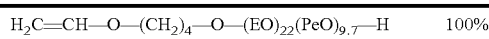

H$_2$C=CH—O—(CH$_2$)$_4$—O—(EO)$_{22}$(PeO)$_{9.7}$—H    100%

A 2 l pressure autoclave with an anchor stirrer was initially charged with 135.3 g (1.16 mol) of hydroxybutyl vinyl ether (HBVE) (stabilized with 100 ppm of potassium hydroxide (KOH)), and the stirrer was switched on. 1.06 g of potassium methoxide (KOMe) solution (32% KOMe in methanol (MeOH), corresponding to 0.0048 mol of potassium) were run in and the stirred vessel was evacuated to a pressure of 10-20 mbar, heated up to 65° C. and operated at 65° C. and a pressure of 10-20 mbar for 70 min. MeOH was distilled off.

The vessel was purged three times with N$_2$ (nitrogen). Thereafter, the vessel was tested for leaks, the pressure was set to 0.5 bar gauge (1.5 bar absolute) and the vessel was heated to 120° C. It was decompressed to 1 bar absolute and 1126 g (25.6 mol) of ethylene oxide (EO) were metered in up to $p_{max}$ 3.9 bar absolute and $T_{max}$ 150° C. After 300 g EO had been metered in, the metered addition was stopped (about 3 h after the start), and the vessel was left for 30 min and decompressed to 1.3 bar absolute. Thereafter, the rest of the EO was metered in. The metered addition of EO including the decompression lasted for a total of 10 h.

The mixture was stirred to constant pressure at about 145-150° C. (1 h), cooled to 100° C. and freed of low boilers at a pressure of less than 10 mbar for 1 h. The material was dispensed at 80° C. under N$_2$.

The analysis (OH number, GPC, 1H NMR in CDCl$_3$, 1H NMR in MeOD) confirmed the structure HBVE—22 EO.

A 2 l pressure autoclave with an anchor stirrer was initially charged with 744.5 g (0.6868 mol) of HBVE-22 EO, and the stirrer was switched on. Thereafter, 5.33 g of 32% NaOMe (sodium methoxide) solution (0.0316 mol of NaOMe, 1.71 g of NaOMe) in methanol were added, a vacuum of <10 mbar was applied, and the mixture was heated to 100° C. and kept there for 80 min in order to distill off the methanol.

The vessel was purged three times with N$_2$. Thereafter, the vessel was tested for leaks, the pressure was set to 0.5 bar gauge (1.5 bar absolute), the vessel was heated to 127° C. and then the pressure was adjusted to 1.1 bar absolute. 590.6 g (6.868 mol) of PeO were metered in at 127° C.; $p_{max}$ was 2.1 bar absolute. An intermediate decompression became necessary because of an increase in fill level. The metered addition of PeO was stopped, the mixture was left to react for 1 h until the pressure was constant, and the vessel was decompressed to 1.0 bar absolute. Thereafter, the metered addition of PeO was continued. $P_{max}$ was still 2.1 bar (first decompression after about 400 g of PeO, total metering time for PeO 7 h including break for decompression). After the metered addition of PeO had ended, the mixture was left to react further to constant pressure or for 3 h. The mixture was cooled to 110° C., and residual oxide was removed under reduced pressure until the pressure was below 10 mbar for at least 60 min. Then 0.5% water was added at 110° C. and then drawn off until the pressure was below 10 mbar for at least 60 min. Thus, for HBVE—22 EO—10 PeO, a total of about 12 000 ppm of volatile fractions was found, which were identified as pentene 1,2-oxide and removed. The vacuum was broken with N$_2$, and 100 ppm of BHT were added. The dispensing was effected at 80° C. under N$_2$.

The analysis (mass spectrum, GPC, 1H NMR in CDCl$_3$, 1H NMR In MeOD) confirmed the structure.

Macromonomer V2:

Alkoxylation of HBVE with 24.5 EO, followed by 16 BuO

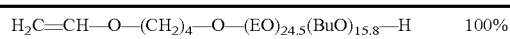

H$_2$C=CH—O—(CH$_2$)$_4$—O—(EO)$_{24.5}$(BuO)$_{15.8}$—H    100%

A 2 l pressure autoclave with an anchor stirrer was initially charged with 135.3 g (1.16 mol) of hydroxybutyl vinyl ether (HBVE) (stabilized with 100 ppm of potassium hydroxide (KOH)), and the stirrer was switched on. 1.06 g of potassium methoxide (KOMe) solution (32% KOMe in methanol (MeOH), corresponding to 0.0048 mol of potassium) were run in and the stirred vessel was evacuated to a pressure of 10-20 mbar, heated up to 65° C. and operated at 65° C. and a pressure of 10-20 mbar for 70 min. MeOH was distilled off. The vessel was purged three times with N$_2$ (nitrogen). Thereafter, the vessel was tested for leaks, the pressure was set to 0.5 bar gauge (1.5 bar absolute) and the vessel was heated to 120° C. It was decompressed to 1 bar absolute and 1126 g (25.6 mol) of ethylene oxide (EO) were metered in up to $p_{max}$ 3.9 bar absolute and $T_{max}$ 150° C. After 300 g EO had been metered in, the metered addition was stopped (about 3 h after the start), and the vessel was left for 30 min and decompressed to 1.3 bar absolute. Thereafter, the rest of the EO was metered in. The metered addition of EO including the decompression lasted for a total of 10 h.

The mixture was stirred to constant pressure at about 145-150° C. (1 h), cooled to 100° C. and freed of low boilers at a pressure of less than 10 mbar for 1 h. The material was dispensed at 80° C. under $N_2$. The analysis (OH number, GPC, 1H NMR in $CDCl_3$, 1H NMR in MeOD) confirmed the structure HBVE—22 EO.

A 2 l pressure autoclave with an anchor stirrer was initially charged with 588.6 g (0.543 mol) of HBVE-22 EO, and the stirrer was switched on. Thereafter, 2.39 g of 50% NaOH solution (0.030 mol of NaOH, 1.19 g of NaOH) were added, a vacuum of <10 mbar was applied, and the mixture was heated to 100° C. and kept there for 80 min in order to distill off the water. The vessel was purged three times with $N_2$. Thereafter, the vessel was tested for leaks, the pressure was set to 0.5 bar gauge (1.5 bar absolute), the vessel was heated to 127° C. and then the pressure was adjusted to 1.6 bar absolute. 59.7 g (1.358 mol) of EO were metered in at 127° C.; $p_{max}$ was 3.9 bar absolute. Establishment of constant pressure was awaited, which took 30 min, then the vessel was decompressed to 1.0 bar absolute. 625.5 g (8.688 mol) of BuO (butylene oxide) were metered in at 127° C.; $p_{max}$ was 2.1 bar absolute. Three intermediate decompressions were conducted because of an Increase in fill level. The metered addition of BuO was stopped, the mixture was left to react for 1 h until the pressure was constant, and the vessel was decompressed to 1.0 bar absolute. Thereafter, the metered addition of BuO was continued. $P_{max}$ was still 3.1 bar (first decompression after about 300 g of BuO, second decompression after about 500 g of BuO, total metering time for BuO about 24 h including break for decompression). After the metered addition of BuO had ended, the mixture was left to react for a further 4 h. The mixture was cooled to 100° C. and decompressed to 1 bar absolute. Residual oxide was drawn off until the pressure was below 10 mbar for at least 2 h. Then 0.5% water was added at 120° C. and then drawn off until the pressure was below 10 mbar for at least 10 min. The vacuum was broken with $N_2$, and 100 ppm of BHT were added. The dispensing was effected at 80° C. under $N_2$. The analysis (mass spectrum, GPC, 1H NMR in $CDCl_3$, 1H NMR in MeOD) confirmed the mean composition HBVE—24.5 EO—16 BuO.

In the case of after the butoxylation HBVE—24.5 EO—16 BuO, about 6000 ppm of volatile components are found, which were identified as butane 1,2-oxide. These were removed, and so HBVE—24.5 EO—15.8 BuO was ultimately present.

Macromonomer V3:

Alkoxylation of HBVE with 22 EO, followed by 12 PeO

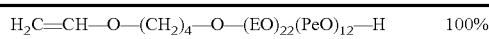

| $H_2C=CH-O-(CH_2)_4-O-(EO)_{22}(PeO)_{12}-H$ | 100% |

The procedure for macromonomer V1 was followed, except that a different amount of PeO was used.

Preparation of the Copolymers (P):

The copolymers were prepared by means of adiabatic gel polymerization in aqueous solution.

Copolymer 1:

Copolymer of 50% by weight of acrylamide, 48% by weight of Na-ATBS (sodium salt of 2-acrylamido-2-methylpropanesulfonic acid) and 2% of macromonomer 1

Macromonomer 1:

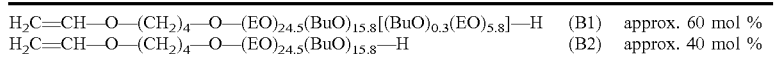

| $H_2C=CH-O-(CH_2)_4-O-(EO)_{24.5}(BuO)_{15.8}[(BuO)_{0.3}(EO)_{5.8}]-H$ | (B1) | approx. 60 mol % |
| $H_2C=CH-O-(CH_2)_4-O-(EO)_{24.5}(BuO)_{15.8}-H$ | (B2) | approx. 40 mol % |

Preparation Method:

A plastic bucket with magnetic stirrer, pH meter and thermometer was initially charged with 146.5 g of a 50% aqueous solution of Na-ATBS, and then the following were added successively: 105.8 g of distilled water, 0.4 g of a commercial silicone-based defoamer (Dow Corning® Antifoam Emulsion RD), 2.8 g of macromonomers 2, 138.2 g of acrylamide (50% solution in water), 1.2 g of a 5% aqueous solution of diethylenetriaminepentaacetic acid, pentasodium salt and 3.0 g of the nonionic surfactant $iC_{13}$-$(EO)_{15}H$.

After adjustment to pH 6 with a 20% or 2% sulfuric acid solution and addition of the rest of the water to attain the desired monomer concentration of 37% by weight (total amount of water minus the amount of water already added, minus the amount of acid required), the monomer solution was adjusted to the initiation temperature of 4° C. The solution was transferred to a thermos flask, the temperature sensor for the temperature recording was inserted, the flask was purged with nitrogen for 30 minutes, and the polymerization was initiated with 1.6 ml of a 10% aqueous solution of the water-soluble azo initiator 2,2'-azobis(2-methylpropionamidine) dihydrochloride (Wako V-50), 0.12 ml of a 1% t-BHPO solution and 0.24 ml of a 1% sodium sulfite solution. With the onset of the polymerization, the temperature rose to 80° C. to 90° C. within about 25 min. A solid polymer gel was obtained.

After the polymerization, the gel was allowed to cool down to about 50° C. and the gel block was comminuted with the aid of a meat grinder. The gel granules obtained were dried in a fluidized bed drier at 55° C. for two hours. This gave hard white granules which were converted to a pulverulent state by means of a centrifugal mill.

The weight-average molecular weight $M_w$ was 8 million to 14 million g/mol.

Copolymer 2

Copolymer of 50% by weight of acrylamide, 48% by weight of Na-ATBS (sodium salt of 2-acrylamido-2-methylpropanesulfonic acid) and 2% of macromonomer 2

Macromonomer 2:

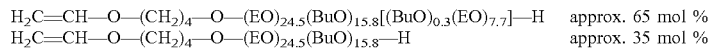
| | |
|---|---|
| $H_2C=CH-O-(CH_2)_4-O-(EO)_{24.5}(BuO)_{15.8}[(BuO)_{0.3}(EO)_{7.7}]-H$ | approx. 65 mol % |
| $H_2C=CH-O-(CH_2)_4-O-(EO)_{24.5}(BuO)_{15.8}-H$ | approx. 35 mol % |

Preparation Method:

A plastic bucket with magnetic stirrer, pH meter and thermometer was initially charged with 146.5 g of a 50% aqueous solution of Na-ATBS, and then the following were added successively: 105 g of distilled water, 0.4 g of a commercial silicone-based defoamer (Dow Corning® Antifoam Emulsion RD), 2.8 g of macromonomers 2, 138.2 g of acrylamide (50% solution in water), 1.2 g of a 5% aqueous solution of diethylenetriaminepentaacetic acid, pentasodium salt and 3.0 g of the nonionic surfactant $iC_{13}$-$(EO)_{15}H$.

After adjustment to pH 6 with a 20% sodium hydroxide solution and addition of the rest of the water to attain the desired monomer concentration of 37% (total amount of water minus the amount of water already added, minus the amount of acid required), the monomer solution was adjusted to the initiation temperature of 4° C. The solution was transferred to a thermos flask, the temperature sensor for the temperature recording was inserted, the flask was purged with nitrogen for 45 minutes, and the polymerization was initiated with 1.6 ml of a 10% aqueous solution of the water-soluble azo initiator 2,2'-azobis(2-methylpropionamidine) dihydrochloride (Wako V-50), 0.12 ml of a 1% t-BHPO solution and 0.24 ml of a 1% sodium sulfite solution. With the onset of the polymerization, the temperature rose to 80-90° C. within about 25 min. A solid polymer gel was obtained.

After cooling down to about 50° C., the gel block was comminuted with the aid of a meat grinder. The gel granules obtained were dried in a fluidized bed drier at 55° C. for two hours. This gave hard white granules which were converted to a pulverulent state by means of a centrifugal mill.

The weight-average molecular weight $M_w$ was 8 million to 14 million g/mol.

Copolymer 3:

Copolymer of 50% by weight of acrylamide, 48% by weight of Na-ATBS (sodium salt of 2-acrylamido-2-methylpropanesulfonic acid) and 2% of macromonomer 3

Macromonomer 3:

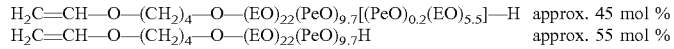
| | |
|---|---|
| $H_2C=CH-O-(CH_2)_4-O-(EO)_{22}(PeO)_{9.7}[(PeO)_{0.2}(EO)_{5.5}]-H$ | approx. 45 mol % |
| $H_2C=CH-O-(CH_2)_4-O-(EO)_{22}(PeO)_{9.7}H$ | approx. 55 mol % |

A plastic bucket with magnetic stirrer, pH meter and thermometer was initially charged with 146.5 g of a 50% aqueous solution of Na-ATBS, and then the following were added successively: 105 g of distilled water, 0.4 g of a commercial silicone-based defoamer (Dow Corning® Antifoam Emulsion RD), 2.8 g of macromonomer 3, 137.4 g of acrylamide (50% solution in water), 1.2 g of a 5% aqueous solution of diethylenetriaminepentaacetic acid, pentasodium salt and 3.0 g of the nonionic surfactant $iC_{13}$-$(EO)_{15}H$.

After adjustment to pH 6 with a 20% sodium hydroxide solution and addition of the rest of the water to attain the desired monomer concentration of 37% (total amount of water minus the amount of water already added, minus the amount of acid required), the monomer solution was adjusted to the initiation temperature of 4° C. The solution was transferred to a thermos flask, the temperature sensor for the temperature recording was inserted, the flask was purged with nitrogen for 45 minutes, and the polymerization was initiated with 1.6 ml of a 10% aqueous solution of the water-soluble azo initiator 2,2'-azobis(2-methylpropionamidine) dihydrochloride (Wako V-50), 0.12 ml of a 1% t-BHPO solution and 0.24 ml of a 1% sodium sulfite solution. With the onset of the polymerization, the temperature rose to 80-90° C. within about 25 min. A solid polymer gel was obtained.

After cooling down to about 50° C., the gel block was comminuted with the aid of a meat grinder. The gel granules obtained were dried in a fluidized bed drier at 55° C. for two hours. This gave hard white granules which were converted to a pulverulent state by means of a centrifugal mill.

The weight-average molecular weight $M_w$ was 8 million to 14 million g/mol.

Copolymer 4:

Copolymer of 69% by weight of acrylamide, 30% by weight of sodium acrylate and 1% by weight of macromonomer 1

Macromonomer 1:

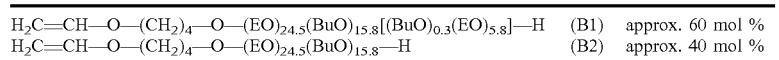
| | | |
|---|---|---|
| $H_2C=CH-O-(CH_2)_4-O-(EO)_{24.5}(BuO)_{15.8}[(BuO)_{0.3}(EO)_{5.8}]-H$ | (B1) | approx. 60 mol % |
| $H_2C=CH-O-(CH_2)_4-O-(EO)_{24.5}(BuO)_{15.8}-H$ | (B2) | approx. 40 mol % |

A plastic bucket with magnetic stirrer, pH meter and thermometer was initially charged with 101.8 g of a 35% aqueous solution of sodium acrylate and then the following were added successively: 119.1 g of distilled water, 0.4 g of a commercial silicone-based defoamer (Dow Corning® Antifoam Emulsion RD), 1.2 g of macromonomer 1, 163.3 g of acrylamide (50% solution in water), 4 g of a 4% solution of 4,4'-azobis(4-cyanovaleric acid) (dissolved in 5% sodium hydroxide solution), 1.2 g of a 5% aqueous solution of diethylenetriaminepentaacetic acid, pentasodium salt and 1.2 g of the nonionic surfactant $iC_1$-$(EO)_{15}H$.

After adjustment to pH 6.75 with a 5% sodium hydroxide solution and addition of the rest of the water to attain the desired monomer concentration of 30% (total amount of water minus the amount of water already added, minus the amount of acid required), the monomer solution was adjusted to the initiation temperature of 4° C. The solution was transferred to a thermos flask, the temperature sensor for the temperature recording was inserted, the flask was purged with nitrogen for 45 minutes, and the polymerization was initiated with 4 g of a 4% methanolic solution of the azo initiator 2,2'-azobis(2-methylpropionitrile), 0.16 ml of a 1% t-BHPO solution and 0.16 ml of a 1% sodium sulfite solution. With the onset of the polymerization, the temperature rose to 80 to 90° C. within 40-50 min. A solid polymer gel was obtained.

After cooling down, the gel block was comminuted with the aid of a meat grinder. The gel granules obtained were dried in a fluidized bed drier at 55° C. for two hours. This gave hard white granules which were converted to a pulverulent state by means of a centrifugal mill.

The weight-average molecular weight $M_w$ was 10 million to 20 million g/mol.

Copolymer 5:

Copolymer of 69% by weight of acrylamide, 30% by weight of sodium acrylate and 1% by weight of macromonomer 4

Macromonomer 4:

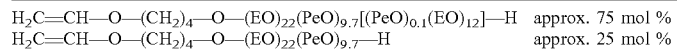

A plastic bucket with magnetic stirrer, pH meter and thermometer was initially charged with 101.8 g of a 35% aqueous solution of sodium acrylate and then the following were added successively: 111.6 g of distilled water, 0.4 g of a commercial silicone-based defoamer (Dow Corning® Antifoam Emulsion RD), 1.2 g of macromonomer 4, 163.3 g of acrylamide (50% solution in water), 4 g of a 4% solution of 4,4'-azobis(4-cyanovaleric acid) (dissolved in 5% sodium hydroxide solution), 1.2 g of a 5% aqueous solution of diethylenetriaminepentaacetic acid, pentasodium salt and 1.2 g of the nonionic surfactant $iC_{13}$-$(EO)_{15}$H.

After adjustment to pH 6.75 with a 5% sodium hydroxide solution and addition of the rest of the water to attain the desired monomer concentration of 30% (total amount of water minus the amount of water already added, minus the amount of acid required), the monomer solution was adjusted to the initiation temperature of 4° C. Subsequently, the reaction solution was transferred to a thermos flask, the temperature sensor for the temperature recording was inserted, the flask was purged with nitrogen for 45 minutes, and the polymerization was initiated with 4 g of a 4% methanolic solution of the azo initiator 2,2'-azobis(2-methylpropionitrile), 0.16 ml of a 1% t-BHPO solution and 0.24 ml of a 1% sodium sulfite solution. With the onset of the polymerization, the temperature rose to 80 to 90° C. within 40-50 min. A solid polymer gel was obtained.

After cooling down, the gel block was comminuted with the aid of a meat grinder. The gel granules obtained were dried in a fluidized bed drier at 55° C. for two hours. This gave hard white granules which were converted to a pulverulent state by means of a centrifugal mill.

The weight-average molecular weight $M_w$ was 10 million to 20 million g/mol.

Copolymer 6:

Copolymer of 98% by weight of acrylamide and 2% by weight of macromonomer 1

Macromonomer 1:

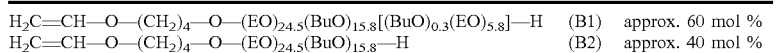

A plastic bucket with magnetic stirrer, pH meter and thermometer was initially charged with 140 g of distilled water, and 231.27 g of acrylamide (50% solution), 0.4 g of a commercial silicone-based defoamer (Dow Corning® Antifoam Emulsion RD), 4 g of a 4% solution of 4,4'-azobis (4-cyanovaleric acid) (dissolved in 5% sodium hydroxide solution), 1.2 g of a 5% aqueous solution of diethylenetriaminepentaacetic acid pentasodium salt, 1.2 g of the nonionic surfactant $iC_{13}$-$(EO)_{15}$H and 2.36 g of macromonomer 1 were added.

After adjustment to pH 6 with a 20% or 2% sulfuric acid solution and addition of the rest of the water (total amount of water minus the amount of water already added, minus the amount of acid required to adjust to a monomer content of 30%), the monomer solution was adjusted to the initiation temperature of 4° C. The solution was transferred to a thermos flask, the temperature sensor for the temperature recording was inserted, the flask was purged with nitrogen for 30 minutes, and the polymerization was initiated with 4.0 ml of a 4% AIBN solution n methanol, 0.48 g of a 1% ammonium peroxodisulfate solution and 0.80 g of a 1% ammonium iron sulfate solution. A solid polymer gel was obtained.

After the polymerization, the gel was allowed to cool down to about 50° C. and the gel block was comminuted with the aid of a meat grinder. The gel granules obtained were dried in a fluidized bed drier at 55° C. for two hours. This gave hard white granules which were converted to a pulverulent state by means of a centrifugal mill.

Copolymer 7:

Copolymer of 56% by weight of acrylamide, 29.7% by weight of sodium acrylate, 12.3% by weight of Na-ATBS and 2% by weight of macromonomer 1

Macromonomer 1:

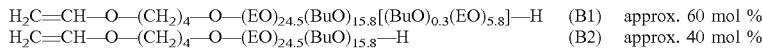

A plastic bucket with magnetic stirrer, pH meter and thermometer was initially charged with 90 g of distilled water, and the following were added successively: 50.64 g of a sodium acrylate solution (35% in water), 86.24 g of a sodiumATBS solution (50% in water), 0.4 g of a commercial silicone-based defoamer (Dow Corning® Antifoam Emulsion RD), 155.53 g of acrylamide (52% solution), 1.2 g of a 5% aqueous solution of diethylentriaminepentaacetic acid pentasodium salt, 3.14 g of macromonomer 1 and 3 g of the nonionic surfactant $iC_{13}$-$(EO)_{15}H$ and.

After adjustment to pH 6 with a 20% or 2% sulfuric acid solution and addition of the rest of the water (total amount of water minus the amount of water already added, minus the amount of acid required to adjust to a monomer content of 37%), the monomer solution was adjusted to the initiation temperature of 4° C. The solution was transferred to a thermos flask, the temperature sensor for the temperature recording was inserted, the flask was purged with nitrogen for 30 minutes, and the polymerization was initiated with 2.4 ml of a 10% solution of 2,2'-azobis(2-methylpropionamidine) dihydrochloride in water, 0.12 g of a 1% TBHP solution and 0.24 g of a 1% sodium sulfite solution. A solid polymer gel was obtained.

After the polymerization, the gel was allowed to cool down to about 50° C. and the gel block was comminuted with the aid of a meat grinder. The gel granules obtained were dried in a fluidized bed drier at 55° C. for two hours. This gave hard white granules which were converted to a pulverulent state by means of a centrifugal mill.

Copolymer V1:

Copolymer of 50% by weight of acrylamide, 48% by weight of Na-ATBS (sodium salt of 2-acrylamido-2-methylpropanesulfonic acid) and 2% of macromonomer V1

Macromonomer V1:

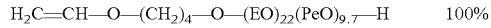

$H_2C=CH-O-(CH_2)_4-O-(EO)_{22}(PeO)_{9.7}-H$     100%

A plastic bucket with magnetic stirrer, pH meter and thermometer was initially charged with 146.5 g of a 50% aqueous solution of Na-ATBS, and then the following were added successively: 105 g of distilled water, 0.4 g of a commercial silicone-based defoamer (Dow Corning® Antifoam Emulsion RD), 2.8 g of macromonomer V1, 137.4 g of acrylamide (50% solution in water), 1.2 g of a 5% aqueous solution of diethylenetriaminepentaacetic acid, pentasodium salt and 3.0 g of the nonionic surfactant $iC_{13}$-$(EO)_{15}H$.

After adjustment to pH 6 with a 20% sodium hydroxide solution and addition of the rest of the water to attain the desired monomer concentration of 37% (total amount of water minus the amount of water already added, minus the amount of acid required), the monomer solution was adjusted to the initiation temperature of 4° C. The solution was transferred to a thermos flask, the temperature sensor for the temperature recording was inserted, the flask was purged with nitrogen for 45 minutes, and the polymerization was initiated with 1.6 ml of a 10% aqueous solution of the water-soluble azo initiator 2,2'-azobis(2-methylpropionamidine) dihydrochloride (Wako V-50), 0.12 ml of a 1% t-BHPO solution and 0.24 ml of a 1% sodium sulfite solution. With the onset of the polymerization, the temperature rose to 80-90° C. within about 25 min. A solid polymer gel was obtained.

After cooling down to about 50° C., the gel block was comminuted with the aid of a meat grinder. The gel granules obtained were dried in a fluidized bed drier at 55° C. for two hours. This gave hard white granules which were converted to a pulverulent state by means of a centrifugal mill.

The weight-average molecular weight $M_w$ was 8 million to 14 million g/mol.

Copolymer V2:

Copolymer of 50% by weight of acrylamide, 48% by weight of Na-ATBS (sodium salt of 2-acrylamido-2-methylpropanesulfonic acid) and 2% of macromonomer V2

Macromonomer V2:

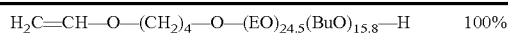

$H_2C=CH-O-(CH_2)_4-O-(EO)_{24.5}(BuO)_{15.8}-H$     100%

A plastic bucket with magnetic stirrer, pH meter and thermometer was initially charged with 146.5 g of a 50% aqueous solution of Na-ATBS, and then the following were added successively: 105 g of distilled water, 0.4 g of a commercial silicone-based defoamer (Dow Corning® Antifoam Emulsion RD), 2.8 g of macromonomer V1, 137.4 g of acrylamide (50% solution in water), 1.2 g of a 5% aqueous solution of diethylenetriaminepentaacetic acid, pentasodium salt and 3.0 g of the nonionic surfactant $iC_{13}$-$(EO)_{15}H$.

After adjustment to pH 6 with a 20% sodium hydroxide solution and addition of the rest of the water to attain the desired monomer concentration of 37% (total amount of water minus the amount of water already added, minus the amount of acid required), the monomer solution was adjusted to the initiation temperature of 4° C. The solution was transferred to a thermos flask, the temperature sensor for the temperature recording was inserted, the flask was purged with nitrogen for 45 minutes, and the polymerization was initiated with 1.6 ml of a 10% aqueous solution of the water-soluble azo initiator 2,2'-azobis(2-methylpropionamidine) dihydrochloride (Wako V-50), 0.12 ml of a 1% t-BHPO solution and 0.24 ml of a 1% sodium sulfite solution. With the onset of the polymerization, the temperature rose to 80-90° C. within about 25 min. A solid polymer gel was obtained.

After cooling down to about 50° C., the gel block was comminuted with the aid of a meat grinder. The gel granules obtained were dried in a fluidized bed drier at 55° C. for two hours. This gave hard white granules which were converted to a pulverulent state by means of a centrifugal mill.

The weight-average molecular weight $M_w$ was 8 million to 14 million g/mol.

Copolymer V3:

Commercially available copolymer for polymer flooding, of about 50% by weight of acrylamide and about 50% by weight of 2-acrylamido-2-methylpropanesulfonic acid, having a weight-average molecular weight $M_w$ of about 8 to $13*10^6$ g/mol.

Copolymer V4:

Commercially available copolymer for polymer flooding, of about 75 mol % acrylamide and about 25 mol % of sodium acrylate units, having a weight-average molecular weight $M_w$ of about 20 000 000 g/mol.

Copolymer V5:

Copolymer of 69% by weight of acrylamide, 30% by weight of sodium acrylate and 1% by weight of macromonomer V3

Macromonomer V3:

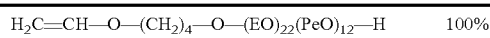

$H_2C=CH-O-(CH_2)_4-O-(EO)_{22}(PeO)_{12}-H$     100%

The procedure was as for copolymer 5, except that macromonomer V3 was used in place of macromonomer 4.

Performance Tests:

Viscosity Measurements

The viscosity measurements were conducted with a Haake RS 80 viscometer at a shear rate of 7 s$^{-1}$.

For the viscosity measurements, aqueous solutions of the polymers were used. The polymers were dissolved using the following aqueous media:

Tap Water:

Total salinity 123 mg/l

Seawater (Synthetic):
Total salinity: about 35 000 mg/l
Na$^+$ 10 692 mg/l, K$^+$ 420 mg/l, Mg$^{2+}$ 1295 mg/l, Ca$^{2+}$ 422 mg/l, Cl$^-$ 19 218 mg/l, HCO$_3^-$ 145 mg/l, SO$_4^{2-}$ 2697 mg/l
Ratio of alkali metal ions/alkaline earth metal ions: 6.2

Deposit Water (Synthetic):
Total salinity: 185 548 mg/l
Na$^+$ 52 079 mg/l, Mg$^{2+}$ 2681 mg/l, Ca$^{2+}$ 15 383 mg/l, Cl$^-$ 115 105 mg/l, borate 117 mg/l, SO$_4^{2-}$ 183 mg/l.
Ratio of alkali metal ions/alkaline earth metal ions: 2.9; deposit water having high Ca$^{2+}$ content.

The following tests were conducted:

Solutions of each of the inventive copolymers and of the comparative polymers were made up in tap water, seawater and deposit water in various concentrations in the range from 500 ppm to 3000 ppm. The viscosity was measured in each case at various temperatures.

The results are shown in FIGS. 1 to 7. The polymers tested in each case, the type of aqueous phase and the concentration of the polymers used are reported in the figures.

LIST OF FIGURES

| | |
|---|---|
| FIGS. 1a, 1b: | Dependence of the viscosity of solutions of copolymers V1 (50% AM, 48% Na-ATBS, 2% macromonomer V1), V3 (50% AM, 50% ATBS) and V4 (75 mol % AM, 25 mol % Na-acrylate) on temperature |
| FIG. 2a: | Viscosity of solutions of copolymer V2 (50% AM, 48% Na-ATBS, 2% macromonomer V2) of varying concentration at 60° C. |
| FIGS. 2b, 2c, 2d: | Dependence of the viscosity of solutions of copolymer V2 on temperature. |
| FIG. 3a: | Viscosity of solutions of copolymer 1 (50% AM, 48% Na-ATBS, 2% macromonomer 1) of varying concentration at 60° C. |
| FIGS. 3b, 3c, 3d: | Dependence of the viscosity of solutions of copolymer 1 on temperature. |
| FIG. 4a: | Viscosity of solutions of copolymer 2 (50% AM, 48% Na-ATBS, 2% macromonomer 2) of varying concentration at 60° C. |
| FIGS. 4b, 4c, 4d: | Dependence of the viscosity of solutions of copolymer 2 on temperature. |
| FIG. 5a: | Viscosity of solutions of copolymer 3 (50% AM, 48% Na-ATBS, 2% macromonomer 3) of varying concentration at 60° C. |
| FIGS. 5b, 5c, 5d: | Dependence of the viscosity of solutions of copolymer 3 on temperature. |
| FIG. 6a: | Viscosity of solutions of copolymer 4 (69% AM, 30% Na-acrylate, 1% macromonomer 1) of varying concentration at 60° C. |
| FIGS. 6b, 6c: | Dependence of the viscosity of solutions of copolymer 4 on temperature. |
| FIG. 7a: | Viscosity of solutions of copolymer 5 (69% AM, 30% Na-acrylate, 1% macromonomer 4) of varying concentration at 60° C. |
| FIGS. 7b, 7c: | Dependence of the viscosity of solutions of copolymer 5 on temperature. |
| FIG. 8a: | Viscosity of solutions of copolymer 6 (98% AM, 2% macromonomer 1) of various concentrations at 60° C. |
| FIGS. 8b, 8c: | Dependence of the viscosity of solutions of copolymer 6 on temperature. |
| FIG. 9a: | Viscosity of solutions of copolymer 7 (56% by weight of AM, 29.7% by weight of Na-acrylate, 12.3% by weight of Na-ATBS, 2% by weight of macromonomer 1) of various concentrations at 60° C. |
| FIGS. 9b, 9c, 9d: | Dependence of the viscosity of solutions of copolymer 7 on temperature. |
| FIG. 10a: | Viscosity of solutions of copolymer V5 (69% AM, 30% Na-acrylate, 1% macromonomer 4) of various concentrations at 60° C. |
| FIGS. 10b, 10c: | Dependence of the viscosity of solutions of copolymer V5 on temperature. |
| FIG. 11: | Partly conical reactor for preparation of the inventive copolymers |
| FIG. 12: | Fully conical reactor for preparation of the inventive copolymers. |

Comments Regarding the Experiments:

FIGS. 1a and 1b each show the dependence of the viscosity of aqueous solutions of different copolymers on temperature, specifically the viscosity of two commercial, non-associative copolymers (copolymers V3 and V4) and additionally of an associative copolymer (copolymer V1) having the macromonomer VI. In the case of the two commercial, non-associative copolymers, the viscosity decreases with increasing temperature. In the case of the associative copolymer, the viscosity of the aqueous solutions at first increases significantly, runs through a maximum at about 60° C. and then decreases again.

FIGS. 2a to 2d each show the dependence of the viscosity of aqueous solutions of the copolymer V2 as a function of temperature or of concentration. The copolymer V2 does not comprise the inventive mixture of the macromonomers (B1) and (B2), but only includes the macromonomer (B2) which does not have a terminal-[—$(R^4O)_c(R^5O)_{d(1+x)}$]—H group. The viscosity profile as a function of temperature is similar to that for copolymer V1, i.e. viscosity reaches a maximum at about 60° C. and then decreases again.

FIGS. 3a to 3d each show the dependence of the viscosity of aqueous solutions of the inventive copolymer 1 having sulfo groups (50% by weight of acrylamide, 48% by weight of ATBS, 2% by weight of macromonomer) as a function of temperature or of concentration. The viscosity measured in tap water rises continuously from 30° C. to 90° C. and does not decrease at all. In seawater, the viscosity decreases again only insignificantly, if at all, after the attainment of the maximum at about 50° C., meaning that it remains more or less constant to 90° C. In deposit water, the viscosity decreases after the attainment of the maximum, but the viscosity is as for polymer V1.

FIGS. 4a to 4d and 5a to 5d show the test results for two other copolymers having sulfo groups (copolymers 2 and 3), comprising 50% by weight of acrylamide, 48% by weight of ATBS and 2% by weight of macromonomer, using other macromonomers (B) in each case. The results are very similar to the results with copolymer 1.

FIGS. 6a to 6c and 7a to 7c each show test results with copolymers having —COOH groups, namely copolymers comprising 69% by weight of acrylamide, 30% by weight of sodium acrylate and 1% by weight of macromonomer (copolymers 4 and 5). The composition corresponds substantially to that of copolymer V4, except that copolymer V4 does not comprise any macromonomer. As expected, the measurements of viscosity as a function of concentration show much clearer differences between the use of tap water and the use of seawater as compared with the use of copolymers having sulfo groups. The viscosity of copolymer 4 in tap water decreases slightly in the range from 30 to 90° C., but begins to rise slightly again at 80° C.

In seawater, the viscosity at relatively low concentrations is more or less temperature-independent, but the viscosity increases significantly with temperature at 2000 ppm. The behavior of aqueous solutions of copolymer 5 is similar. Copolymers having —COOH groups are thus of good suitability for polymer flooding at moderate salinities, such as seawater.

Performance in a Porous Medium (Core Flooding Test):

Copolymer 1 was used to conduct core flooding tests. For this purpose, solutions of copolymer 1 in synthetic sea water (see above for composition) were used, with a polymer concentration of 300 ppm, 500 ppm and 1000 ppm. For the core flooding tests, Bentheim sandstone with a permeability of about 2 darcies was used. The experiments were each conducted at 60° C.

In a first step, synthetic sea water without polymer was first pumped through the core at a flow rate of 1 ml/min, and the pressure differential over the core was measured. Subsequently, the polymer solutions were pumped through the core at a flow rate of 1 ml/min and the pressure differential was determined in each case.

The ratio of the pressure differential for the polymer solution and for pure sea water was then used to calculate the resistance factor (RF). A high RF indicates effective thickening of the aqueous solution by the dissolved polymer. The RF values of copolymer 1 are summarized in the following table:

| Polymer concentration [ppm] | Resistance Factor (RF) |
|---|---|
| 300 | 139 |
| 500 | 393 |
| 1000 | 721 |

The results show that copolymer 1 has quite a high RF value even at the low concentration of 300 ppm.

The invention claimed is:

1. A process for producing mineral oil from underground mineral oil deposits, comprising injecting an aqueous formulation comprising at least one thickening, water-soluble copolymer (P) into a mineral oil deposit through at least one injection well and withdrawing crude oil from the deposit through at least one production well, said water-soluble copolymer (P) comprising
   (A) 35 to 99.5% by weight of at least one uncharged, monoethylenically unsaturated, hydrophilic monomer (A) selected from the group consisting of (meth)acrylamide, N-methyl(meth)acrylamide, N,N'-dimethyl(meth)acrylamide and N-methylol(meth)acrylamide,
   (B) 0.01 to 15% by weight of at least one monoethylenically unsaturated macromonomer (B) comprising—as well as the monoethylenically unsaturated group—a hydrophilic group and a hydrophobic group, and
   (C) 0.1 to 69.99% by weight of at least one hydrophilic, anionic, monoethylenically unsaturated monomer (C) comprising at least one acidic group selected from the group consisting of —COOH, —SO$_3$H and —PO$_3$H$_2$ groups and salts thereof,
   wherein at least one macromonomer (B) is a mixture comprising macromonomers (B1) and (B2) of the general formulae

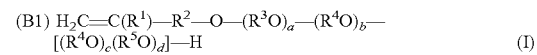

(B1) H$_2$C=C(R$^1$)—R$^2$—O—(R$^3$O)$_a$—(R$^4$O)$_b$—[(R$^4$O)$_c$(R$^5$O)$_d$]—H    (I)

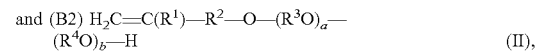

and (B2) H$_2$C=C(R$^1$)—R$^2$—O—(R$^3$O)$_a$—(R$^4$O)$_b$—H    (II), where the stated amounts of the monomers are each based on the total amount of all the monomers in the copolymer (P), the molar proportion x of the macromonomers (B1) based on the sum total of (B1) and (B2) is 0.1 to 0.99, and wherein:
   R$^1$: is H or methyl,
   R$^2$: is a single bond or a divalent linking group —OR35— where R35 is an alkylene group having 1 to 6 carbon atoms,
   R$^3$: are independently ethylene groups —CH$_2$CH$_2$—, 1,2-propylene groups —CH$_2$—CH(CH$_3$)— or alkylene groups R$^4$, with the proviso that at least 90 mol % of the R$^3$ radicals are ethylene groups,
   R$^4$: are independently alkylene groups —CR$^6$(R$^7$)—CR$^8$(R$^9$)— where the R$^6$, R$^7$, R$^8$ and R$^9$ radicals are each independently H or a linear or branched alkyl radical having 1 to 8 carbon atoms, with the proviso that not all radicals are H and the sum total of the carbon atoms in the R$^6$, R$^7$, R$^8$ and R$^9$ radicals is 2 to 8,
   R$^5$ is an ethylene group —CH$_2$CH$_2$—,
   a is a number from 10 to 35,
   b is a number from 5 to 30,
   c is a number from 0 to 2,
   d is a number from 1 to 15
   and where, in addition,
   the copolymer has a weight-average molecular weight M$_W$ of 1*10$^6$ g/mol to 30*10$^6$ g/mol, the amount of the copolymer in the aqueous formulation is 0.02 to 2% by weight, and
the temperature of the mineral oil deposit is 20° C. to 120° C.

2. The process according to claim 1, wherein the temperature of the deposit is 35 to 120° C.

3. The process according to claim 1, wherein the temperature of the deposit is 40 to 100° C.

4. The process according to claim 1, wherein the aqueous formulation comprises salts.

5. The process according to claim 4, wherein the concentration of the salts is 5000 ppm to 250 000 ppm based on the sum total of all the components in the formulation.

6. The process according to claim 1, wherein 2 or 3 of t $R^6$, $R^7$, $R^8$ and $R^9$ radicals are H and the sum total of the carbon atoms in the $R^6$, $R^7$, $R^8$ and $R^9$ radicals is 2 or 3.

7. The process according to claim 1, wherein the number b+c of the $R^4O$ radicals is selected with the proviso that the sum total of all the carbon atoms in all the $R^6$, $R^7$, $R^8$ and $R^9$ radicals present is 25 to 50.

8. The process according to claim 1, wherein the molar proportion x of the monomers (B1) is 0.4 to 0.95 based on the sum total of (B1) and (B2).

9. The process according to claim 1, which involves alkali-polymer flooding, and wherein the aqueous formulation used for injection additionally comprises at least one base.

10. The process according to claim 9, wherein the aqueous formulation has a pH of 9 to 13.

11. The process according to claim 1, which involves alkali-surfactant-polymer flooding, and wherein the aqueous formulation used for injection additionally comprises at least one base and at least one surfactant.

12. The process according to claim 11, wherein at least one of the surfactants is an anionic surfactant of the general formula

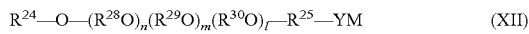

$$R^{24}-O-(R^{28}O)_n(R^{29}O)_m(R^{30}O)_l-R^{25}-YM \quad (XII)$$

wherein:
$R^{24}$: is an aliphatic, cycloaliphatic and/or aromatic hydrocarbyl group having 10 to 36 carbon atoms,
$R^{28}$: is each independently butylene groups —$CR^{31}(R^{32})$—$CR^{33}(R^{34})$— where the $R^{31}$, $R^{32}$, $R^{33}$ and $R^{34}$ radicals are each independently H, methyl or ethyl, with the proviso that the sum total of the carbon atoms $R^{31}$, $R^{32}$, $R^{33}$ and $R^{34}$ is 2 in each case, and where, in at least 70 mol % of the $R^{28}$ units, $R^{31}$, $R^{32}$ and $R^{33}$ are each H and $R^{34}$ is ethyl,
$R^{29}$: is 1,2-propylene groups —$CH_2$—$CH(CH_3)$—,
$R^{30}$: is —$CH_2CH_2$—,
$R^{25}$: is a single bond or an alkylene group which has 2 to 6 carbon atoms and optionally is substituted by OH groups,
Y is a group selected from the group consisting of sulfate groups, sulfonate groups, carboxylate groups and phosphate groups,
M is H or a cation,
n is 0 to 25,
m is 0 to 35,
l is 0 to 75, and
n+m+l is 3 to 75.

13. The process according to claim 12, wherein the $R^{24}$ radicals are linear aliphatic hydrocarbyl radicals $R^{24a}$ having 12 to 22 carbon atoms.

14. The process according to claim 12, wherein the $R^{24}$ radicals are branched aliphatic hydrocarbyl radicals $R^{24b}$ having 12 to 28 carbon atoms.

15. The process according to claim 11, wherein at least one of the surfactants is an olefinsulfonate.

16. The process according to claim 1, wherein the formulation additionally comprises at least one complexing agent.

17. The process according to claim 1 wherein the formulation additionally comprises at least one free-radical scavenger.

18. The process according to claim 1, wherein the formulation additionally comprises at least one oxygen scavenger.

19. The process according to claim 1, wherein the formulation additionally comprises at least one sacrificial reagent.

20. The process according to claim 1, wherein the copolymer (P) is a copolymer (P1) comprising
40 to 60% by weight of (meth)acrylamide as monomer (A), and
0.1 to 5% by weight of macromonomers (B1) and (B2), where the molar proportion of the macromonomers (B1) based on the sum total of (B1) and (B2) is 0.3 to 0.95 and wherein:
$R^1$: is H or methyl,
$R^2$: is a divalent linking group —$OR^{35}$— where $R^{35}$ is a linear 1,ω-alkylene group having 1 to 6 carbon atoms,
$R^3$: is ethylene groups —$CH_2CH_2$—,
$R^4$: are each independently alkylene groups —$CR^6(R^7)$—$CR^8(R^9)$—, where the sum total of the carbon atoms $R^6$, $R^7$, $R^8$ and $R^9$ is 2 in each case, and where, in at least 70 mol % of the —$CR^6(R^7)CR^8(R^9)$— units, $R^6$, $R^7$ and $R^8$ are each H and $R^9$ is ethyl,
$R^5$ is an ethylene group —$CH_2CH_2$—,
a is a number from 20 to 28,
b is a number from 10 to 25,
c is a number from 0 to 1.5,
d is a number from 1.5 to 10;
and
40 to 60% by weight of at least one hydrophilic, anionic, monoethylenically unsaturated monomer (C) comprising $SO_3H$ groups or salts thereof, where the amounts of the monomers are each based on the amounts of all the monomers in the copolymer (P1).

21. The process according to claim 20, wherein the aqueous formulation comprises salts in a concentration of 5000 ppm to 250 000 ppm based on the sum total of all the components in the formulation.

22. The process according to claim 20, wherein the deposit temperature is 50° C. to 120° C.

23. The process according to claim 1, wherein the copolymer (P) is a copolymer (P2) comprising
50 to 85% by weight of (meth)acrylamide as monomer (A), and
0.1 to 10% by weight of macromonomers (B1) and (B2), where the molar proportion of the macromonomers (B1) based on the sum total of (B1) and (B2) is 0.3 to 0.95 and wherein:
$R^1$: is H or methyl,
$R^2$: is a divalent linking group —$OR^{35}$— where $R^{35}$ is a linear 1,ω-alkylene group having 1 to 6 carbon atoms,
$R^3$: is ethylene groups —$CH_2CH_2$—,
$R^4$: are each independently alkylene groups —$CR^6(R^7)$—$CR^8(R^9)$—, where the sum total of the carbon atoms $R^6$, $R^7$, $R^8$ and $R^9$ is 2 in each case, and where, in at least 70 mol % of the —$CR^6(R^7)CR^8(R^9)$— units, $R^6$, $R^7$ and $R^8$ are each H and $R^9$ is ethyl, $R^5$ is an ethylene group —$CH_2CH_2$—,
a is a number from 20 to 28,
b is a number from 10 to 25,
c is a number from 0 to 2,
d is a number from 1.5 to 10;
and
5 to 45% by weight of at least one hydrophilic, anionic, monoethylenically unsaturated monomer (C) comprising COOH groups or salts thereof, where the amounts of the monomers are each based on the amounts of all the monomers in the copolymer (P2).

24. The process according to claim 23, wherein the aqueous formulation comprises salts in a concentration of 2000 ppm to 60 000 ppm based on the sum total of all the components in the formulation.

25. The process according to claim 23, wherein the deposit temperature is 35° C. to 90° C.

26. The process according claim 1, wherein the copolymer (P) is a copolymer (P3) comprising
30 to 85% by weight of (meth)acrylamide as monomer (A), and
0.1 to 10% by weight of macromonomers (B1) and (B2), where the molar proportion of the macromonomers (B1) based on the sum total of (B1) and (B2) is 0.3 to 0.95, and wherein:
$R^1$: is H or methyl,
$R^2$: is a divalent linking group —$OR^{35}$— where $R^{35}$ is a linear 1,ω-alkylene group having 1 to 6 carbon atoms,
$R^3$: is ethylene groups —$CH_2CH_2$—,
$R^4$: are each independently alkylene groups —$CR^6(R^7)$—$CR^8(R^9)$—, where the sum total of the carbon atoms $R^6$, $R^7$, $R^8$ and $R^9$ is 2 in each case, and where, in at least 70 mol % of the —$CR^6(R^7)CR^8(R^9)$— units, $R^6$, $R^7$ and $R^8$ are each H and $R^9$ is ethyl,
$R^5$ is an ethylene group —$CH_2CH_2$—,
a is a number from 20 to 28,
b is a number from 10 to 25,
c is a number from 0 to 2,
d is a number from 1.5 to 10;
and
at least two hydrophilic, anionic, monoethylenically unsaturated monomers (C) comprising 5 to 40% by weight of at least one monomer (C1) comprising COOH groups or salts thereof, and 5 to 40% by weight of at least one monomer (C2) comprising —$SO_3H$ groups or salts thereof, where the amounts of the monomers are each based on the amounts of all the monomers in the copolymer (P3).

27. The process according to claim 26, wherein the aqueous formulation comprises salts in a concentration of 5000 ppm to 150 000 ppm based on the sum total of all the components in the formulation.

28. The process according to claim 26, wherein the deposit temperature is 40° C. to 100° C.

29. A water-soluble copolymer (P) comprising at least
(A) 30 to 99.99% by weight of at least one uncharged, monoethylenically unsaturated, hydrophilic monomer (A) selected from the group of (meth)acrylamide, N-methyl(meth)acrylamide, N,N'-dimethyl(meth)acrylamide and N-methylol(meth)acrylamide,
(B) 0.01 to 15% by weight of at least one monoethylenically unsaturated macromonomer (B) at least comprising—as well as the monoethylenically unsaturated group—a hydrophilic group and a hydrophobic group, and
(C) 0.1 to 69.99% by weight of at least one hydrophilic, anionic, monoethylenically unsaturated monomer (C) comprising at least one acidic group selected from the group of —COOH, —$SO_3H$ and —$PO_3H_2$ groups or salts thereof,
wherein the at least one macromonomer (B) is a mixture comprising macromonomers (B1) and (B2) of the general formulae

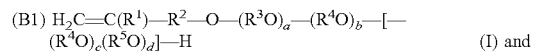

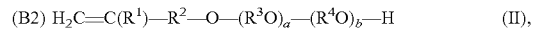

where the stated amounts of the monomers are each based on the total amount of all the monomers in the copolymer (P), the molar proportion x of the macromonomers (B1) based on the sum total of (B1) and (B2) is 0.1 to 0.99, and wherein:
$R^1$: is H or methyl,
$R^2$: is a single bond or a divalent linking group —$OR^{35}$— where $R^{35}$ is an alkylene group having 1 to 6 carbon atoms,
$R^3$: are independently ethylene groups —$CH_2CH_2$—, 1,2-propylene groups or alkylene groups $R^4$, with the proviso that at least 90 mol % of the $R^3$ radicals are ethylene groups,
$R^4$: are independently alkylene groups —$CR^6(R^7)$—$CR^8(R^9)$— where the $R^6$, $R^7$, $R^8$ and $R^9$ radicals are each independently H or a linear or branched alkyl radical having 1 to 8 carbon atoms, with the proviso that not all radicals are H and the sum total of the carbon atoms in the $R^6$, $R^7$, $R^8$ and $R^9$ radicals is 2 to 8,
$R^5$ is an ethylene group —$CH_2CH_2$—,
a is a number from 10 to 35,
b is a number from 5 to 30,
c is a number from 0 to 2,
d is a number from 1 to 15
and where the copolymer has a weight-average molecular weight $M_W$ of $1*10^6$ g/mol to $30*10^6$ g/mol.

30. The copolymer (P) according to claim 29, which is a copolymer (P1) comprising
40 to 60% by weight of (meth)acrylamide as monomer (A), and
0.1 to 5% by weight of macromonomers (B1) and (B2), where the molar proportion of the macromonomers (B1) based on the sum total of (B1) and (B2) is 0.3 to 0.95 and wherein:
$R^1$: is H or methyl,
$R^2$: is a divalent linking group —$OR^{35}$— where $R^{35}$ is a linear 1,ω-alkylene group having 1 to 6 carbon atoms,
$R^3$: is ethylene groups —$CH_2CH_2$—,
$R^4$: are independently alkylene groups —$CR^6(R^7)$—$CR^8(R^9)$—, where the sum total of the carbon atoms $R^6$, $R^7$, $R^8$ and $R^9$ is 2 in each case, and where, in at least 70 mol % of the —$CR^6(R^7)CR^8(R^9)$— units, $R^6$, $R^7$ and $R^8$ are each H and $R^9$ is ethyl,
$R^5$ is an ethylene group —$CH_2CH_2$—,
a is a number from 20 to 28,
b is a number from 10 to 30,
c is a number from 0 to 2,
d is a number from 1.5 to 10;
and
40 to 60% by weight of at least one hydrophilic, anionic, monoethylenically unsaturated monomer (C) comprising $SO_3H$ groups or salts thereof, where the amounts of the monomers are each based on the amounts of all the monomers in the copolymer (P1).

31. The copolymer (P) according to claim 29, which is a copolymer (P2) comprising 50 to 85% by weight of (meth)acrylamide as monomer (A), and 0.1 to 10% by weight of macromonomers (B), where the molar proportion of the macromonomers (B1) based on the sum total of (B1) and (B2) is 0.3 to 0.95 and wherein:

$R^1$: is H or methyl, $R^2$: is a divalent linking group —$OR^{35}$— where $R^{35}$ is a linear 1,ω-alkylene group having 1 to 6 carbon atoms, $R^3$: is ethylene groups —$CH_2CH_2$—, $R^4$: are independently alkylene groups —$CR^6(R^7)$—$CR^8(R^9)$—, where the sum total of the carbon atoms $R^6$, $R^7$, $R^8$ and $R^9$ is 2 in each case, and where, in at least 70 mol % of the —$CR^6(R^7)CR^8(R^9)$— units, $R^6$, $R^7$ and $R^8$ are each H and $R^9$ is ethyl, $R^5$ is an ethylene group —$CH_2CH_2$—, a is a number from 20 to 28, b is a number from 10 to 25, c is a number from 0 to 2, d is a number from 1.5 to 10;

and 5 to 45% by weight of at least one hydrophilic, anionic, monoethylenically unsaturated monomer (C) comprising COOH groups or salts thereof, where the amounts of the monomers are each based on the amounts of all the monomers in the copolymer (P2).

32. The copolymer (P) according to claim 29, which is a copolymer (P3) comprising 30 to 85% by weight of (meth)acrylamide as monomer (A), and 0.1 to 10% by weight of macromonomers (B), where the molar proportion of the macromonomers (B1) based on the sum total of (B1) and (B2) is 0.3 to 0.95, and wherein:

$R^1$: is H or methyl, $R^2$: is a divalent linking group —$OR^{35}$— where $R^{35}$ is a linear 1,ω-alkylene group having 1 to 6 carbon atoms, $R^3$: is ethylene groups —$CH_2CH_2$—, $R^4$: are independently alkylene groups —$CR^6(R^7)$—$CR^8(R^9)$—, where the sum total of the carbon atoms $R^6$, $R^7$, $R^8$ and $R^9$ is 2 in each case, and where, in at least 70 mol % of the —$CR^6(R^7)CR^8(R^9)$— units, $R^6$, $R^7$ and $R^8$ are each H and $R^9$ is ethyl, $R^5$ is an ethylene group —$CH_2CH_2$—, a is a number from 20 to 28, b is a number from 10 to 25, c is a number from 0 to 2, d is a number from 1.5 to 10;

and at least two hydrophilic, anionic, monoethylenically unsaturated monomers (C) comprising 5 to 40% by weight at least one monomer (C1) comprising COOH groups or salts thereof, and 5 to 40% by weight of at least one monomer (C2) comprising —$SO_3H$ groups or salts thereof, where the amounts of the monomers are each based on the amounts of all the monomers in the copolymer (P3).

33. An aqueous formulation comprising at least one thickening, water-soluble copolymer (P) according to claim 29, wherein the amount of the copolymer in the aqueous formulation is 0.02 to 2% by weight.

34. A process for preparing a water-soluble copolymer (P) according to claim 21, comprising:

(a) providing an aqueous monomer solution comprising water, 35 to 99.5% by weight of at least one uncharged, monoethylenically unsaturated, hydrophilic monomer (A) selected from the group consisting of (meth)acrylamide, N-methyl(meth)acrylamide, N,N'-dimethyl(meth)acrylamide and N-methylol(meth)acrylamide, 0.01 to 15% by weight of at least one monoethylenically unsaturated macromonomer (B) comprising—as well as the monoethylenically unsaturated group—a hydrophilic group and a hydrophobic group, wherein at least one macromonomer (B) is a mixture comprising macromonomers (B1) and (B2) of the general formulae

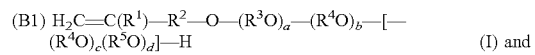 (I) and

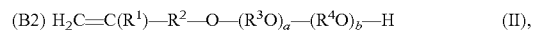 (II), where the stated amounts of the monomers are each based on the total amount of all the monomers in the copolymer (P), the molar proportion x of the macromonomers (B1) based on the sum total of (B1) and (B2) is 0.1 to 0.99, and where the radicals and indices in the formulae (I) and (II) are each as defined in claim 21, and 0.1 to 69.99% by weight of at least one hydrophilic, anionic, monoethylenically unsaturated monomer (C) comprising at least one acidic group selected from the group consisting of —COOH, —$SO_3H$ and —$PO_3H_2$ groups or salts thereof, where the concentration of all the monomers together is 10 to 60% by weight based on the aqueous monomer solution, (b) cooling the aqueous monomer solution to a temperature of less than +10° C., (c) adding at least one thermal initiator for free-radical polymerization to the aqueous monomer solution, at least one of the initiators being able to trigger a free-radical polymerization at temperatures of less than +10° C., (d) polymerizing the monomer mixture under essentially adiabatic conditions, with heating of the mixture under the influence of the heat of polymerization formed and with formation of a polymer gel, (e) comminuting the polymer gel formed, (f) drying the polymer gel.

35. The process according to claim 34, wherein the aqueous monomer solution further comprises a non-polymerizable, surface active compound (T).

36. The process according to claim 34, wherein the polymerization is conducted in a conical reactor, wherein the conical reactor is a tubular reactor (1) which has a diameter D1 and narrows conically (2) at the lower end, where the diameter at the end of the conical narrowing is D2, the ratio D1/D2 is 2:1 to 25:1 and the angle α between the wall in the cylindrical section (1) and the wall in the region of the conical narrowing (2) is more than 120° and less than 180°, and the reactor additionally has a shut-off device (3) arranged at the lower end of the conical narrowing and at least one feed (4) at the upper end of the reactor, and steps (a) and (b) are undertaken in suitable mixing and cooling apparatuses outside of the conical reactor, the cooled monomer solution is transferred from there into the reactor through the feed (4), and after the polymerization, by opening the shut-off device (3) and injecting at least one gas through the feed (4), the polymer gel (5) formed is forced out of the reactor through the opened shut-off device.

\* \* \* \* \*